(12) United States Patent
Gorzkiewicz et al.

(10) Patent No.: US 12,500,673 B2
(45) Date of Patent: Dec. 16, 2025

(54) SYSTEMS AND METHODS FOR FAST BURST DATA LINK ACQUISITION

(71) Applicant: SEMTECH CORPORATION, Camarillo, CA (US)

(72) Inventors: Dariusz Michal Gorzkiewicz, Oakville (CA); Wesley Calvin D'Haene, Airdrie (CA)

(73) Assignee: SEMTECH CORPORATION, Camarillo, CA (US)

( * ) Notice: Subject to any disclaimer, the term of this patent is extended or adjusted under 35 U.S.C. 154(b) by 308 days.

(21) Appl. No.: 18/309,740

(22) Filed: Apr. 28, 2023

(65) Prior Publication Data

US 2024/0364427 A1 Oct. 31, 2024

(51) Int. Cl.
*H04B 10/61* (2013.01)
*H04B 10/69* (2013.01)

(52) U.S. Cl.
CPC ..... *H04B 10/6164* (2013.01); *H04B 10/6933* (2013.01)

(58) Field of Classification Search
CPC .................. H04B 10/6164; H04B 10/69–6973
See application file for complete search history.

(56) References Cited

U.S. PATENT DOCUMENTS

| 6,785,354 | B1* | 8/2004 | Dietrich | H03L 7/12 331/DIG. 2 |
| 8,649,473 | B2* | 2/2014 | Nishi | H03L 7/104 375/354 |
| 2014/0126678 | A1* | 5/2014 | Cirit | H04L 7/0337 375/375 |
| 2016/0352504 | A1* | 12/2016 | Gu | H03L 7/081 |

* cited by examiner

*Primary Examiner* — Nathan M Cors
(74) *Attorney, Agent, or Firm* — Morgan, Lewis & Bockius LLP

(57) ABSTRACT

A system may include a recovery circuit that may: receive a first detect signal for a first burst signal and a second detect signal for a second burst signal in a burst mode data path; receive a reference pattern signal from a continuous mode data path; generate a first lock signal locked to the first burst signal or locked to the reference pattern signal, and a second lock signal locked to the second burst signal; and output the reference pattern signal from the recovery circuit during a guard period. The frequency of the recovery circuit may be locked to the frequency of the reference pattern signal during the guard period. The guard period may start based on when the first detect signal de-asserts or when the first lock signal de-asserts. During the guard period, the recovery circuit does not output the first burst signal or the second burst signal.

21 Claims, 39 Drawing Sheets

SYSTEMS AND METHODS FOR FAST BURST DATA LINK ACQUISITION

BACKGROUND

Some applications, such as a passive optical network (PON), need alternating current (AC) coupling capacitors that reside between transmitters (e.g., transimpedance amplifiers (TIA)) and receivers (e.g., limiting amplifiers). These AC coupling capacitors may be discrete or integrated components. At times, the transmitter device may have an input-level dependent direct current (DC) offset which prompts the need to discharge the AC coupling capacitors in order for the receiver device to recover the signal. In some systems, this DC offset is discharged using a "reset" signal provided by a host. However, because this reset signal is sent and simultaneously used by both the transmitter and receiver devices, there may not be adequate time allotted to sufficiently discharge the AC coupling capacitors. Additionally, there are scenarios (e.g., a registration period), where no host reset signal is provided at the start of an incoming data burst. Without the presence of a reset, the transmitter's output signals may remain toggled and result in a failed signal transmission attempt.

Furthermore, in certain applications, for example, the passive optical network (PON), where the data signals are sent in bursts with periods of time in between being dark or exhibiting no signal transitions, devices in the path may need to consume time to retrain, re-adapt, and/or re-lock internal blocks to be able to pass valid data upon the valid data becoming present. The amount of time that each device or the device's sub-components consume to enter a state when valid data can be passed may result in an unnecessarily extended or unacceptably long link negotiation period.

The description provided in the background section should not be assumed to be prior art merely because it is mentioned in or associated with the background section. The background section may include information that describes one or more aspects of the subject technology, and the description in this section does not limit the invention.

BRIEF DESCRIPTION OF THE DRAWINGS

The accompanying drawings, which are included to provide a further understanding of the disclosure, are incorporated in and constitute a part of this disclosure, illustrate embodiments of the disclosure, and together with the description serve to explain principles of the disclosure.

FIGS. 2A-2I illustrate an example circuit and an example of a signal conditioning and negotiation process during a registration period.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The inventors of the present disclosure have recognized the problems and disadvantages of the related art, including the deficiencies identified above in the Background section, have performed extensive research and experiments, and developed a new invention. The implementations of the present disclosure are thus directed to devices and methods that substantially obviate one or more problems due to limitations and disadvantages of the related art.

Features, advantages, and aspects of the present disclosure are set forth in part in the description that follows and in part will become apparent from the present disclosure or may be learned by practice of the inventive concepts provided herein. Other features, advantages, and aspects of the present disclosure may be realized and attained by the descriptions provided in the present disclosure, or derivable therefrom, and the claims hereof as well as the appended drawings.

Signal Conditioning and Negotiation

Aspects of the present disclosure relate in general to transmitters and receivers, and more particularly to, for example, without limitation, systems and methods for signal conditioning and negotiation. One or more advantageous aspects of the present disclosure enable using both the off-chip signaling, provided by the system host, and internally generated on-chip signaling. This allows for both the transmitter and receiver devices to negotiate an optimally settled electrical signal. In this way, it is possible to pass recovered data in a more efficient manner.

Figure 1A:
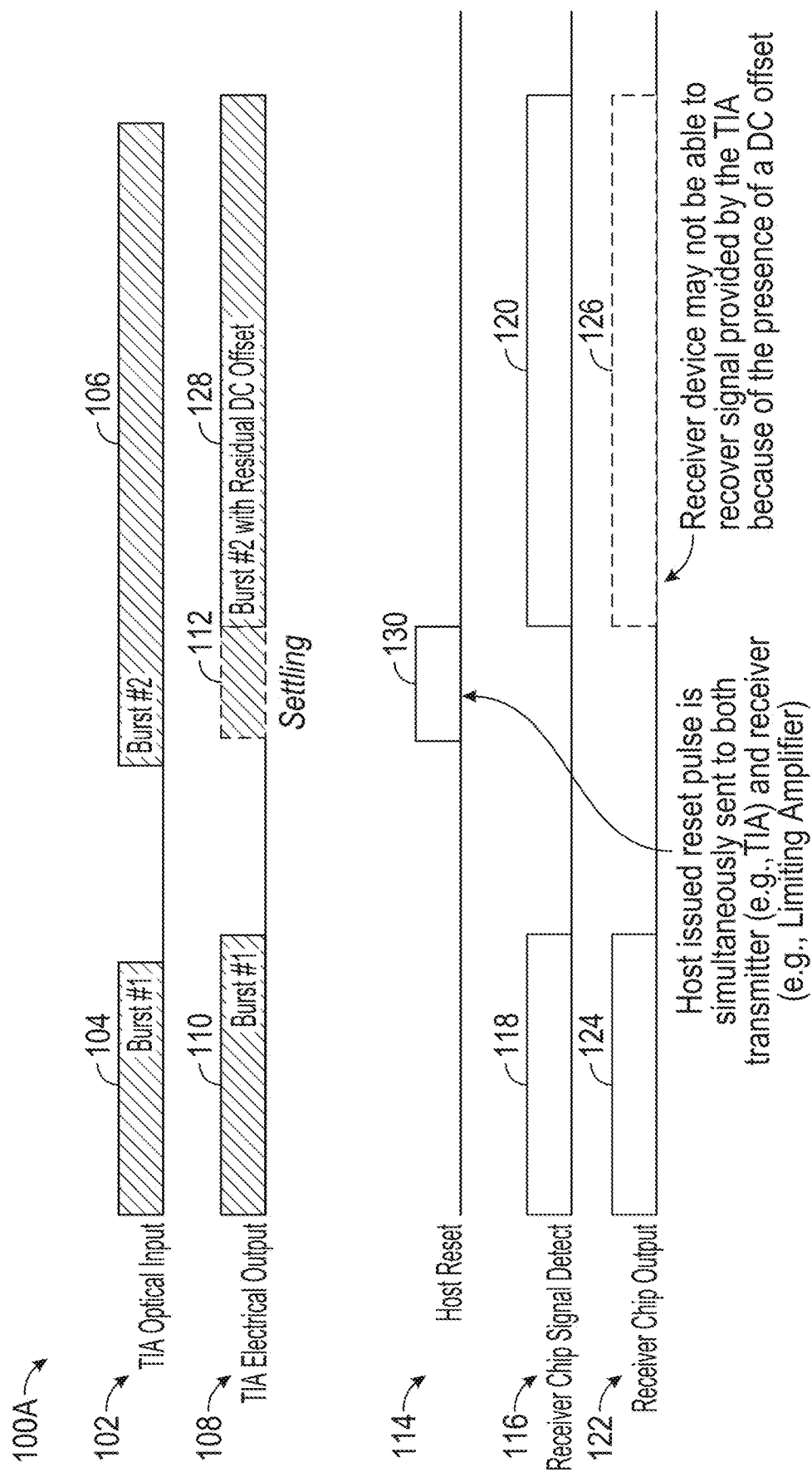
FIG. 1A shows an example of a waveform diagram that illustrates an example data burst scenario for a mission mode.

FIG. 1A shows an example of a waveform diagram that illustrates an example data burst scenario 100A for a mission mode. A transmitter device (which may be sometimes referred to as a transmitter) may receive an optical input 102 (sometimes referred to as an optical signal) and generate an electrical output 108 (sometimes referred to as an electrical signal). In the example shown in FIG. 1A, the transmitter device receives a data burst 104 and outputs a burst 110 which is an electrical output. The optical signal or optical input 102 may be single-ended. The transmitter device converts that optical signal 102 into the electrical signal 108 that is differential. In other words, the transmitter device may provide a differential output signal, including a positive output signal and a negative output signal.

A receiver device (which may be sometimes referred to as a receiver) takes that differential output signal from the transmitter device, as a differential input signal, and attempts to recover it, subtracting the positive and negative signals. The receiver device may contain a signal detection block which asserts upon detection of a signal from the transmitter device. In the example shown, the receiver device's signal detect block asserts (118) and allows for the recovered data signal from transmitter to be output as a signal 124.

Because the input signal of the transmitter device is a single-ended optical signal, the positive output and negative output signals of the transmitter device do not cross or may not sufficiently cross as a result of possessing a DC offset. The output signal includes a direct current (DC) offset. Although the output signals may toggle up and down, the output signals do not cross. The receiver device is unable to recover the signals because the positive output signal may stay high and the negative output signal may stay low. Because the positive output and negative output signals do not cross, the output signal appears as if it is a one minus a zero and stays that way constantly. In the example shown, when the transmitter device receives a second burst 106, the transmitter device outputs an electrical output 128 with a residual DC offset.

Some applications, such as passive optical network applications, include a set of alternating current (AC) coupling capacitors between the transmitter device and the receiver device or within the receiver device. Because the positive and negative output signals of the transmitter device do not cross due to the DC offset, the AC coupling capacitors may be shorted out for a brief period of time. This results in removing the transmitter device's DC offset at the receiver's input block side of the AC coupling capacitors. Then the signals start crossing and a data stream (which may be sometimes referred to as a burst) can be passed on to the downstream receiver device. This discharging of the AC coupling capacitors may be required.

A host of the system that includes the transmitter device and the receiver device is aware of this, and other limitations, and issues host reset signals 114 (which may be sometimes referred to as host rest instructions). In the example shown, the host issues a reset signal 130 (or a reset instruction). The reset signal is sent to both the transmitter device and receiver device. In some systems, the reset signal is used concurrently by the transmitter device and the receiver device. When the transmitter device uses the reset signal issued by the host and attempts to set up its gain and amplitude of its output signals, the receiver device discharges its AC coupling capacitors and attempts to remove all or part of the DC offset that the transmitter device is in the process of adjusting. In other words, the discharge occurs when the transmitter device's output signal and the DC offset are still in flux, so having the DC coupling capacitors is not effective for this mission mode type of scenario with a host-issued reset instruction 130 as well as a receiver device's internal signal detect block. The transmitter and receiver devices are provided with the host reset instruction to settle (see, e.g., 112) and generate their intended stable signals.

However, in most cases, the host's reset instruction 130 is either insufficiently long or used at an incorrect instance of time by the devices in the link which could result in a degradation to signal sensitivity, quality, and/or failure to meet the link timing budget. The transmitter device uses the reset signal to produce a settled electrical output signal that may often possess a DC offset while the receiver device is simultaneously expected to use the same reset signal to remove the transmitter device's DC offset during the same period of time while this DC offset is in flux of settling. This process is better performed serially rather than in parallel during the host reset signal. That is, the receiver device needs to remove the transmitter device's DC offset only after its DC offset has fully settled.

Figure 1B:
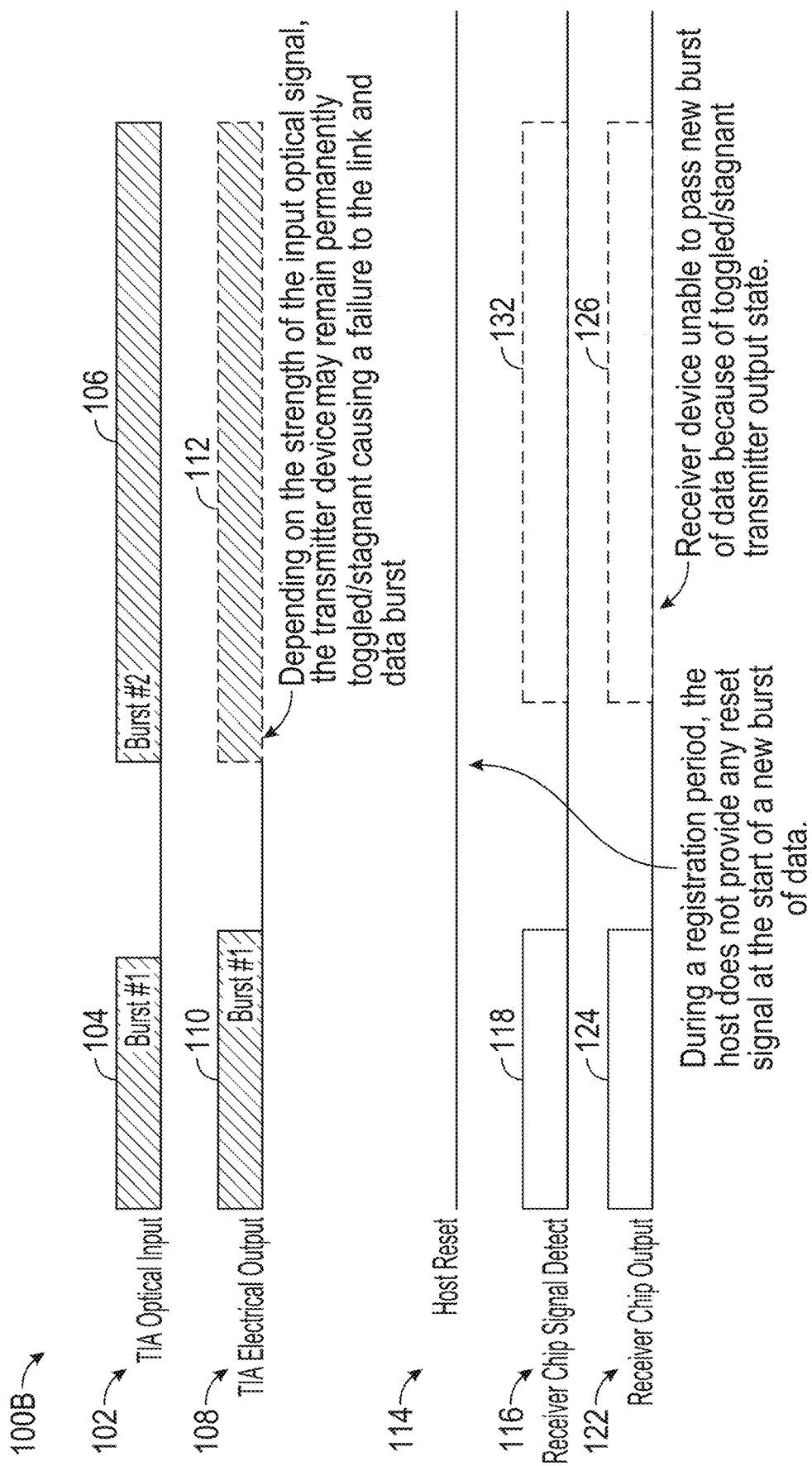
FIG. 1B shows an example of a waveform diagram that illustrates an example data burst scenario for a registration mode.

FIG. 1B shows an example of a waveform diagram that illustrates an example data burst scenario 100B for a registration mode. In this scenario, no host reset instruction 114 is issued. A host reset instruction may be sometimes referred to as a host reset signal. Hence, the transmitter's electrical output signals 108 may remain toggled or stagnant during an entire data burst resulting in a failure to pass a recoverable signal through the entire downstream link. During the registration mode or period, there is no reset instruction issued to either the transmitter or the receiver. Without that reset instruction, the transmitter may not even be able to set its appropriate gain to pass any kind of signal. Regardless of whether a DC offset is present at the output, as a result, the whole transmission (e.g., the whole burst of data) becomes a failed attempt.

To address at least some of the problems described above, in one or more aspects, the subject technology may advantageously use both off-chip signaling (e.g., a host reset signal 230 in FIG. 8B) provided by the system and on-chip signaling (e.g., an internally generated signal 326S in FIG. 8B) that allows the transmitter and receiver to negotiate with each other. With the negotiation, the receiver receives a signal from the transmitter and removes its DC offset and then passes the recovered data downstream, in a period of time according to the system specifications.

In many cases, the settling of signals is more effectively performed in a serial manner. That is, before the receiver (e.g., 204 of FIG. 2A) begins to allow its signals to settle, the receiver 204 may first wait for the transmitter (e.g., 202 of FIG. 2A) to do so in advance. In one or more advantageous aspects, the signal conditioning and negotiation process described herein allows a system designer to use available signals to issue instructions at specific times and for specific periods to the transmitter 202 and/or the receiver 204.

Figure 8A:
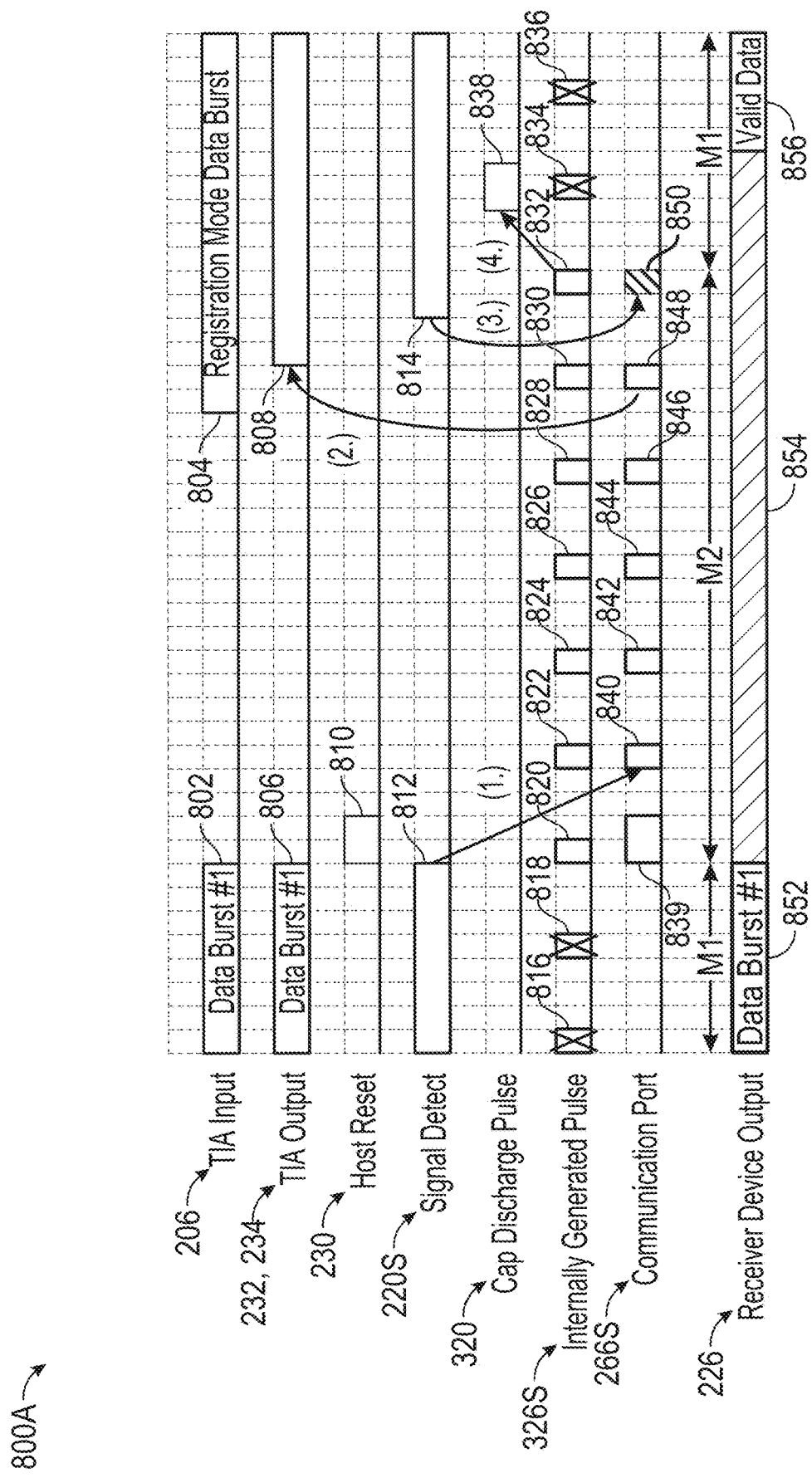
FIG. 8A shows waveforms for an example communication scheme during a registration mode.
Figure 8B:
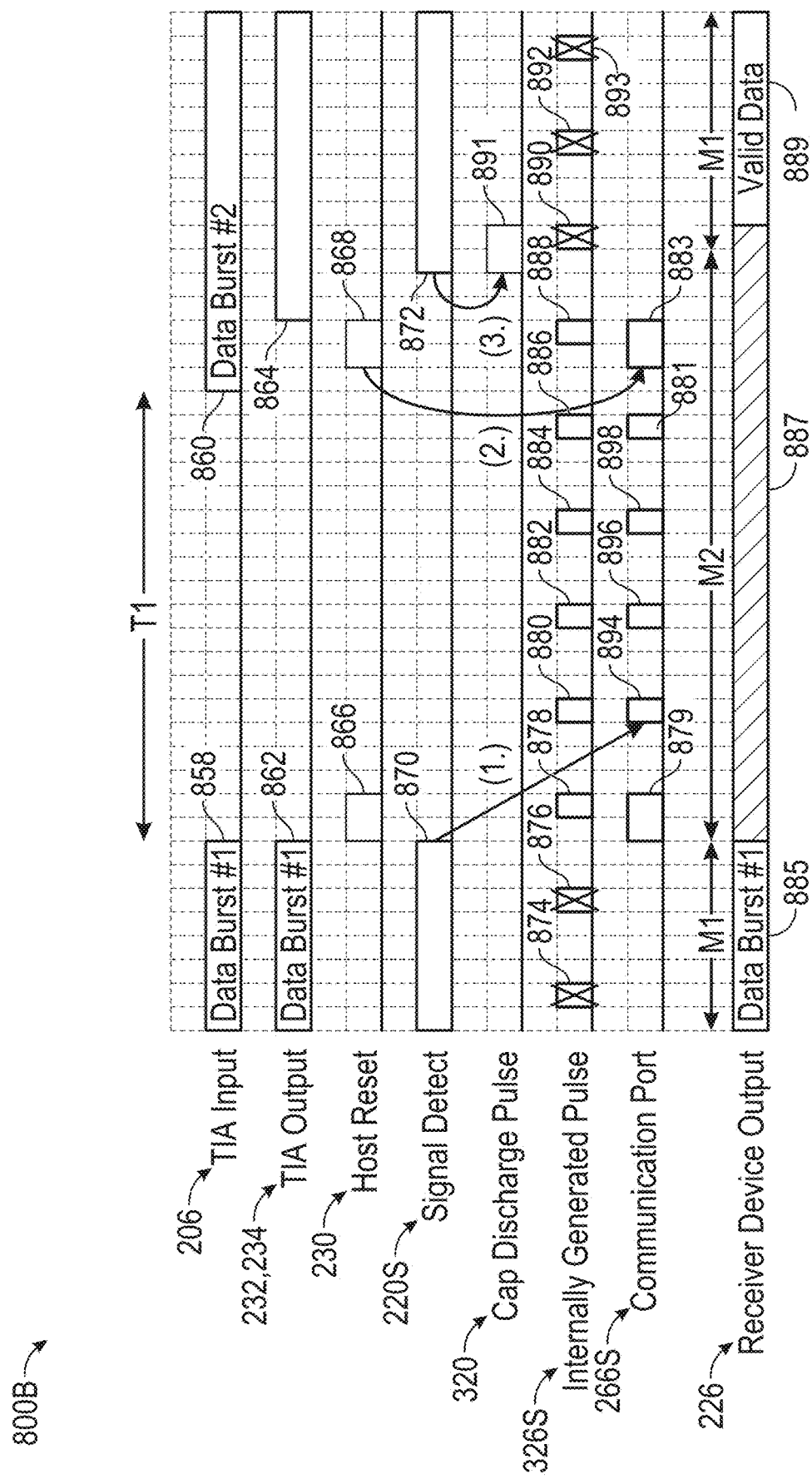
FIG. 8B shows waveforms for an example communication scheme during a mission mode.

The available signals described in the foregoing sentence may include, for example, one or more host reset instructions (e.g., 868 in FIG. 8B) from a host and/or one or more receiver-generated signal detect (e.g., 812 and/or 814 in FIG. 8A, or 870 and/or 872 in FIG. 8B). The instructions issued to the transmitter 202 may include, for example, (i) one or more reset instructions (e.g., 840, 842 844, 846, 848 and/or 850 in FIG. 8A, or 894, 896, 898, and/or 881 in FIG. 8B) generated based on one or more internally generated instructions (e.g., 326S in FIG. 8A or 8B) and/or (ii) one or more reset instructions (e.g., 883 in FIG. 8B) generated based on a host reset signal (e.g., 868 in FIG. 8B). The instructions issued to the component(s) of the receiver 204 may include, for example, a trigger signal or a capacitor discharge instruction (e.g., 320 in FIG. 3, 838 in FIG. 8A, or 891 in FIG. 8B).

Some systems for passive optical network (PON) signal settling resolve transmitter device input-level dependent DC offset by issuing a host reset instruction to the transmitter and receiver devices. This only applies to a mission mode burst data signaling scenario and is prone to result in a violation to the link timing budget as the receiver device is unable to recover the incoming data until the signal's DC offset naturally converges based on the device's input termination time constant. During a registration scenario, there is no host reset instruction issued in which case the burst of data may never be passed through the link.

In contrast, in one or more aspects, the signal conditioning and negotiation process of the subject technology described herein advantageously allows the system designer to control the relative timing, frequency and width (or length) of instructions issued to either or both the transmitter and receiver devices. Advantages of the signal conditioning and negotiation process of the subject technology include, among others, allowing system designers to use host reset information (e.g., 230 in FIG. 2A-2I, 3, 8A or 8B) and/or the receiver's internally generated signal detect signal (e.g., 220S in FIG. 2B, 2D, 2F, 2I, 8A or 8B) to issue one or more instructions (e.g., one or more pulses of 266S and/or one or more pulses of 320) to the transmitter and/or receiver devices in a staggered manner. That is, the mechanism can issue an initial instruction (e.g., 883 in FIG. 8B) to the transmitter device to allow it to settle prior to issuing a second instruction (e.g., a capacitor discharge pulse 891) to the receiver device. This second instruction can be generated in parallel with the initial instruction (and this second instruction is provided to the receiver device's component after the initial instruction is sent to the transmitter device) to enable the receiver device to begin its DC offset removal process in the presence of a steady signal from the transmitter device.

In one or more aspects, an input may sometimes refer to an input signal, and an output may sometimes refer to an output signal, and vice versa. An input may include one or more inputs. An output may include one or more outputs. A signal may include one or more signals. An input signal may include one or more input signals. An output signal may include one or more output signals. A signal may sometimes refer to a pulse and vice versa. A pulse may include one or more pulses. An instruction may sometimes refer to a pulse and vice versa. An instruction may include one or more instructions. In one or more aspects, a pulse may be an example of an instruction. An instruction may be, or may include, a signal or a pulse. The foregoing provides non-limiting examples, and the subject technology is not limited thereto.

Figure 2A:
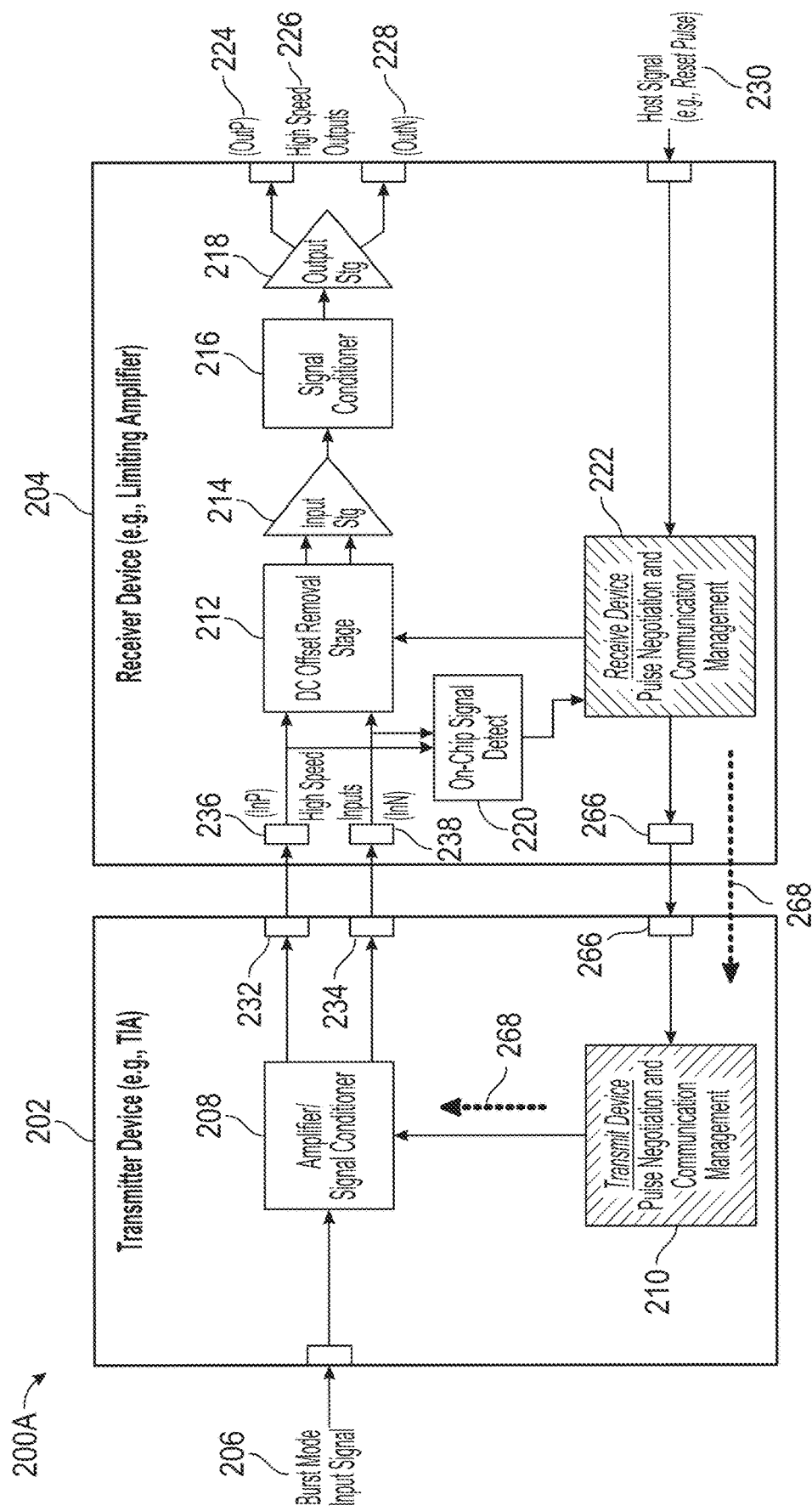

FIGS. 2A-2I illustrate an example circuit and an example of a signal conditioning and negotiation process during a registration period. FIG. 2A illustrates an example of a schematic diagram of a transmitter and a receiver during a first example step 200A of the signal conditioning and negotiation process. In some aspects, a process may sometimes refer to an algorithm or a method. A process may include one or more processes.

In FIG. 2A, a transmitter 202 may include an amplifier and/or signal conditioner 208, a pulse negotiation and communication management controller 210, and a communication port 266. The transmitter 202 may be sometimes referred to as a transmitter device, a transmit device, a Tx device, and vice versa. The transmitter may be, for example, a transimpedance amplifier (TIA).

The transmitter 202 may receive a burst mode input signal 206. The burst mode input signal 206 may be sometimes referred to as an input, an optical input signal, an input data burst, an input signal, or an optical signal. The amplifier and/or signal conditioner 208 of the transmitter 202 may process the burst mode input signal 206 and output a differential output signal, including a positive output signal 232 and a negative output signal 234. These output signals are input to a receiver 204 as input signals 236 and 238, which may be a differential input signal. The input signals 236 and 238 may be sometimes referred to as high-speed inputs.

The receiver 204 may include an on-chip signal detection circuit 220, a DC offset removal stage 212, an input stage 214, a signal conditioner 216, an output stage 218, and a communication port 266. The on-chip signal detection circuit 220 may be sometimes referred to as an on-chip signal detect, a signal detect, a signal detect circuit, an on-chip signal detection circuit, or the like. The DC offset removal stage 212 may be sometimes referred to as a DC offset removal stage circuit.

The receiver 204 may be sometimes referred to as a receiver device, a receive device, an Rx device, and vice versa. The receiver may be, for example, a limiting amplifier. The DC offset removal stage 212 may remove DC offsets in the input signals 236 and 238, and provide its output signals to the input stage 214. The input stage 214 may in turn output a signal to the signal conditioner 216 which may output a signal to the output stage 218. A high level illustration for these blocks is shown and described in reference to FIG. 3. The input stage (which may be a simple signal slicer, limiting amplifier, a complex equalizer (EQ), or combination); blocks inside the receiver should be considered as generic signal processing or conditioning blocks and may include a gain stage, bandwidth filter, clock and data recovery (CDR), and/or trace driver. The signal conditioner 216 may re-adjust its gain based on the incoming signal but only after receiving an instruction at its communication port. The signal conditioner 216 may be a simple buffer or a complex CDR or a combination of both. The signal conditioner 216 may use a logic signal (e.g., signal 322 in FIG. 3, which is not necessarily a pulse) to decide whether to recover or pass the output of 214 in FIG. 2A or 304 in FIG. 3. The output stage 218 may generate a positive output signal 224 and a negative output signal 228 (which may be sometimes referred to as high-speed output signals 226).

The receiver 204 and the transmitter 202 have their respective communication port 266. The dotted bold lines indicate signals generated as part of the signal conditioning and negotiation process and provided from the receiver 204 to the transmitter 202 and then from the pulse negotiation and communication management controller 210 to the amplifier and/or signal conditioner 208. A signal 268 may be generated by the receiver 204 (e.g., a signal generated by a pulse negotiation and communication management controller 222 of the receiver). At the end of an output burst of data, the receiver 204 may begin sending, through its communication port 266, a processed burst not-present signal (e.g., a signal in the signaling mode 242 of FIG. 2B, 2D, 2F or 2I), which may include a signal generated based on a host reset signal issued by a host or based on an internally generated instruction. The burst not-present signals enable the transmitter 202 to continuously be in a ready state.

In connection with FIGS. 2A-2I, 8A and 8B, a burst not-present signal (e.g., a signal in the signaling mode 242) may be sometimes referred to as a burst not-present mode signal, a burst absent signal, a burst absent mode signal, or the like. A burst not-present signal (e.g., a signal in the signaling mode 242) may include an instruction (e.g., 839, 840, 842 844, 846, 848, or 850 in FIG. 8A, or 879, 894, 896, 898, 881 or 883 in FIG. 8B), where an instruction(s) may be referred to as a reset instruction(s). A burst not-present signal may include one or more burst not-present signals.

Figure 2B:
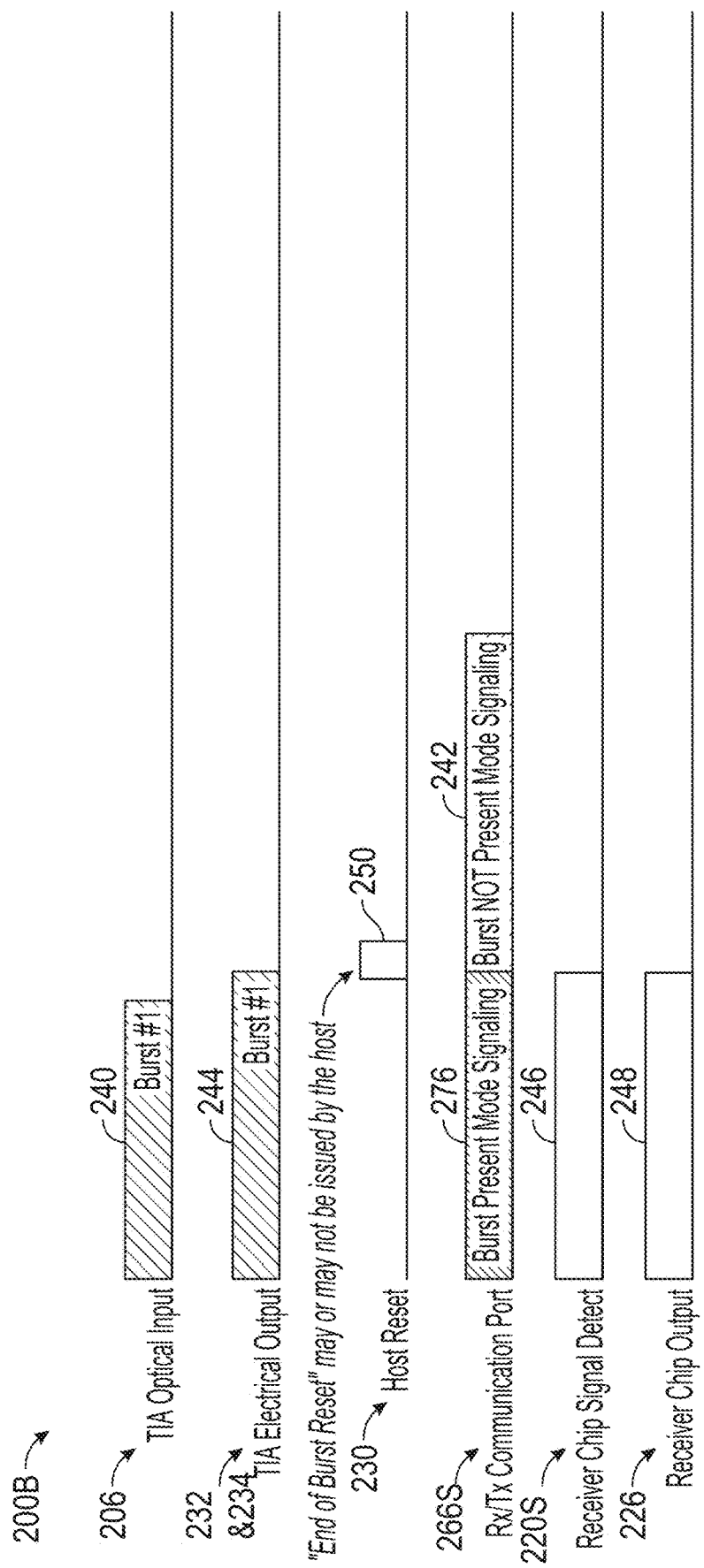

In one or more examples, the receiver 204 may begin to transmit to the transmitter 202 one or more burst not-present signals (e.g., one or more signals in the signaling mode 242; 839, 840, 842 844, 846, 848 and/or 850 in FIG. 8A; or 879, 894, 896, 898, 881 and/or 883 in FIG. 8B), (i) when (or shortly after) the receiver 204 stops detecting a set of output signals 232 and 234 (e.g., an output burst of data 244, 806, or 862) of the transmitter 202 or (ii) when the host issues an end of burst reset pulse (e.g., 250 in FIG. 2B, 810 in FIG. 8A, or 866 in FIG. 8B). When any of the foregoing events of (i) or (ii) occurs, this prompts the receiver 204's signal detect circuit 220 to immediately de-assert (e.g., the signal 812 in FIG. 8A stops; or the signal 870 in FIG. 8B stops). Thereafter, the receiver 204 may stop transmitting to the transmitter 202 one or more burst not-present signals, after the receiver 204 begins/re-begins to detect another set of output signals 232 and 234 (e.g., an output burst of data 254, 808, or 864) from the transmitter 202. The foregoing process may be repeated (e.g., when the receiver 204 stops detecting the another set of output signals 232 and 234, and then later when the receiver 204 starts to detect yet another set of output signals 232 and 234). In FIG. 8A, a host-issued end-of-burst reset pulse 810 is received by the receiver 204 and is provided as the pulse 839 to the communication port 266S by the receiver 204; thus, the pulse 839 may represent the host-issued end-of-burst reset pulse 810. In FIG. 8B, a host-issued end-of-burst reset pulse 866 is received by the receiver 204 and is provided as the pulse 879 to the communication port 266S by the receiver 204; thus, the pulse 879 may represent the host-issued end-of-burst reset pulse 866.

When the receiver 204 sends a burst not-present signal to the transmitter 202, the transmitter 202 can be in a ready state so that when the transmitter 202 receives an input signal 206 (e.g., 252 in FIG. 2D, 804 in FIG. 8A, or 860 in FIG. 8B), the transmitter 202 is ready to convert the input signal 206 to output signals 232 and 234 based on the burst not-present signal (e.g., a reset pulse and/or a train of pulses).

FIG. 2B shows example waveforms 200B for the step 200A of the signal conditioning and negotiation process. Referring to FIGS. 2A and 2B, the input 206 includes the tail end of a previous burst of data 240. The transmitter outputs 232 and 234 include an output data burst 244. The host may or may not issue an end of burst reset 250. The receiver 204 may stop being in a burst present mode signaling 276 and switch to the burst not-present mode signaling 242 (which may be sometimes referred to as burst absent mode signaling or burst absent signaling). The burst not-present mode signaling 242 may include one or more instructions generated by the receiver 204 based on one or more host reset instructions (if present) or based on one or more internally generated instructions. The burst present mode signaling 276 may include one or more instructions generated by the receiver 204 based on one or more host reset instructions (if present), but not based on internally generated instructions. The receive (Rx)/transmit (Tx) communication ports 266 may operate in the burst present mode signaling 276 or the burst not-present mode signaling 242. The Rx/Tx communication port signal 266S may be provided from the pulse negotiation and communication management controller 222 to the communication port 266 of the receiver 204 and then from the communication port 266 of the receiver 204 to the communication port 266 of the transmitter.

The signal detect circuit 220 may generate a receiver chip signal detect 220S. The receiver chip signal detect 220S may be sometimes referred to as a signal detect signal, a signal detect, a signal detection signal, or signal detection information. The signal detect 220S may include a first signal 246. The output stage 218 may generate an output or an output signal 226. The output signal 226 may include a second signal 248. In FIGS. 2A-I, signal 248 may be the processed, recovered, or reconditioned data burst signal of 244 (electrical output from the transmitter).

The end of burst reset 250 may inform the signal detect circuit 220 that the data burst has completed, causing the signal detect circuit 220 to go low, de-assert itself, and to start seeking a new incoming signal. This in turn causes the pulse negotiation and communication management controller 222 to be notified that the signal detection block 220 has de-asserted.

Figure 2C:
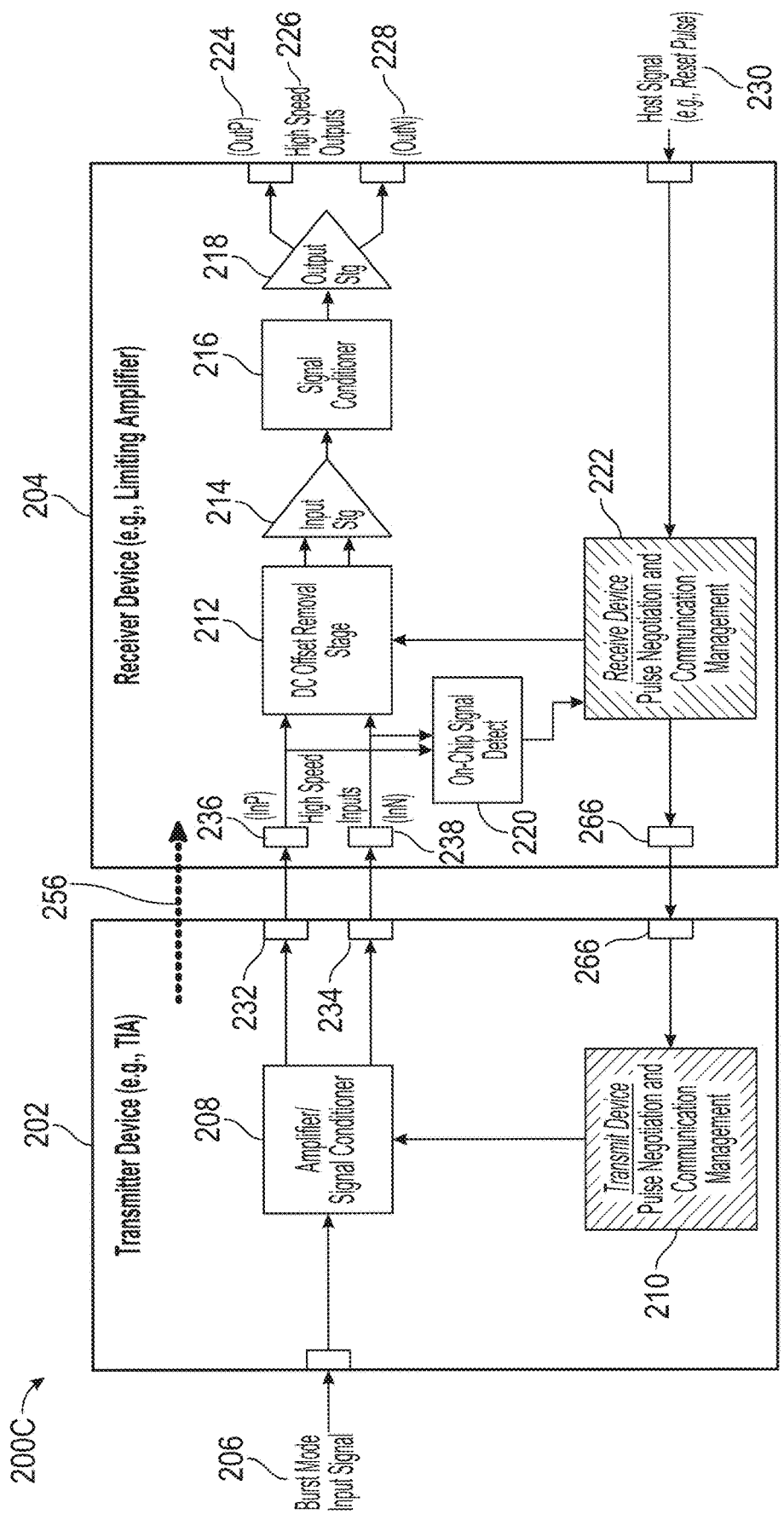
Figure 2D:
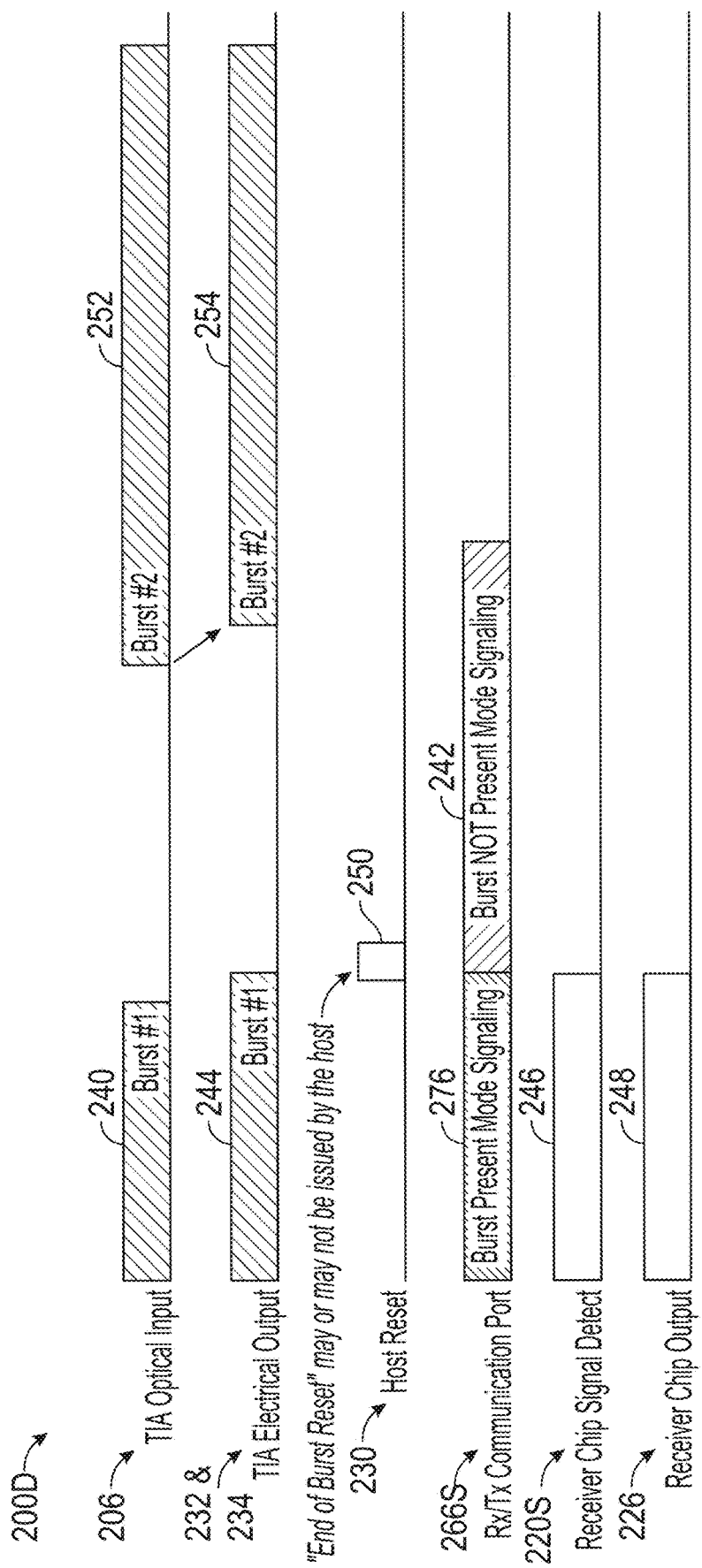

FIG. 2C illustrates an example circuit during an example second step 200C of the signal conditioning and negotiation process. FIG. 2D shows example waveforms 200D for the step 200C. The devices and components shown in FIG. 2C may be the same or substantially the same as those described above with reference to FIG. 2A, and thus, the repetitive descriptions thereof may be omitted for brevity.

Referring to FIGS. 2C and 2D, the input signal 206 of the transmitter 202 may be a new optical burst of data 252 arriving at the input node of the transmitter 202. The signal in the signaling mode 242 may be a train of pulses transmitted by the receiver 204 at specific intervals and have a specific width that depends on the requirements of the transmitter 202. The signaling mode 242 causes the transmitter 202 to be ready and/or in a state which prompts it to re-adjust its gain and/or the signal recovery circuitry, upon receiving a new burst of data 252; the signaling mode 242 stays until after the new optical burst of data 252 arrives. The signaling mode 242 causes the transmitter 202 to set its gain appropriately and to output the signal 254 which has a correct amplitude. The signal 254 has a DC offset but the actual signal on top of (or including) the DC offset has the correct amplitude. In this way, as a result of the signaling provided through the receiver's communication port 266, the upstream transmitter 202 is able to adequately condition the incoming optical signal (e.g., 252) and correctly convert it into an electrical output signal (e.g., 254).

Figure 2E:
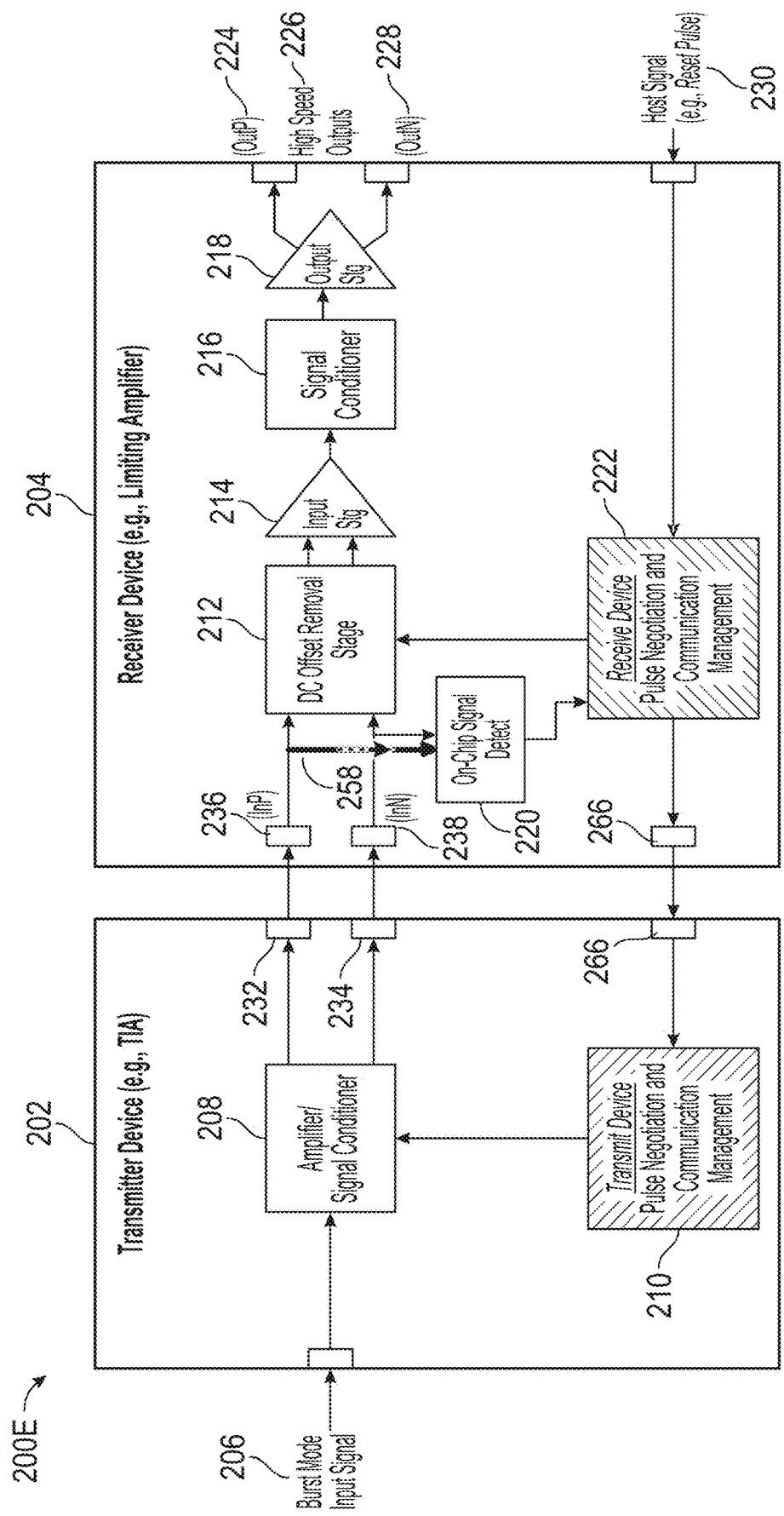
Figure 2F:
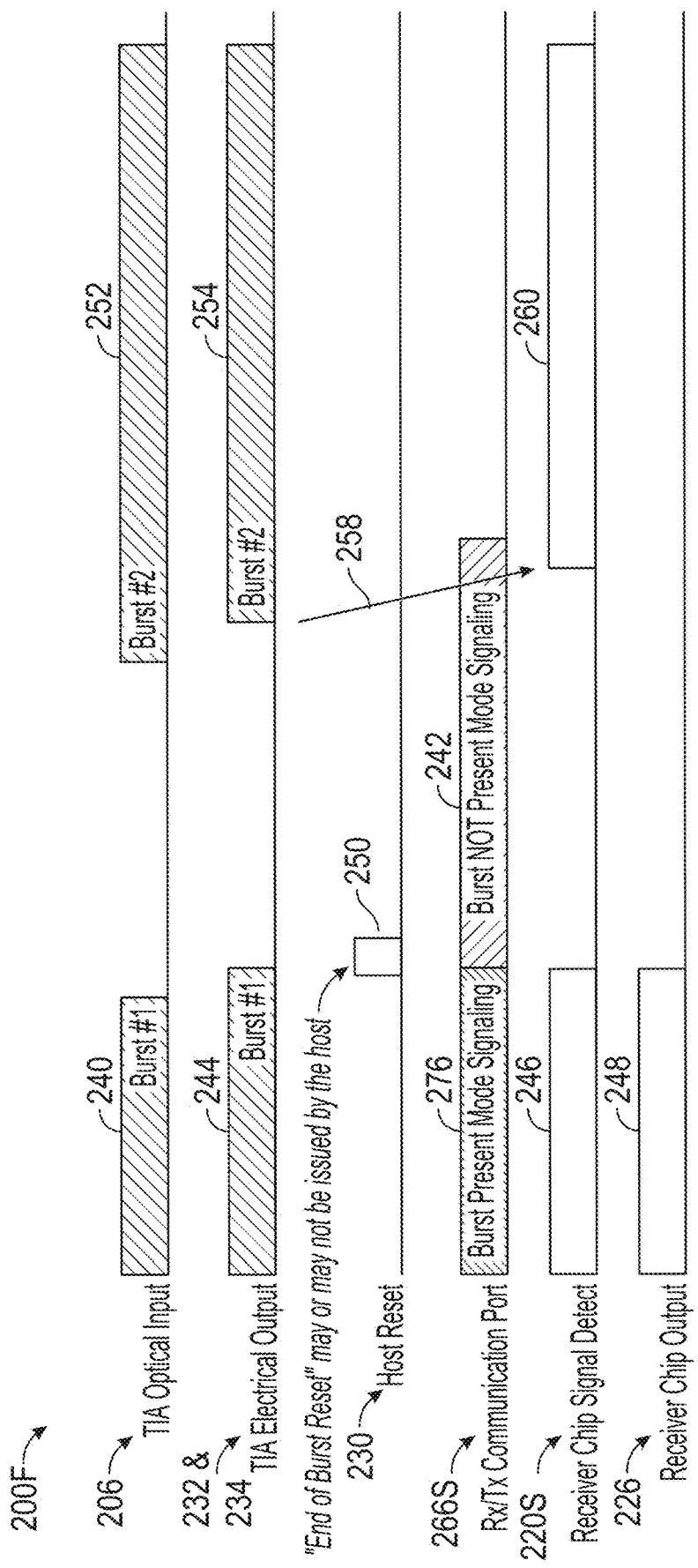

FIG. 2E illustrates an example circuit during an example third step 200E of the signal conditioning and negotiation process. FIG. 2F shows example waveforms 200F for the step 200E. The devices and components shown in FIG. 2E may be the same or substantially the same as those described above with reference to FIG. 2A, and thus, the repetitive descriptions thereof may be omitted for brevity. Referring to FIGS. 2E and 2F, the correctly converted optical to electrical signal 254 from the transmitter 202 is provided to the receiver 204 as input signals 236 and 238. These are subsequently detected by the receiver's signal detect circuit 220 (as illustrated by the path 258) even though there may be a DC offset present. When the signal detect circuit 220 detects the signal 254 (received as the signals 236 and 238), the signal detect circuit 220 generates a detection signal 260 (which is similar to the signal 814 shown in FIG. 8A).

Figure 2G:
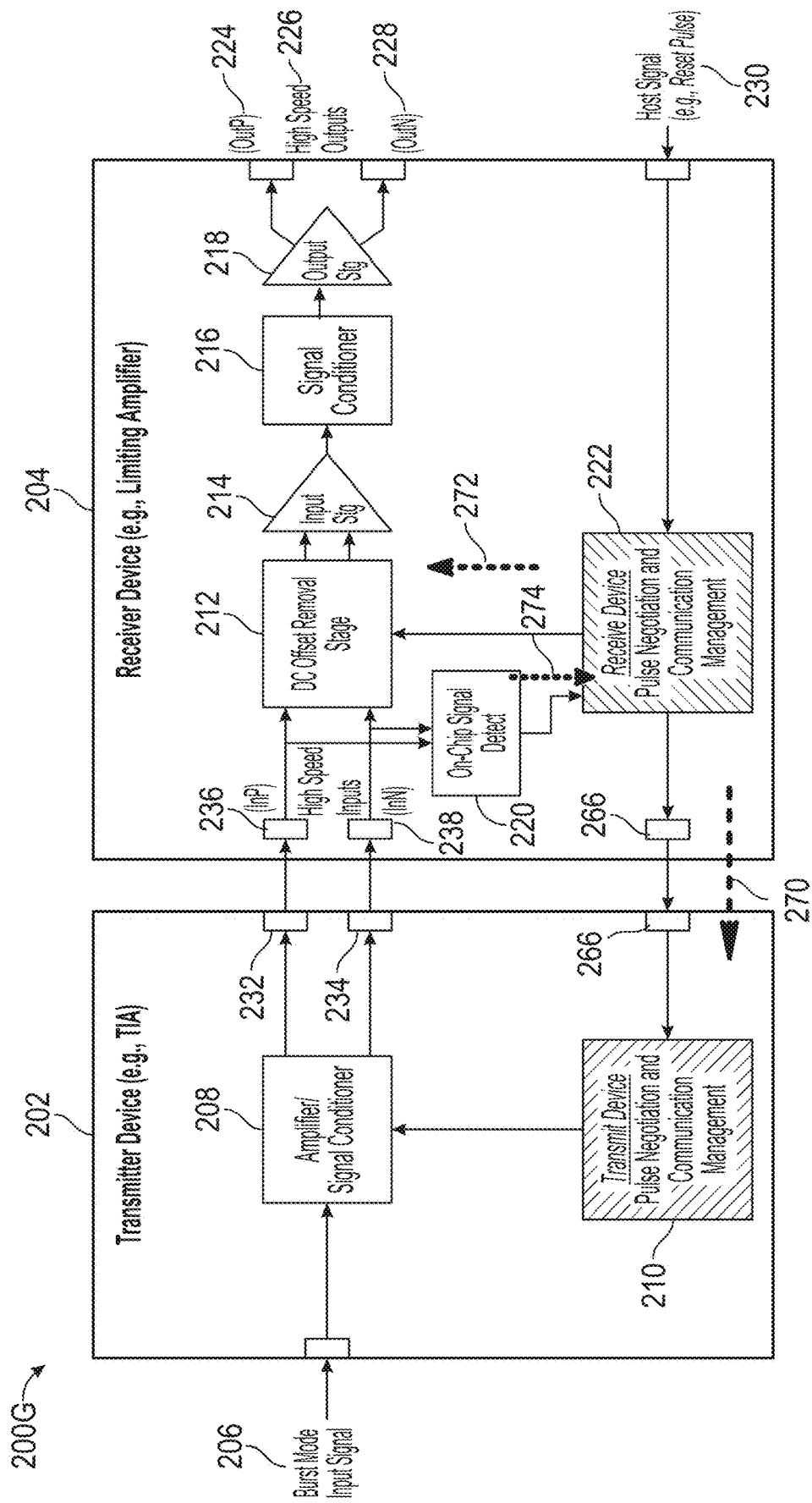

FIG. 2G illustrates an example circuit during an example fourth step 200G of the signal conditioning and negotiation process. The devices and components shown in FIG. 2G may be the same or substantially the same as those described above with reference to FIG. 2A, and thus, the repetitive descriptions thereof may be omitted for brevity. Referring to FIG. 2G, when the signal detect circuit 220 detects a signal (e.g., 236 and 238) from the transmitter 202, the signal detect circuit 220 may assert the presence of a valid incoming data. The signal detect circuit 220 may send this assertion (or the assertion signal) to the pulse negotiation and communication management controller 222 (see the arrow 274). The pulse negotiation and communication management controller 222 may then, via the communication ports 266 of the receiver 204 and transmitter 202 (see the arrow 270), alert the transmitter 202 (e.g., the transmitter's pulse negotiation and communication management controller 210) of valid data. The pulse negotiation and communication management controller 222 may also provide a trigger signal (e.g., a pulse 838 in FIG. 8A) to the DC offset removal stage 212 to trigger a DC offset removal process to be performed by the DC offset removal stage 212 (see the arrow 272). In one or more examples, triggering the DC offset removal process may occur after alerting the transmitter 202 of valid data.

Figure 2H:
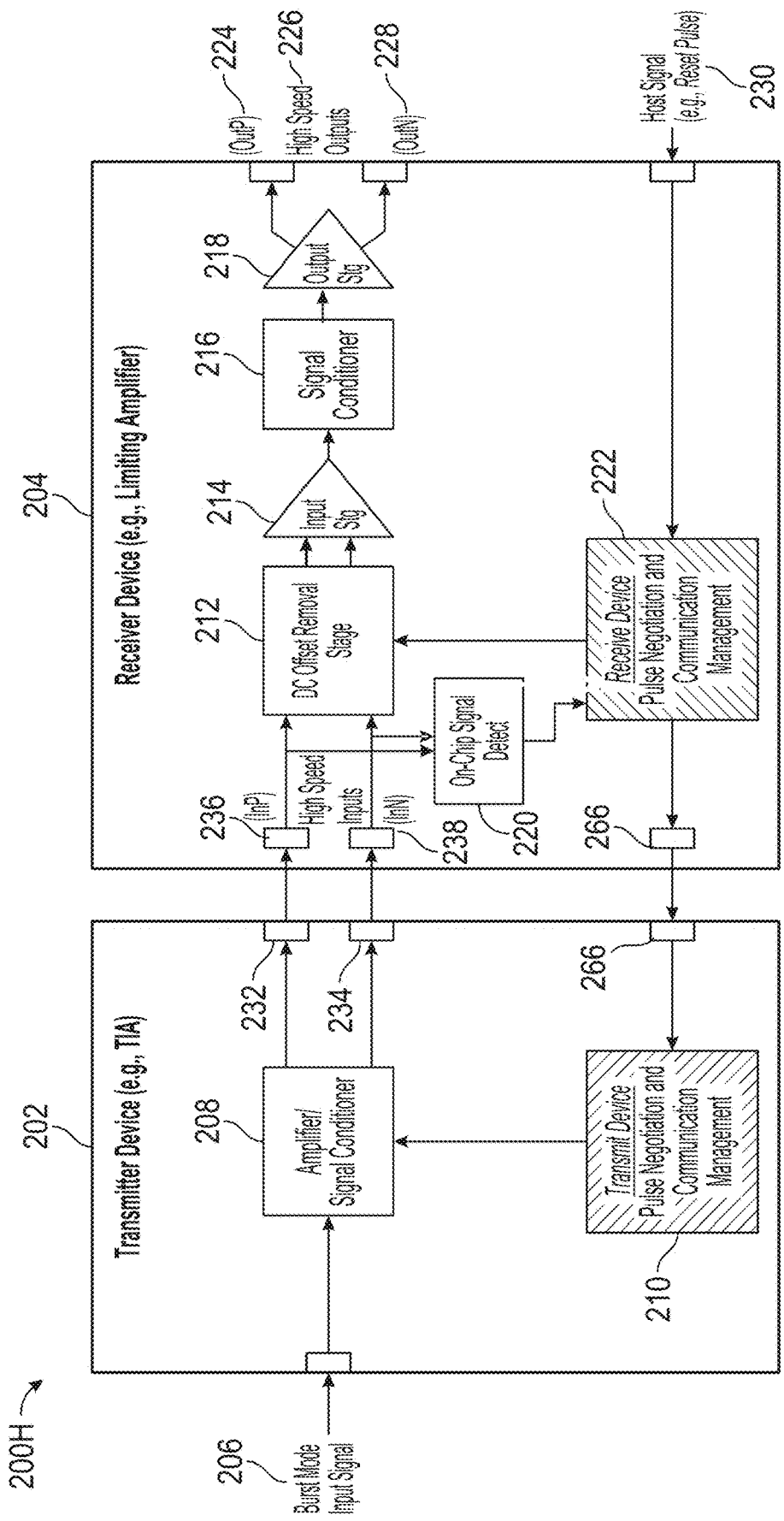

FIG. 2H illustrates an example circuit during an example fifth step 200H of the signal conditioning and negotiation process. FIG. 2I shows example waveforms 200I for the step 200H. The devices and components shown in FIG. 2H may be the same or substantially the same as those described above with reference to FIG. 2A, and thus, the repetitive descriptions thereof may be omitted for brevity. Referring to FIGS. 2H and 2I, upon completion of removal of the DC offset by the DC offset removal stage 212, the receiver 204 begins passing valid and recovered data (i.e., the output signal 226) to a downstream device in the link. This is also shown by burst 264 in FIG. 2I. The pulse negotiation and communication management controller 222 may revert to sending signals to the upstream transmitter 202 in the burst present mode signaling 276.

While FIGS. 2A, 2C, 2E, 2G and 2H illustrate an example of the structure and components of the transmitter 202 and the receiver 204 used in a registration mode, such structure and components may be the same or similar to those of the transmitter 202 and the receiver 204 used in a mission mode. FIGS. 2B, 2D, 2F and 2I illustrate an example of waveforms generated, received, transmitted, or processed during a registration mode. Other examples of waveforms for a registration mode are illustrated, for example, in connection with FIG. 8A. Examples of waveforms for a mission mode is illustrated, for example, in connection with FIG. 8B.

Figure 3:
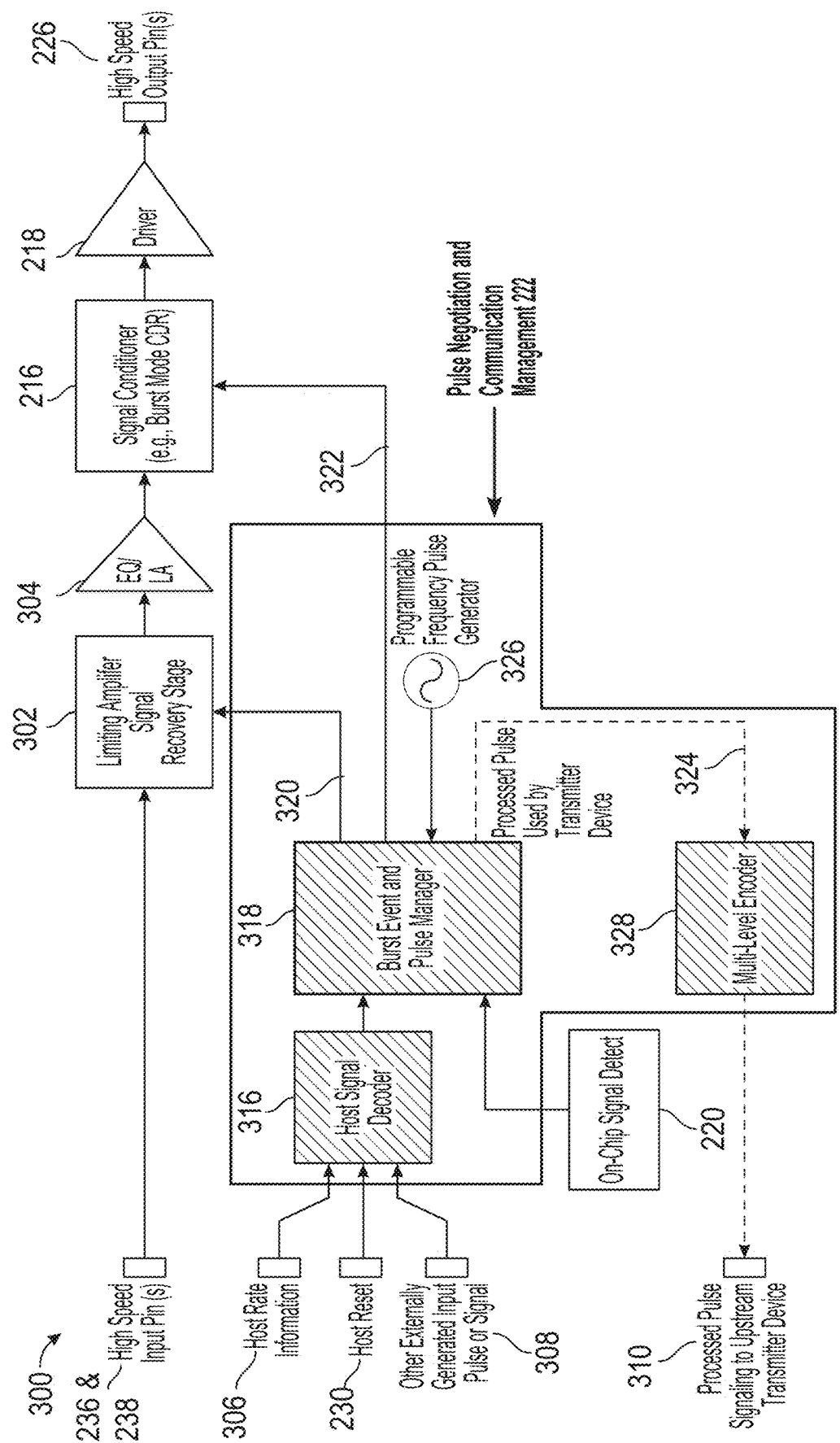
FIG. 3 is a schematic diagram of an example circuit with pulse negotiation and communication management, according to some aspects.

FIG. 3 is a schematic diagram of an example circuit 300 with the pulse negotiation and communication management controller 222, according to some aspects. The circuit 300 may be a part of the receiver 204.

The example circuit 300 may include inputs pins for the inputs 236 and 238, a limiting amplifier signal recovery stage 302, an equalizer 304, the signal conditioner 216, the driver 218, output pins for the high speed output 226, the pulse negotiation and communication management 222, a host rate information 306, the host reset 230, other externally generated input pulse or signal 308, the on-chip signal detect 220 and processed pulse signaling 310 to upstream transmitter device.

The limiting amplifier signal recovery stage 302 may correspond to (or be included in) the DC offset removal stage 212. The equalizer or limiting amplifier (EQ/LA) 304 may correspond to (or be included in) the input stage 214 of the receiver 204. The output of the equalizer/limiting amplifier 304 may be input to the signal conditioner 216 (e.g., a burst mode clock-and-data recovery (CDR)), the output of which is input to the driver 218 (which may be sometimes referred to as the output stage) which generates the high-speed output 226.

The pulse negotiation and communication management controller 222 may include a host signal decoder 316, a burst event and pulse manager 318, a programmable frequency pulse generator 326 and a multi-level encoder 328. The host may provide rate information (e.g., host rate information 306), a host reset signal (e.g., the host reset 230 signals), and/or other externally generated input pulse or signal 308 (e.g., the host reset and the rate information through a multi-level signal), which are input to the host signal decoder 316. In the example of passive optical networks, a medium access control (MAC) device may be the host. The techniques described may be used with any data burst mode signaling applications. Incoming bursts of data may have different rates. The host rate information signal provides the transmitter and/or receiver devices, rate information of the next data burst. Sometimes host reset and host rate signals are provided on a single pin in a tri-level signaling scheme where low, mid, and high levels indicate rate and reset information. In such cases, the decoder block decodes and extracts rate and reset information from this tri-level signal. It should be noted that such a signaling scheme is part of the system (e.g., ITU) standard. The host signal decoder 316 may decode its input signals and provide the decoded host signals to the burst event and pulse manager 318. The on-chip signal detect circuit 220 may detect signals received from the transmitter 202 and provide signal detection information (e.g., 220S in FIG. 2B, 2D, 2F, 2I, 8A, or 8B) to the burst event and pulse manager 318. When there is a signal from the transmitter 202, the receiver 204 may send rate information to the transmitter 202, encoded as a bi-level or a multi-level signal. In other words, when the burst event and pulse manager 318 receives the signal detection information from on-chip signal detect circuit 220, the burst event and pulse manager 318 provides the rate information 306 to the multi-level encoder 328, and the multi-level encoder 328 encodes it and provides it to the transmitter 202. A programmable frequency pulse generator 326 may generate instructions (which may be sometimes referred to as pulses or as a train of pulses) for the burst event and pulse manager 318. The programmable frequency pulse generator 326 may be programmed to indicate how often the train of pulses is output to the transmitter 202 through the communication port 266, during guard time of a registration period, during guard time in mission mode, or during a time period when there is no presence of data. Processed pulse 324 output by the burst event and pulse manager 318 may be passed to a multi-level encoder 328 which may encode the pulse and output a processed pulse (or an encoded pulse) which is then transmitted to the transmitter 202 via the communication ports 266. The multi-level encoder 328 may be a block configured to output a multi-level logic signal. In the specific case of a PON application, a logic low level indicates an upcoming high data rate burst, a mid-logic level may indicate an upcoming low data rate burst, and a high-logic level may indicate a host reset, and/or internally generated pulse train. The output of the burst event and pulse manager 318 may also be passed to the limiting amplifier signal recovery stage 302 (e.g., as a signal 320) and the signal conditioner 216 (e.g., as a signal 322). For example, in the case where the signal conditioner 216 is a CDR, the signal 322 may be used to allow data to be applied at the CDR's input stage only after the pulse 838 in FIG. 8A and pulse 891 in FIG. 8B have completed (i.e., the DC offset is removed by the signal recovery stage 302 prior to forwarding the signal to the CDR). It should also be noted that the widths of pulses 838 and 891 are programmable.

Figure 4A:
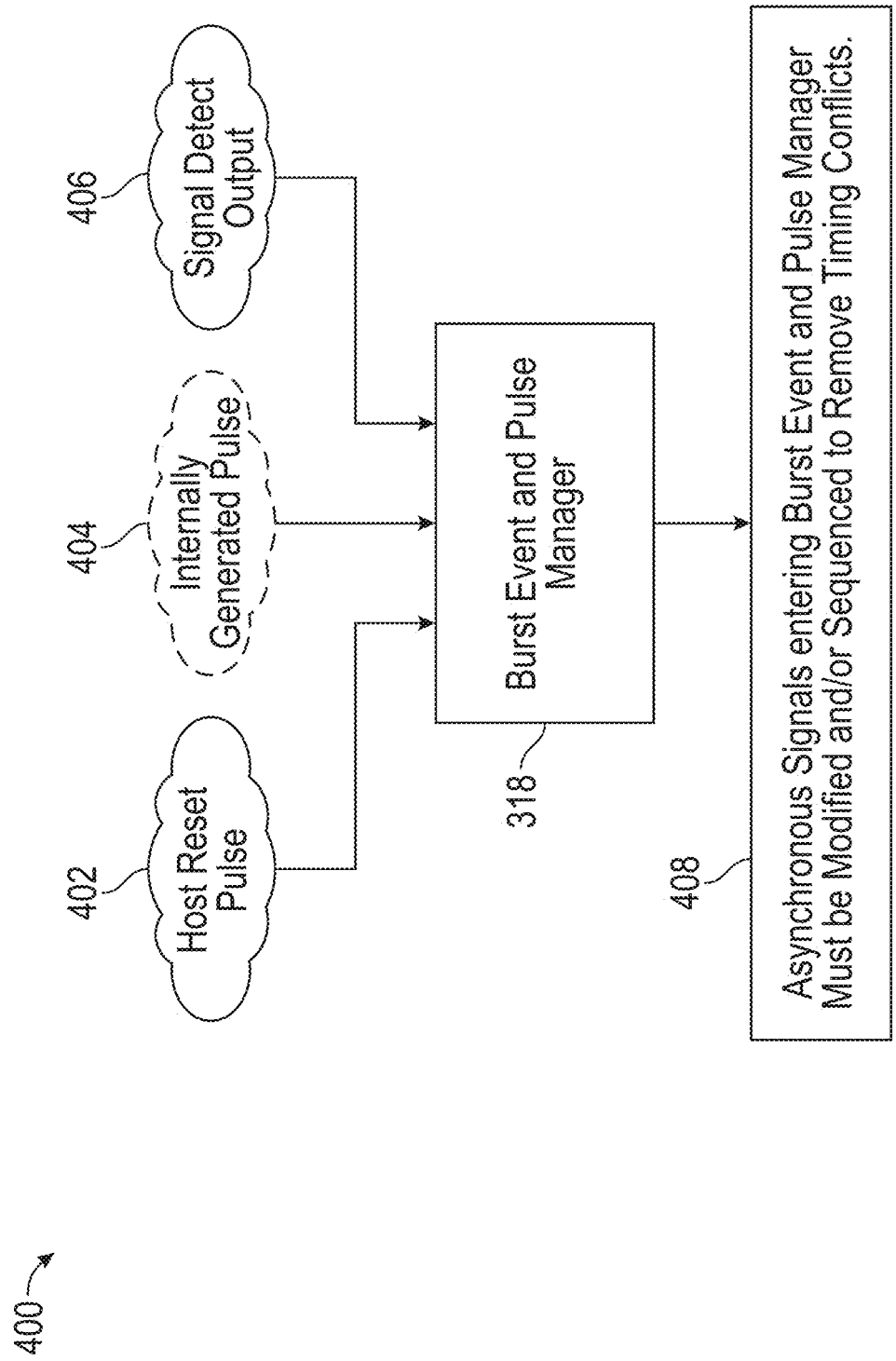
FIG. 4A shows a schematic diagram of an example of an architecture for handling asynchronous signals by the burst event and pulse manager.

FIG. 4A shows a schematic diagram of an example of an architecture 400 for handling asynchronous signals by the burst event and pulse manager 318. The asynchronous signals may include a host reset pulse 402 (e.g., a host reset signal from the host reset 230), an internally generated instruction 404 (e.g., a signal or a pulse generated by the pulse generator 326; 326S; or a pulse of 326S), and a signal detect output 406 (e.g., a signal generated by the on-chip signal detect circuit 220; 220S; or a pulse of 220S). The burst event and pulse manager 318 may modify and/or sequence the asynchronous signals to remove any potential timing conflicts between the signals (see the block 408). For example, when a host issues a reset signal when there is a start of transmission, during transmission, or end of a transmission, the internally generated instruction may be triggered asynchronously. The burst event and pulse manager 318 may delay a rising edge of a signal, delay a falling edge of the signal, delay (shorten or lengthen) the width of the signal, or extend the signal. In some aspects, delaying a rising/falling edge of a signal may include changing a rising/falling edge of the signal with respect to time (e.g., moving the rising/falling edge to an earlier time or to a later time).

Figure 4B:
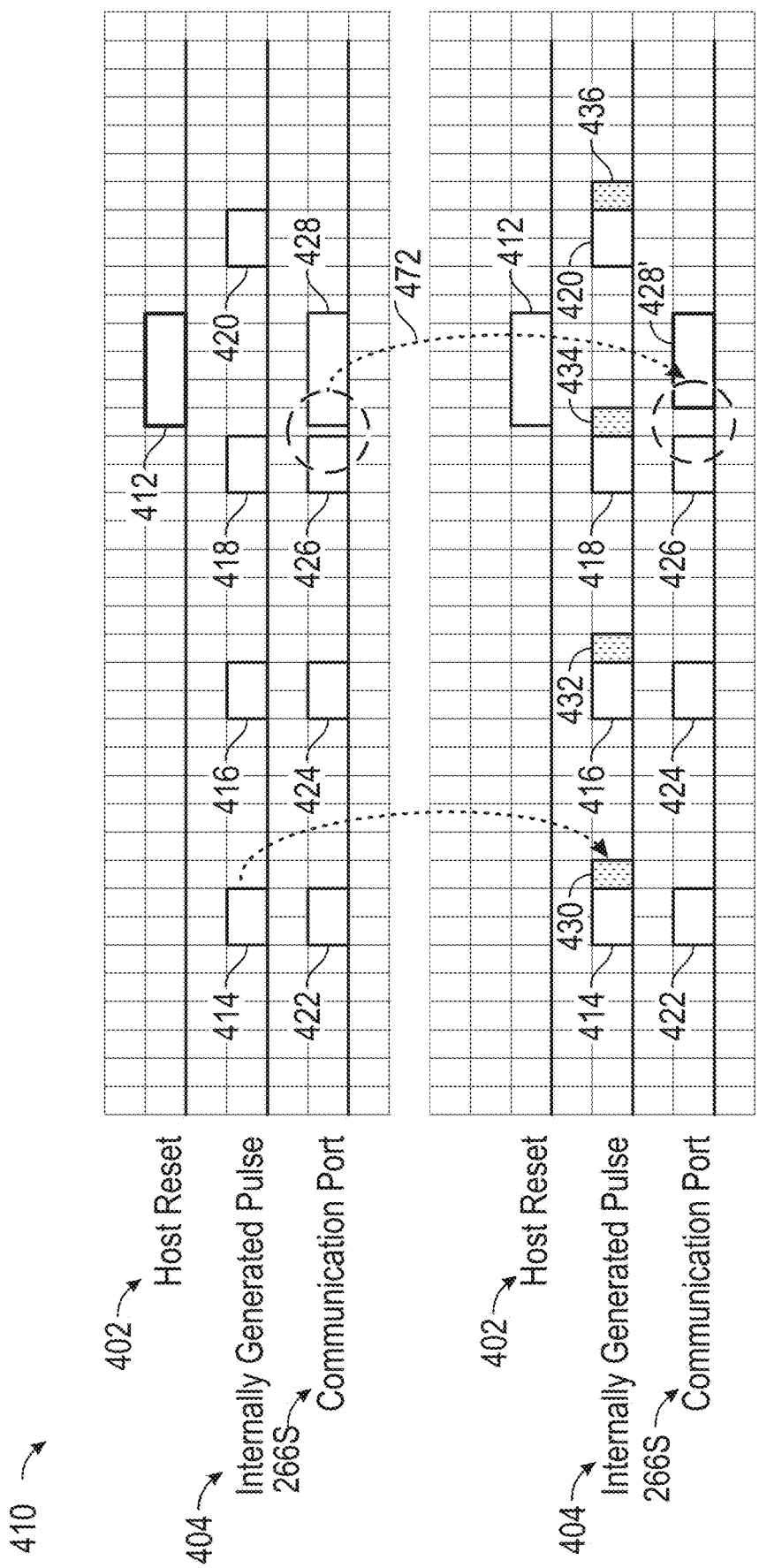
FIG. 4B shows a waveform diagram for an example scenario with a timing conflict.

FIG. 4B shows a waveform diagram for an example scenario 410 with a timing conflict. In this example, the host reset signal 402 includes a pulse 412, the internally generated instruction 404 includes pulses 414, 416, 418 and 420, and the communication port signal 266S includes pulses 422, 424, 426 and 428. The pulse 412 conflicts with (e.g., the signal is too close to) the internally generated instruction 418; hence, a specific portion of the front end of the pulse 428 (which is from the pulse 412) may be chopped, resulting in the pulse 428' (see a process 472). The burst event and pulse manager 318 may process the signals/pulses 402 and 404 (e.g., delaying, adjusting, shortening, or extending the pulses), to ensure that the signal output to the transmitter device, via the communication port 266, achieves a steady state level for a required period of time. For example, the burst event and pulse manager 318 may include an intentional gap between the pulses 426 and 428'. The nature of the gap may depend on whether the transmitter 202 requires a steady state low or a steady state high, and/or may be user programmable.

Figure 4C:
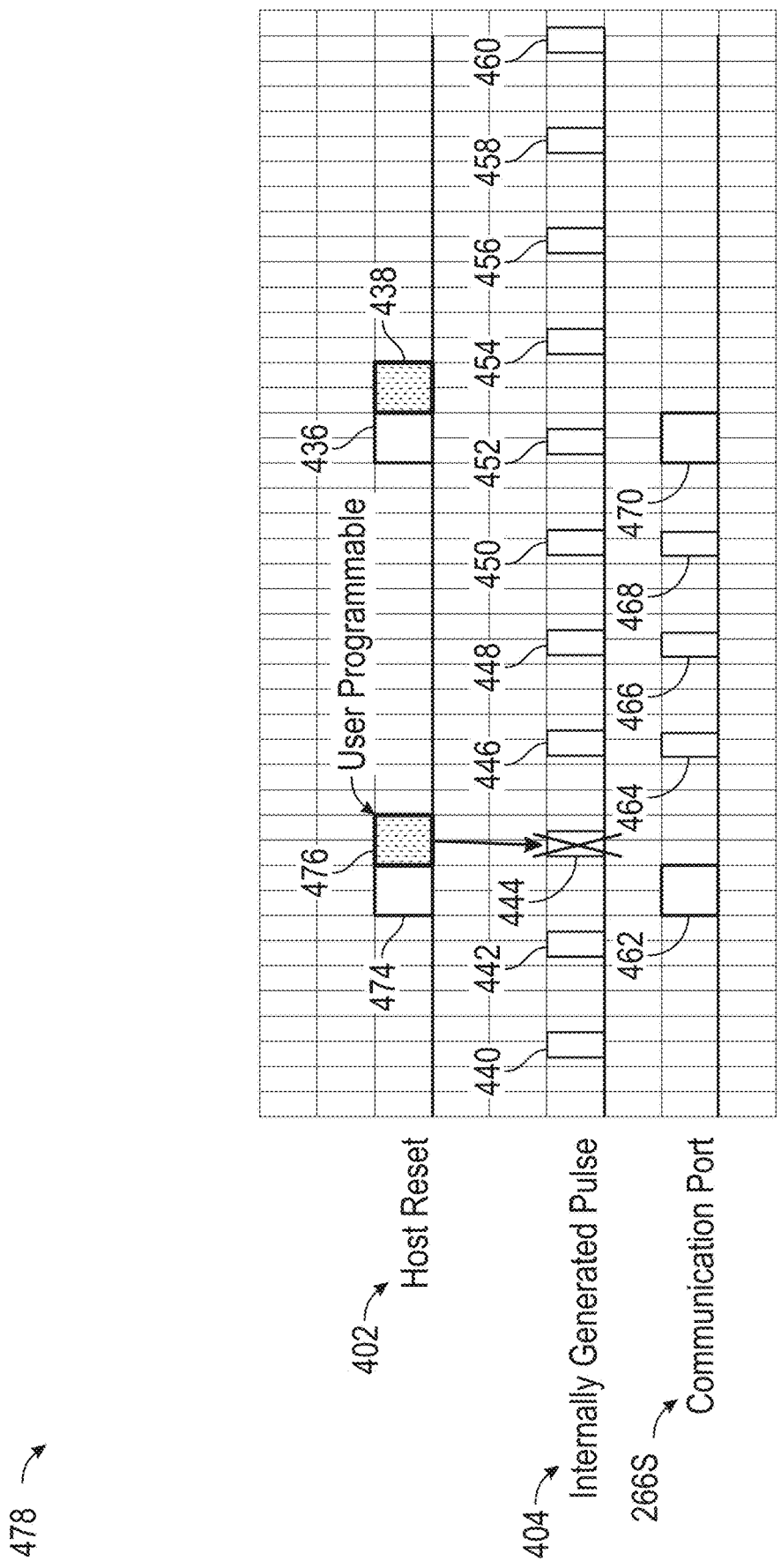
FIG. 4C shows a waveform diagram for another example scenario with a timing conflict.

FIG. 4C shows a waveform diagram for another example scenario 478 with a timing conflict. The internally generated instruction 404 includes pulses 440, 442, 444, 446, 448, 450, 452, 454, 456, 458, and 460. The host reset 402 includes pulses 474 and 436. The communication port 266 includes pulses 462, 464, 466, 468 and 470. The internally generated instruction 444 conflicts with (i.e., is too close to) the host reset pulse 474; hence, a specific portion of the front end of the pulse 444 may be chopped or all of the pulse 444 may be removed (e.g., the pulse 444 is completely removed as shown in FIG. 4C). To handle this situation, the burst event and pulse manager 318 may include intentional gaps 476 and 438 after the host reset pulses 432 and 436, respectively. The intentional gaps may be user programmable.

Figure 5A:
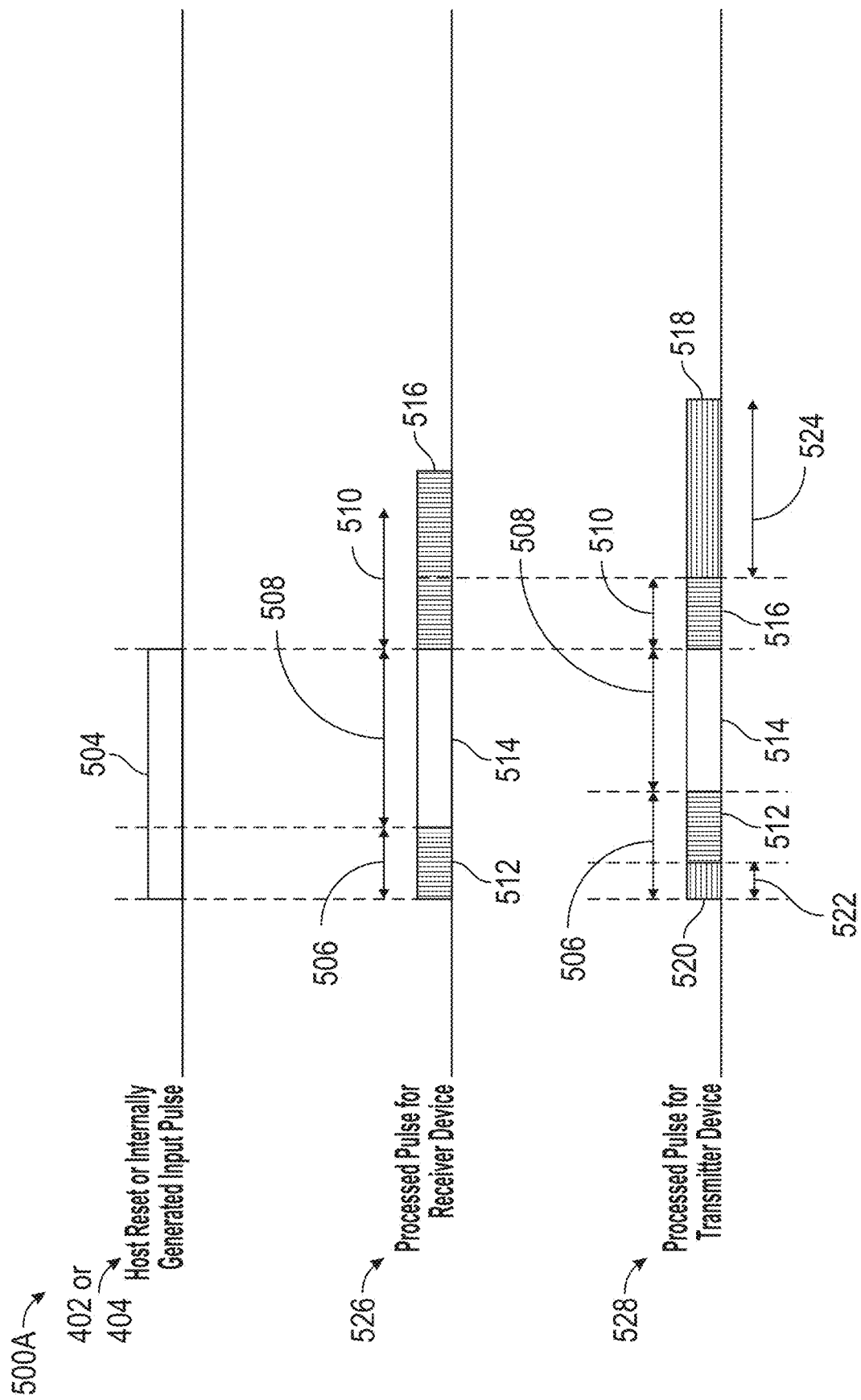
FIG. 5A is a waveform diagram for an example modification of a host issued reset or an internally generated instruction by a burst event and pulse manager.

FIG. 5A is a waveform diagram for an example modification 500A of a host issued reset or an internally generated instruction by the burst event and pulse manager 318. A pulse 504 corresponds to a host reset 402 or the internally generated instruction 404. The burst event and pulse manager 318 may process (or modify) the pulse 504 to produce a processed pulse 526 for the receiver 204 and/or a processed pulse 528 for the transmitter 202. The burst event and pulse manager 318 may process (or modify) the pulse 504 by, for example, delaying a rising edge of the pulse 504, modifying (shortening or lengthening) the width of the pulse 504, delaying a falling edge of the pulse 504, delaying a rising edge of the processed pulse 526, or delaying a falling edge of the processed pulse 526. The burst event and pulse manager 318 may provide the processed pulse 526 to other components of the receiver 204 (e.g., the limiting amplifier signal recovery stage 302 and/or the signal conditioner 216).

The burst event and pulse manager 318 may provide the processed pulse 528 to the pulse negotiation and communication management controller 210 of the transmitter 202 (e.g., via the multi-level encoder 328 and the communication ports 266).

The processed pulse 526 may include a portion 512, a portion 514, a portion 516, some combination thereof, or all portions thereof. In this example, the process pulse 526 may have a width 506 that may include a programmable delay versus a rising edge of the incoming pulse 504, a width 508 that may include a programmable width versus the incoming pulse 504, a width 510 that may include a programmable delay versus a falling edge of the incoming pulse 504, some combination thereof, or all of the widths thereof, respectively.

The processed pulse 528 may include a portion 520, a portion 512, a portion 514, a portion 516, a portion 518, some combination thereof, or all portions thereof. In this example, the processed pulse 528 may have a width 522 that may include a programmable delay versus a rising edge of the processed pulse 526 for the receiver 204, a width for the portion 512 (which is a width obtained by subtracting the width 522 from a width 506), a width 508 that may include a programmable width versus the incoming pulse 504, a width 510 that may include a programmable delay versus a falling edge of the incoming pulse 504, a width 524 that may include a programmable delay versus a falling edge of the processed pulse 526 for the receiver 204, some combination thereof, or all of the widths thereof, respectively. In this example for the processed pulse 528, the width 506 may include a programmable delay versus a rising edge of the incoming pulse 504.

Figure 5B:
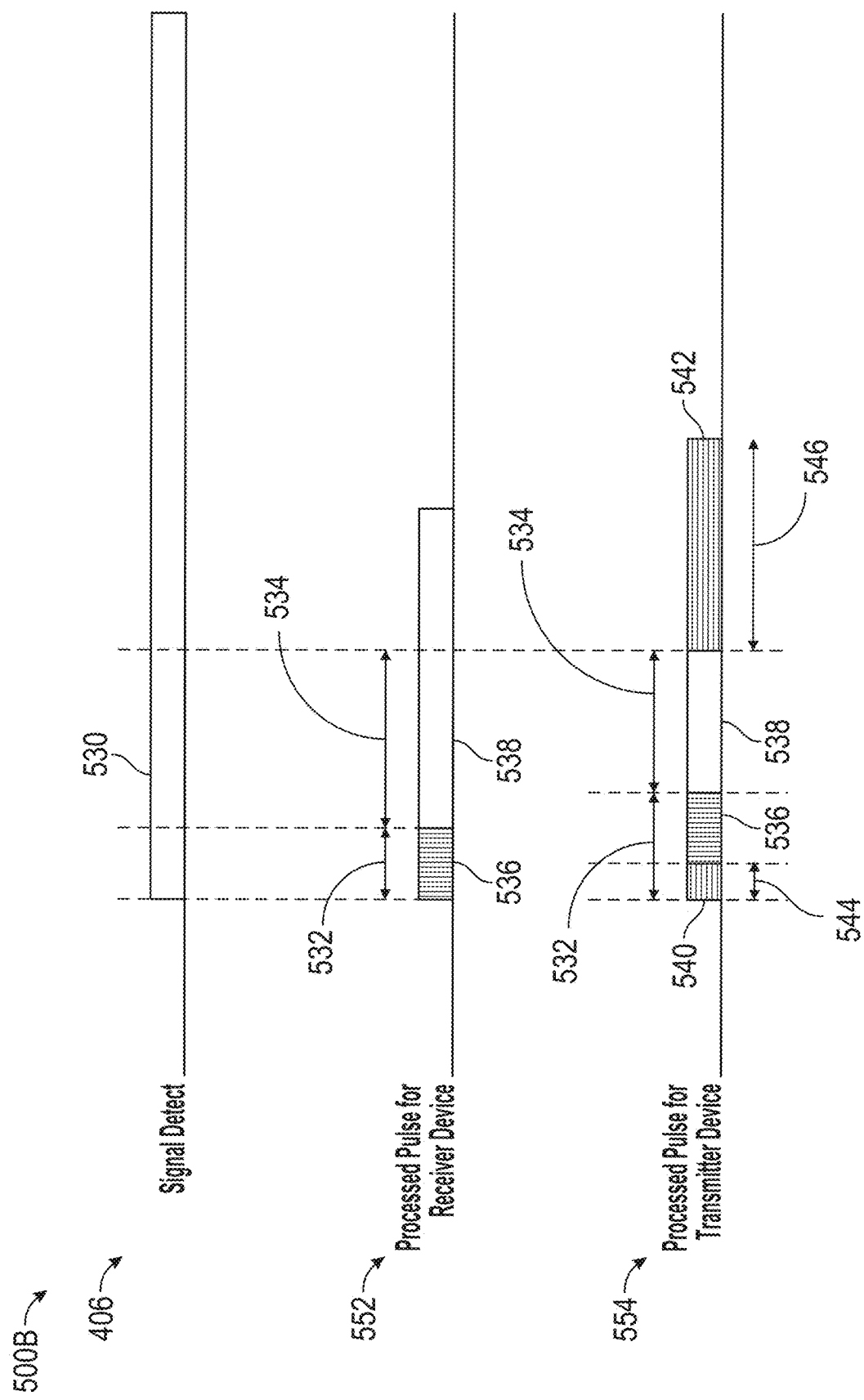
FIG. 5B is a waveform diagram for an example for utilization and manipulation of the output of the receiver's signal detect block by the burst event and pulse manager.

FIG. 5B is a waveform diagram for an example 500B for utilization and manipulation of the output of the receiver's signal detect circuit 220 by the burst event and pulse manager 318. When the signal detect circuit 220 of the receiver 204 detects a signal (e.g., 236 and 238) from the transmitter 202, the signal detect circuit 220 may generate a signal detect (or a signal detect signal) 406. The signal detect 406 may include a pulse 530. The burst event and pulse manager 318 may process the pulse 530 to generate a processed pulse 552 for the receiver 204 and/or a processed pulse 554 for the transmitter 202. The burst event and pulse manager 318 may provide the processed pulse 552 to other components of the receiver 204 (e.g., the limiting amplifier signal recovery stage 302 and/or the signal conditioner 216). The burst event and pulse manager 318 may provide the processed pulse 554 to the pulse negotiation and communication management controller 210 of the transmitter 202 (e.g., via the multi-level encoder 328 and the communication ports 266).

The processed pulse 552 may include a portion 536 having a width 532 that may include a programmable delay versus a rising edge of the incoming signal 530, a portion 538 having a width 534 that may include a programmable width, or some combination thereof. The processed pulse 554 may include a portion 540 having a width 544 that may include a programmable delay versus a rising edge of the processed receiver pulse 552, a portion 536 having a width obtained by subtracting the width 544 from a width 532, a portion 538 with a width 534 that may include a programmable width, a portion 542 having a width 546 that may include a programmable delay versus a falling edge of the processed receiver pulse 552, some combination thereof, or all of the portions thereof.

In connection with FIGS. 3, 5A and 5B and other figures, the processed pulses (e.g., 526 and/or 552) for the components of the receiver 204 may include the signals (e.g., 320 and/or 322 in FIG. 3, 838 in FIG. 8A, or 891 in FIG. 8B) generated and provided by the burst event and pulse manager 318 to the components of the receiver 204, such as the DC offset removal stage 212 (e.g., the limiting amplifier signal recovery stage 302) and/or the signal conditioner 216.

In connection with FIGS. 3, 5A and 5B and other figures, the processed pulses (e.g., 528 and/or 554) for the transmitter may include the signals (e.g., 310 in FIG. 3, or 266S in various figures) generated and provided by the burst event and pulse manager 318 to the components of the receiver 204 (e.g., the limiting amplifier signal recovery stage 302 and/or the signal conditioner 216).

Referring to FIGS. 4A to 5B, the burst event and pulse manager 318 may (i) delay and/or adjust a width of a host reset pulse 402 (e.g., 412 of FIG. 4B; 474 and 436 of FIG. 4C; 504 of FIG. 5A) relative to its proximity to an internally generated instruction 404 (e.g., 414, 416, 418, 420 of FIG. 4B; 440 to 460 in FIG. 4C; 504 of FIG. 5A), and/or (ii) delay and/or adjust a width of an internally generated instruction 404 relative to its proximity to a host reset pulse 402. The burst event and pulse manager 318 may be disposed within or outside the receiver 204. In some examples, if the burst event and pulse manager 318 is disposed outside the receiver 204, a receiver, a receiver device, or the like may include the receiver 204 (without 318) and another device (with 318).

Figure 6A:
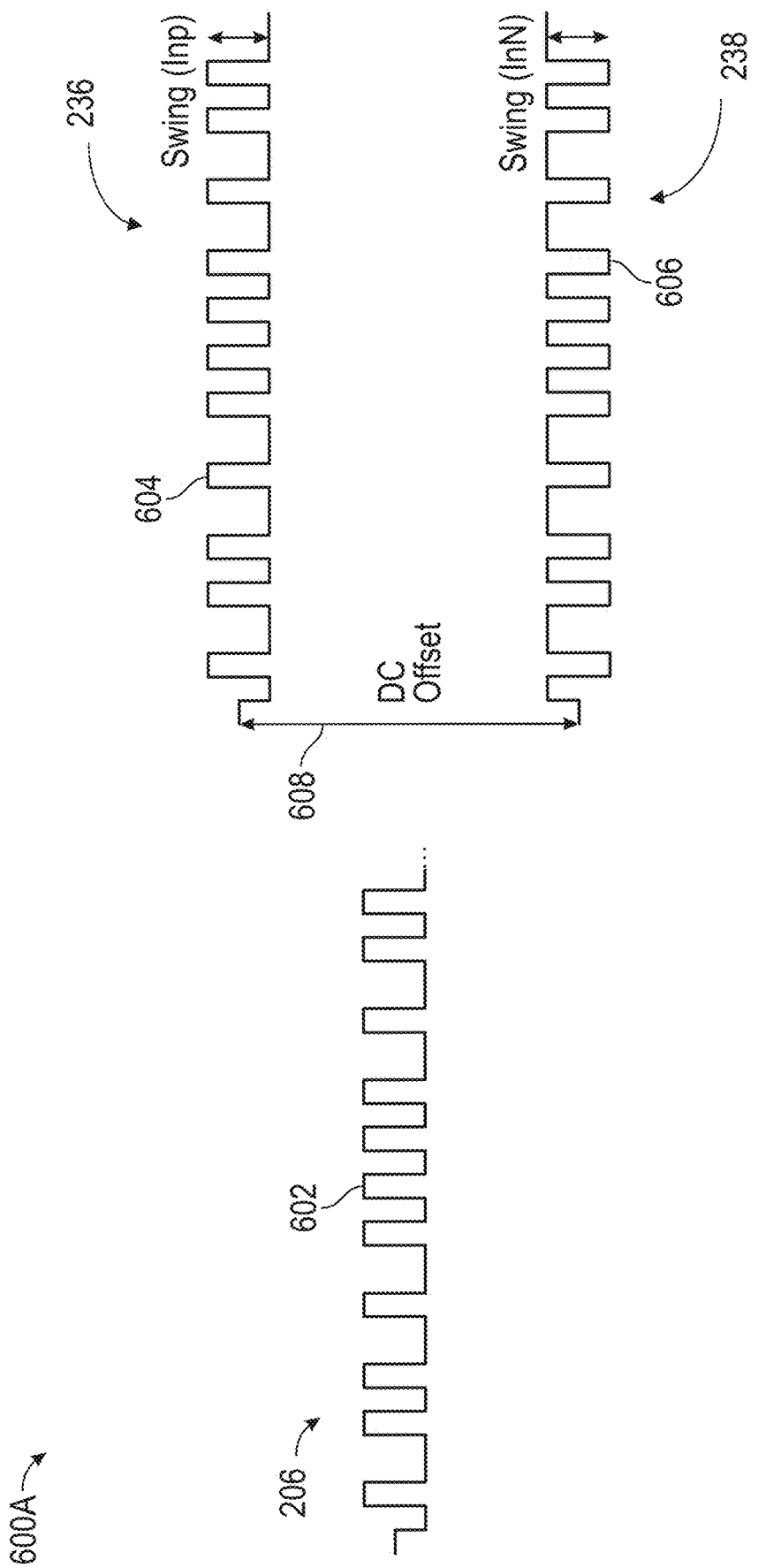
FIG. 6A shows example waveforms illustrating a DC offset.

FIG. 6A shows example waveforms 600A illustrating a DC offset. This example may illustrate a mission mode, where a host rest signal is provided. Waveform 602 may be an example of the burst mode input signal 206. Waveforms 604 and 606 may be examples of (i) the positive output signal 232 and the negative output signal 234, respectively, or (ii) the positive input signal 236 and the negative input signal 238, respectively. As shown in FIG. 6A, a DC offset 608 may refer to an offset or a difference (in DC) between the waveforms 604 and 606. In one or more aspects, a DC offset 608 may refer to a DC offset in amplitude or magnitude between the waveforms 604 and 606. In one or more examples, the DC offset is substantially larger than the swing (e.g., amplitude) of each of the waveforms 604 and 606. If the DC Offset less than the swing, then the impact could be excess jitter, decreased sensitivity, or bit errors output from the receiver device. If the DC Offset is greater than the swing, then the output signal may just appear toggled and prevent any portion of the incoming burst of data to be recovered. The notations "positive" and "negative" for the signals 232, 234 and 236 and 238 are relative terms, and they are not indicative of positive or negative numbers. In some examples, they may refer to two signals, where one is inverse of the other (e.g., when the waveform 604 is high, the waveform 606 is low, and vice versa; or when the waveform 604 is a non-inverted signal, the waveform 606 is an inverted signal, and vice versa).

In one or more examples, when a DC offset 608 is settled, the DC offset 608 is steady. A settled DC offset state may be understood in terms of the RC time constant (T) of the receiver device's input stage. A settled state may be quantified as being a change in voltage which occurs more than 5 times T, where T=RC. In one or more examples, when the waveforms 604 and 606 (e.g., output signals 232 and 234, or input signals 236 and 238) are settled, the swing of each of the waveforms 604 and 606 does not vary. An asymmetry between the positive and negative outputs of the transmitter could be considered a crossing point offset and an artifact which the receiver does not resolve. The foregoing provides non-limiting examples, and the subject technology is not limited thereto.

Figure 6B:
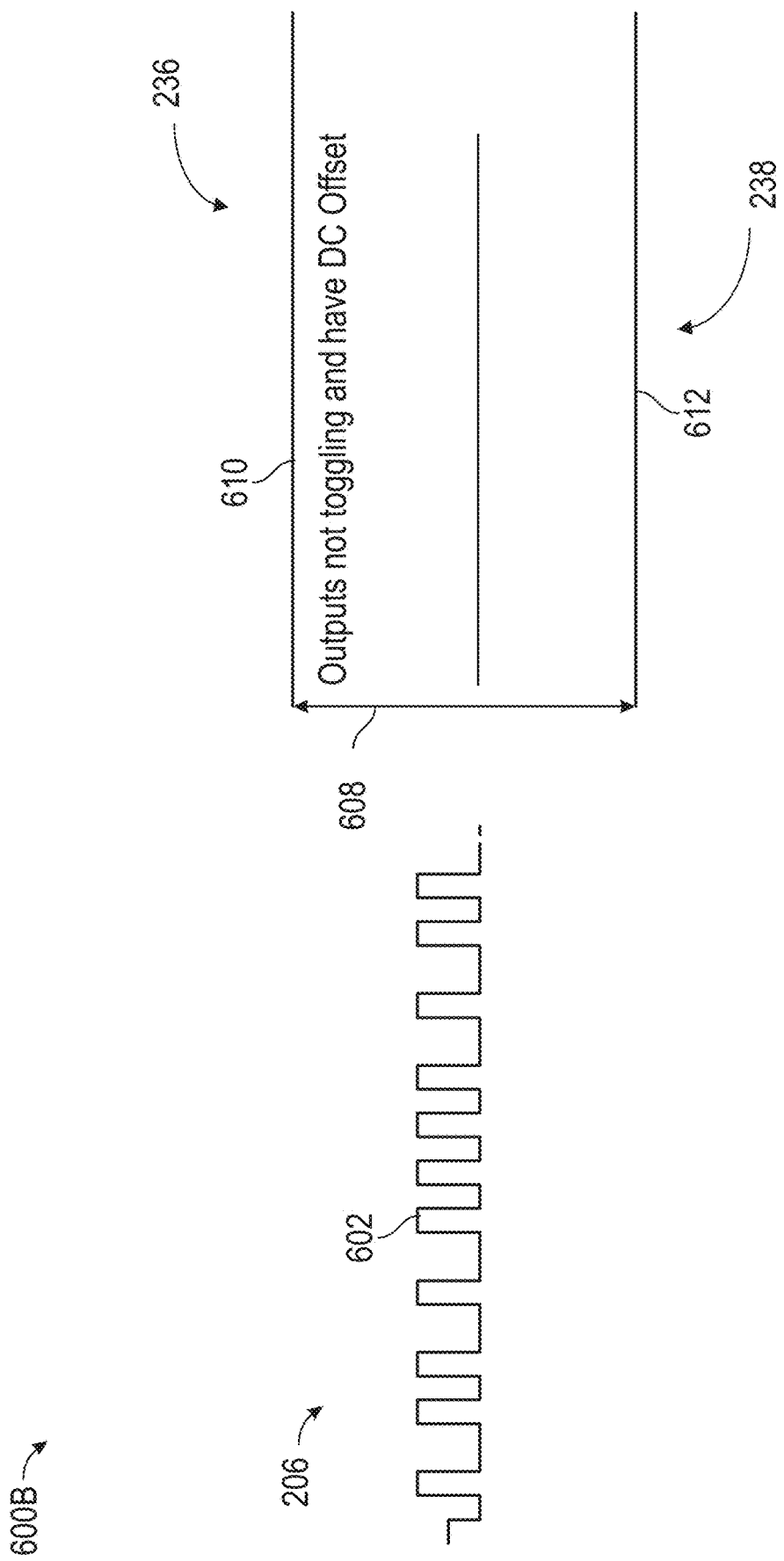
FIGS. 6B and 6C show example waveforms during a registration period, utilizing a signal conditioning and negotiation process.

FIG. 6B shows example waveforms 600B during a registration period, utilizing the signal conditioning and negotiation process. Waveform 602 may be an example of the burst mode input signal 206. Waveforms 610 and 612 may be examples of (i) the positive output signal 232 and the negative output signal 234, respectively, or (ii) the positive input signal 236 and the negative input signal 238, respectively. In this example, the waveforms 610 and 612 show no toggling. In other words, the waveforms are flat, showing no variation in the respective amplitude. However, there is a DC offset 608 between the waveforms 610 and 612.

Figure 6C:
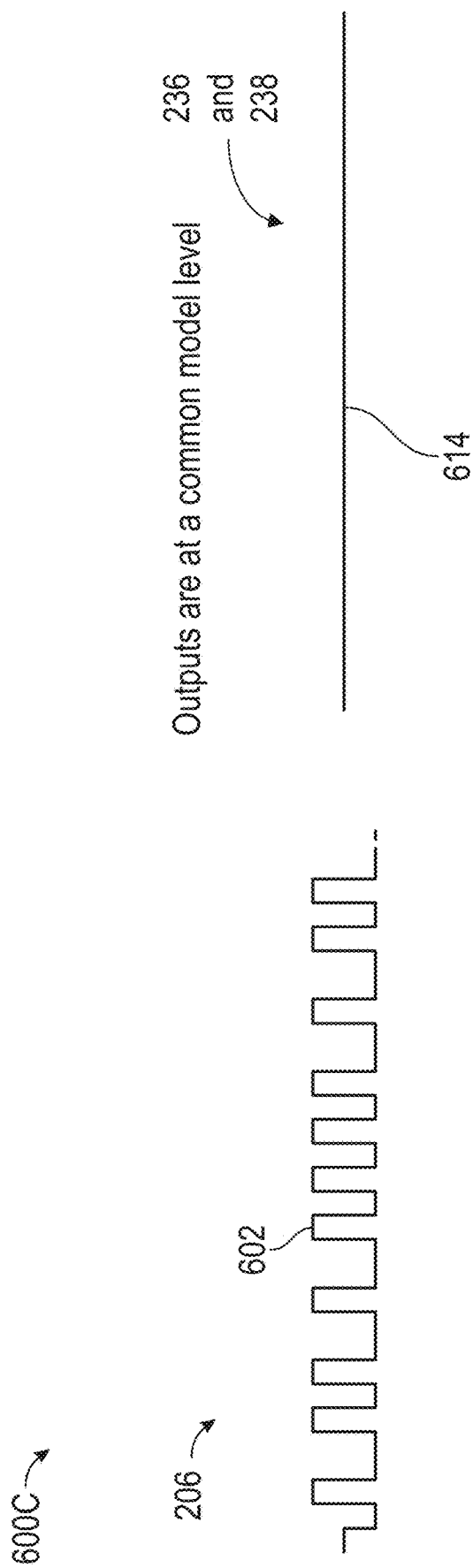

FIG. 6C shows other example waveforms 600C during a registration period, utilizing the signal conditioning and negotiation process. Outputs are at a common mode level. During this registration period, no host reset signal is provided. Waveform 602 may be an example of the burst mode input signal 206. Waveform 614 may be an example of (i) the positive output signal 232 and the negative output signal 234, respectively, or (ii) the positive input signal 236 and the negative input signal 238, respectively. In this example, the waveform 614 shows no toggling (e.g., no variation in amplitude) and is at a common mode (no DC offset).

A mission mode may be, for example, a normal operational mode (e.g., receiving, processing and/or sending information including user data). A registration mode (or period) is not a mission mode. A registration mode may be, for example, a mode (or period) in which the host is not aware and/or does not provide a signal (e.g., start of burst host reset) alerting the presence of a new burst of data.

Figure 7A:
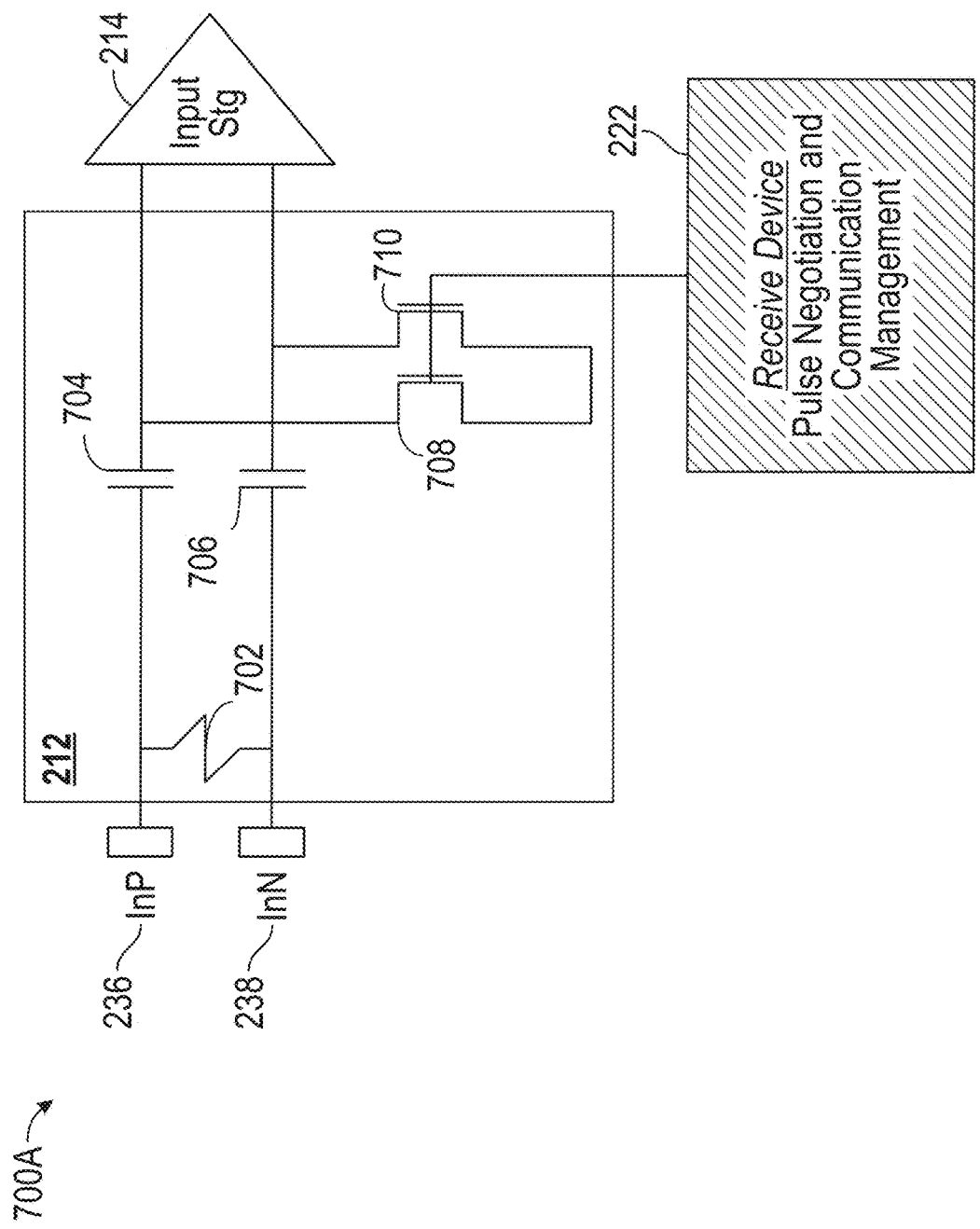
FIG. 7A is a block diagram of an example circuit including a DC offset removal stage.

FIG. 7A is a block diagram of an example circuit 700A including a DC offset removal stage 212. The DC offset removal stage 212 may include a resistor (or a termination resistor) 702, AC coupling capacitors 704 and 706, and switches 708 and 710. Each of the switches 708 and 710 may be one or more transistors. A transistor may be a metal oxide semiconductor field effect transistors (MOSFET) and/or a bipolar junction transistor (BJT).

The termination resistor 702 may be connected in parallel to the positive input 236 and the negative input 238. The AC coupling capacitor 704 may connect the positive input 236 to a first input of the input stage 214, and another AC coupling capacitor 706 may connect the negative input 238 to a second input of the input stage 214. Switches 708 and 710 may be coupled to the capacitors 704 and 706 and to the inputs of the input stage 214, respectively. The switches 708 and 710 may be used to short the AC coupling capacitors 704 and 706 and remove a DC offset on (or at) the input stage of the AC coupling capacitors 704 and 706. It should be noted that the example circuits described herein are for illustration. There may be other methods of connecting the transmitter outputs to the receiver inputs, including by component placement external to the devices.

In one or more examples, when the pulse negotiation and communication management controller 222 provides a trigger signal to the DC offset removal stage 212, the DC offset removal stage 212 may perform a DC offset removal process. For example, when the pulse negotiation and communication management controller 222 provides a trigger signal (e.g., a trigger pulse 838 in FIG. 8A) to the switches 708 and 710, the switches 708 and 710 may short the AC coupling capacitors 704 and 706. This shorting may thus discharge the AC coupling capacitors 704 and 706 and remove a DC offset (e.g., the DC offset 608 shown in FIG. 6A) present between the input signals 236 and 238.

Figure 7B:
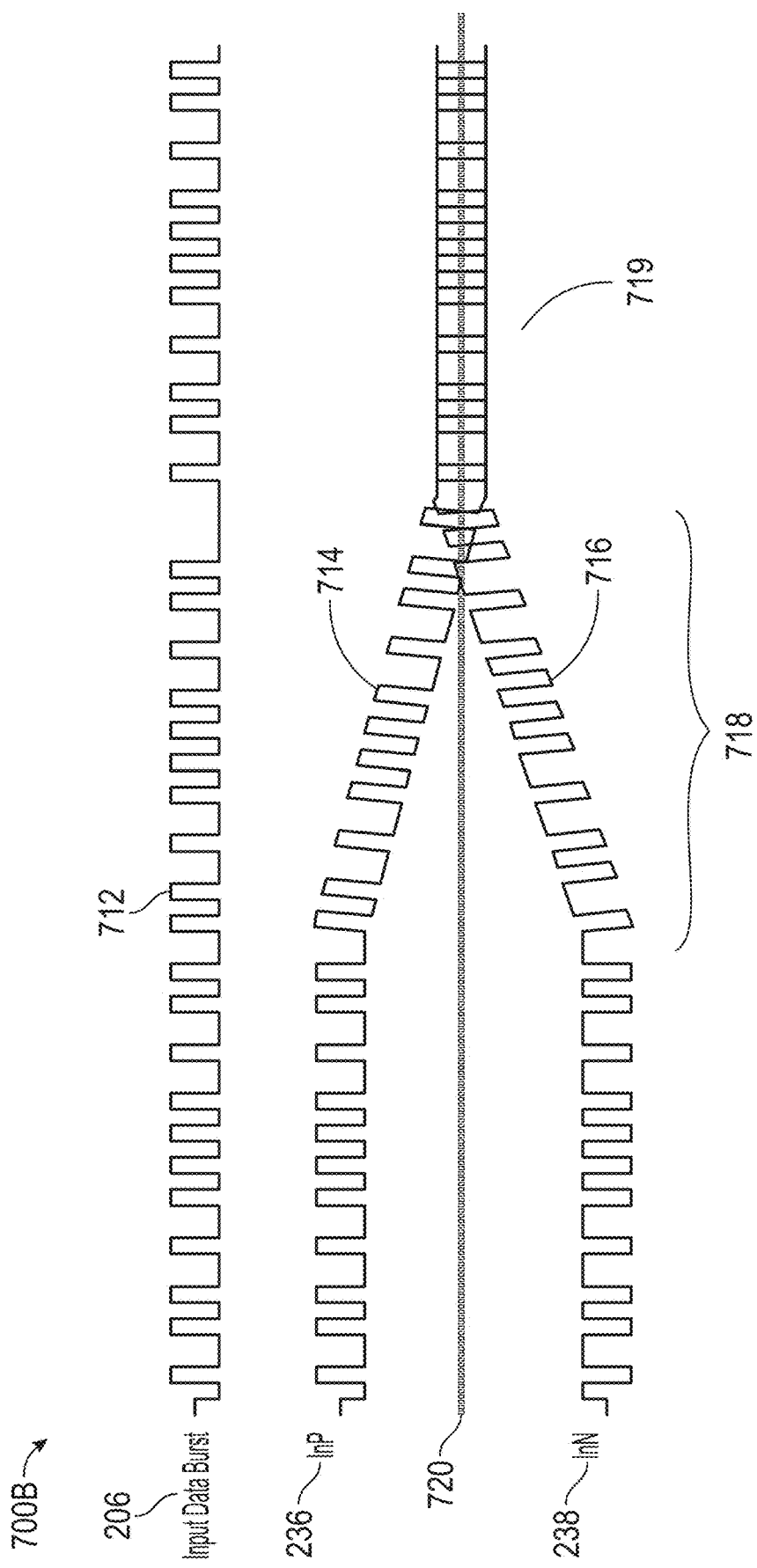
FIG. 7B shows example waveforms for the DC offset removal stage.

FIG. 7B shows example waveforms 700B for the DC offset removal stage 212. The input data burst 206 may include burst data signal or burst data pattern signal 712. The positive input 236 and the negative input 238 may include data signals 714 and 716, respectively.

Referring to FIGS. 7A and 7B, when the pulse negotiation and communication management controller 222 provides a trigger signal to the switches 708 and 710, the switches 708 and 710 may short (or discharge) the AC coupling capacitors 704 and 706 and remove all or part of the DC offset between the data signals 714 and 716, as illustrated by a process 718. Once the DC offset is removed, the data signals 714 and 716 have no DC offset between them (see the region indicated by the arrow 719).

FIG. 8A shows waveforms for an example communication scheme 800A during a registration mode.

Referring to the foregoing figures such as FIGS. 2A-2I, 3, 7A and 8A, the input 206 may include a data burst 802 followed by a registration mode data burst 804. The transmitter 202 may generate its output signals 232 and 234 that include a signal 806 followed by a signal 808. The host reset signal 230 received from a host may include a host reset pulse 810. This host reset pulse 810, however, is issued prior to entering into the registration mode. During the registration mode (e.g., a time period after receiving the registration mode data burst 804), a host reset pulse is not issued by the host. A registration mode data burst can be described as a data burst sent to the transmitter device without the presence of a start of burst reset. This start of burst reset is what differentiates a registration mode data burst and a mission mode data burst. The signal detect circuit 220 may generate a signal detect 220S that includes an assertion signal 812 followed by an assertion signal 814. An assertion signal may be sometimes referred to as an assertion pulse, a signal detect signal, or a signal detect circuit's assert signal.

Based on the assertion signal 812, the burst event and pulse manager 318 may generate and provide a capacitor discharge pulse 320 that may include a pulse 838. The pulse generator 326 may generate internally generated instructions 326S that include pulses 816, 818, 820, 822, 824, 826, 828, 830, 832, 834 and/or 836. The burst event and pulse manager 318 may generate and cause providing to the communication ports 266 one or more reset pulses (e.g., 840, 842 844, 846, 848 and/or 850) based on the internally generated instructions 326S (e.g., 822, 824, 826, 828, 830 and/or 832) and/or host-issued reset pulses (e.g., 810). Each of the communication ports 266 may receive/provide a communication port signal 266S that includes pulses (or result pulses) 839, 840, 842 844, 846, 848 and/or 850. The communication ports 266 may send these pulses to the pulse negotiation and communication management controller 210 of the transmitter 202.

The pulse negotiation and communication management controller 210 may decode and process one or more pulses received from the communication ports 266 (e.g., 840, 842 844, 846, 848 and/or 850) and provide one or more reset pulses (based on the one or more received pulses) and/or communication signaling scheme internal to the transmitter device, to the amplifier and/or signal conditioner 208. In this way, when the amplifier and/or signal conditioner 208 receives an input signal 206 (e.g., a burst of data 804), the amplifier and/or signal conditioner 208 is ready to convert the input signal to the output signals 232 and 234 (e.g., a signal 808) based on the reset pulse provided by the pulse negotiation and communication management controller 210. Sending pulses from the receiver 204 to the transmitter 202 through port 266 may keep the transmitter 202 in a periodic alert state so that when a new burst of data appears at its input 206 in registration mode (i.e., no host issued start of burst reset), the block 208 can behave in the same or similar way as if the host would have issued a start of burst reset (e.g., mission mode).

The receiver 204 (e.g., the output stage 218) may generate an output signal 226 (e.g., 224 and 228) that includes a data burst 852 followed by a gap 854 and valid data 856.

Example processes in connection with the arrows labeled (1), (2), (3) and (4) in FIG. 8A are described below.

A first example process in connection with the arrow labeled (1) in FIG. 8A may include the following: When the signal detect circuit 220 de-asserts (e.g., stops the assertion signal 812), a self-generated train of reset pulses (e.g., 840, 842, 844, 846, and/or 848), is sent through the communication ports 266.

The aforementioned first example process involving the arrow labeled (1) may be described in more detail as below. In one or more examples, when the signal detect circuit 220 stops providing its assertion signal 812 to the burst event and pulse manager 318, the burst event and pulse manager 318 may process (or modify) one or more of the internally generated instruction 326S (e.g., 822, 824, 826, 828, and/or 830) and provide the one or more processed pulses to the multi-level encoder 328. The multi-level encoder 328 may encode the one or more processed pulses and provide the one or more encoded pulses as the self-generated train of reset pulses (e.g., 840, 842, 844, 846, and/or 848) to the communication port 266 of the receiver 204. The communication port 266 of the receiver 204 may provide the one or more encoded pulses as the self-generated train of reset pulses (e.g., 840, 842, 844, 846, and/or 848) to the pulse negotiation and communication management controller 210 of the transmitter 202 via the communication port 266 of the transmitter 202.

Second and third example processes in connection with the arrows labeled (2) and (3) in FIG. 8A may include the following: A new burst of data 804 (which is the registration mode data burst) may appear shortly before a self-generated pulse 848 is sent to the transmitter 202. This causes the transmitter 202 to begin outputting a valid electrical signal 808 with sufficient amplitude to trigger the signal detect circuit 220 to assert its assertion pulse 814. (See the arrow labeled (2)) To ensure that an optimal gain setting of the transmitter 202 is achieved, one or more pulses (e.g., a pulse 850) may be sent to the transmitter 202 after the signal detect circuit 220 generates the assertion signal 814. (See the arrow labeled (3))

The aforementioned second and third processes involving the arrows labeled (2) and (3) may be described in more detail as below. In one or more examples, the transmitter 202 may receive the new burst of data 804 as an input 206. This may occur before the pulse negotiation and communication management controller 222 sends the self-generated pulse 848 to the pulse negotiation and communication management controller 210 via the communication ports 266 (as illustrated above as part of the process involving the arrow labeled (1)). The self-generated pulse 848 may be generated by the burst event and pulse manager 318 and the multi-level encoder 328 in that the burst event and pulse manager 318 may process (or modify) one or more of the internally generated instructions 326S (e.g., the pulse 830) and provide one or more processed pulses to the multi-level encoder 328. The multi-level encoder 328 may encode the one or more processed pulses and provide the one or more encoded pulses (e.g., as the self-generated pulse 848) to the communication port 266 of the receiver 204. The communication port 266 of the receiver 204 may provide the one or more encoded pulses (e.g., the pulse 848) to the pulse negotiation and communication management controller 210 of the transmitter 202 via the communication port 266 of the transmitter 202. The pulse negotiation and communication management controller 210 may decode and process one or more pulses received from the communication ports 266 (e.g., the pulse 848) and provide one or more pulses (e.g., a pulse based on the pulse 848) to the amplifier and/or signal conditioner 208.

The amplifier and/or signal conditioner 208 of the transmitter 202 may process the burst of data 804 using the one or more pulses (e.g., a pulse based on the pulse 848) and output the valid electrical signal 808 as output signals 232 and 234 with sufficient amplitude. When the signal detect circuit 220 detects the signal 808, the signal detect circuit 220 may generate the assertion pulse 814 and provide the assertion pulse 814 to the burst event and pulse manager 318. The burst event and pulse manager 318 may then process (or modify) one or more of the internally generated instructions 326S (e.g., the pulse 832) and provide one or more processed pulses to the multi-level encoder 328. The multi-level encoder 328 may encode the one or more processed pulses and provide the one or more encoded pulses (e.g., the pulse 850) to the communication port 266 of the receiver 204. The communication port 266 of the receiver 204 may provide the one or more encoded pulses (e.g., the pulse 850) to the pulse negotiation and communication management controller 210 of the transmitter 202 via the communication port 266 of the transmitter 202. The pulse negotiation and communication management controller 210 may decode and process one or more pulses received from the communication ports 266 (e.g., the pulse 850) and provide one or more pulses (e.g., one or more pulses based on the pulse 850) to the amplifier and/or signal conditioner 208 so that the transmitter 202 may, for example, provide an optimal gain setting for its input signal 206.

A fourth example process in connection with the arrow labeled (4) in FIG. 8A may include the following: A pulse 838 may be sent to discharge the on-chip AC coupling capacitors after the last reset pulse 850 is sent to the transmitter 202.

The aforementioned fourth process involving the arrow labeled (4) may be described in more detail as below. When the signal detect circuit 220 detects the signal 808 and provides the assertion pulse 814 to the burst event and pulse manager 318 (as illustrated above as a part of the process involving the arrow labeled (3)), the burst event and pulse manager 318 may generate a trigger pulse 838 and provide the trigger pulse 838 to the switches 708 and 710 of the DC offset removal stage 212 (or the limiting amplifier signal recovery stage 302). The switches 708 and 710 may then discharge (or short) the AC coupling capacitors 704 and 706. As a result, a DC offset (e.g., the DC offset 608 shown in FIG. 6A) between the input signals 236 and 238 is removed, and the signal provided to the input stage 214 (e.g., signals 714 and 716 in the region indicated by the arrow 719) does not contain a DC offset. In this example, the burst event and pulse manager 318 may provide the trigger pulse 838 to the switches 708 and 710 after the reset pulse 850 is sent to the pulse negotiation and communication management controller 210 of the transmitter 202, as illustrated above as a part of the process involving the arrow labeled (3).

Referring to FIG. 8A, some of the internally generated instructions 326S (e.g., pulses 816, 818, 834 and 836) are marked with the notation X. In this example, the pulses marked with the notation X are not utilized in that while the pulse generator 326 generates these pulses (e.g., pulses 816, 818, 834 and 836), the burst event and pulse manager 318 does not process (or modify or use) these pulses in generating pulses to provide to the transmitter 202 or to the components (e.g., 302 or 216) of the receiver 204.

As described in connection with FIG. 8A, during a registration mode, the pulse negotiation and communication management controller 222 (e.g., the burst event and pulse manager 318) may generate and cause providing one or more reset pulses (e.g., 840, 842 844, 846, 848 and/or 850) to the transmitter 202 by processing one or more internally generated instructions 326S (e.g., 822, 824, 826, 828, 830, and/or 832) based on the signal detect signal 220S (e.g., assertion pulses 812 and/or 814) without receiving or using a host reset signal from a host. Furthermore, during the registration mode, the pulse negotiation and communication management controller 222 (e.g., the burst event and pulse manager 318) may generate a trigger signal (e.g., a trigger pulse 838) based on the signal detect signal 220S (e.g., an assertion pulse 814) to remove a DC offset of the input signals 236 and 238.

FIG. 8B shows waveforms for an example communication scheme 800B during a mission mode.

Referring to the foregoing figures such as FIGS. 2A-2I, 3, 7A and 8B, the input 206 may include a data burst 858 followed by another data burst 860. The data burst 860 is a mission mode data burst because of the presence of the start of burst host issued reset pulse 868. There are no registration mode data bursts. The transmitter 202 may generate its output signals 232 and 234 that include a signal 862 followed by a signal 864. The host signal decoder 316 may receive from a host the host reset signal 230 that may include a host reset pulse 866 followed by a host reset pulse 868. The signal detect circuit 220 may generate a signal detect 220S that includes an assertion signal 870 followed by an assertion signal 872. An assertion signal may be sometimes referred to as an assertion pulse, a signal detect signal, or a signal detect circuit's assert signal.

Based on the assertion signal 872, the burst event and pulse manager 318 may generate and provide a capacitor discharge pulse 320 that may include a pulse 891. The pulse generator 326 may generate internally generated instructions 326S that include pulses 874, 876, 878, 880, 882, 884, 886, 888, 890 and/or 892. The burst event and pulse manager 318 may generate and cause providing to the communication ports 266 (i) one or more pulses (e.g., 894, 896, 898 and/or 881) based on the internally generated instructions 326S (e.g., 880, 882, 884, and/or 886) as well as (ii) one or more reset pulses (e.g., 879 and/or 883) based on one or more host reset pulses (e.g., 866 and/or 868). Each of the communication ports 266 may receive/provide a communication port signal 266S that includes result pulses 879, 894, 896, 898, 881 and/or 883. The communication ports 266 may send these reset pulses to the pulse negotiation and communication management controller 210 of the transmitter 202.

The pulse negotiation and communication management controller 210 may decode and process one or more reset pulses received from the communication ports 266 (e.g., 879, 894, 896, 898, 881 and/or 883) and provide one or more reset pulses (based on one or more of the received reset pulses) to the amplifier and/or signal conditioner 208 so that when the amplifier and/or signal conditioner 208 receives an input signal 206 (e.g., a burst of data 860), the amplifier and/or signal conditioner 208 is ready to convert and process the input signal to the output signals 232 and 234 (e.g., a signal 864) based on the reset pulse provided by the pulse negotiation and communication management controller 210. For example, if the transmitter 202 receives a new burst of data shortly before receiving a reset pulse from the receiver 204, the transmitter 202 may generate its output of the new burst of data based on this reset pulse. This reset pulse may have been generated by the burst event and pulse manager 318 based on (i) an internally generated instruction (e.g., 894, 896, 898 or 881) or (ii) a host reset signal (e.g., 868).

The receiver 204 (e.g., the output stage 218) may generate an output signal 226 (e.g., 224 and 228) that includes a data burst 885 followed by a gap 887 and valid data 889.

Example processes in connection with the arrows labeled (1), (2), and (3) in FIG. 8B are described below.

A first example process in connection with the arrow labeled (1) in FIG. 8B may include the following: when the signal detect circuit 220 de-asserts (e.g., 870), which indicates a loss of signal or no signal status, a self-generated train of reset pulses (e.g., 894, 896, 898, and/or 881), is sent through the communication ports 266. It should be noted that the time after the falling edge of 870 and/or 879 to the time when the internally generated pulses are allowed to pass through the communication port, may be programmable.

The aforementioned first example process involving the arrow labeled (1) may be described in more detail as below. In one or more examples, when the signal detect circuit 220 stops providing its assertion signal 870 to the burst event and pulse manager 318, the burst event and pulse manager 318 may process (or modify) one or more of the internally generated instructions 326S (e.g., 880, 882, 884, 886, and/or 888) and provide the one or more processed pulses to the multi-level encoder 328. The multi-level encoder 328 may encode the one or more processed pulses and provide the one or more encoded pulses as the self-generated train of reset pulses (e.g., 894, 896, 898, and/or 881) to the communication port 266 of the receiver 204. The communication port 266 of the receiver 204 may provide the one or more encoded pulses as the self-generated train of reset pulses (e.g., 894, 896, 898, and/or 881) to the pulse negotiation and communication management controller 210 of the transmitter 202 via the communication port 266 of the transmitter 202.

The pulse negotiation and communication management controller 210 may decode and process one or more pulses received from the communication ports 266 (e.g., 894, 896, 898, and/or 881) and provide one or more reset pulses (based on one or more of the received pulses) to the amplifier and/or signal conditioner 208 so that if the amplifier and/or signal conditioner 208 receives a new burst of data as the input signal 206, the amplifier and/or signal conditioner 208 will be ready to convert the input signal to the output signals 232 and 234 based on the reset pulse provided by the pulse negotiation and communication management controller 210. In this example, however, since there is no new burst of data received during this time period (T1), these reset pulses (e.g., 894, 896, 898, and/or 881) are not used by the amplifier and/or signal conditioner 208 to convert the input signal to the output signals 232 and 234. When the transmitter receives a pulse via the communication port, it assumes a new data burst is present or is about to appear and re-configures itself into a ready state to set its input signal conditioning features (e.g., gain, offset control, bandwidth setting) for a specific but relatively short period of time (this period of time could vary depending on the application and/or transmitter design). When no data is present (e.g., T1), each time the transmitter receives a pulse, it may reconfigure itself and attempt to adjust its signal conditioning features. But with no data present, its outputs will remain unmodified. This in turn leaves the receiver's signal detect de-asserted, and which, in turn, causes the receiver to continue to output burst not present mode signaling 242 via the communication port. This will continue happening until a new data burst actually appears which will prompt the transmitter to begin toggling its outputs which will cause the receiver's signal detect block to assert a signal is present.

Second and third example processes in connection with the arrows labeled (2) and (3) in FIG. 8B may include the following: A new burst of data 860 may appear shortly before a host reset pulse 868 is received (or issued). This host reset signal 868 is forwarded as a reset pulse 883 (see the arrow labeled (2)) to the transmitter 202 through the communication ports 266. The signal detect circuit 220 may issue an assertion pulse (or a signal detect pulse) 872 after a falling edge of the host reset pulse 868 when the transmitter 202's output signals 232 and 234 are settled. The assertion pulse 872 may be subsequently internally used and cause a pulse 891 (see the arrow labeled (3)) to discharge the on-chip AC coupling capacitors 704 and 706. In the mission mode, no self-generated pulse (e.g., the pulses marked with the notation X, such as the pulses 874, 876, 890, 892 and 893) may be allowed to be output (e.g., to the transmitter 202) while the signal detect signal 220S is asserted (e.g., during the time periods the assertion pulses 870 and 872 are present).

The aforementioned second and third processes involving the arrows labeled (2) and (3) may be described in more detail as below. In one or more examples, the transmitter 202 may receive the new burst of data 860 as an input 206. This may occur before the host signal decoder 316 receives the host reset pulse 868 from the host. When the host signal decoder 316 receives the host reset pulse 868, the host signal decoder 316 provides the host reset pulse 868 to the burst event and pulse manager 318. The burst event and pulse manager 318 may select and process (or modify) the host reset pulse 868 instead of an internally generated instruction 326S. The burst event and pulse manager 318 may provide the processed pulse to the multi-level encoder 328. The multi-level encoder 328 may encode the processed pulse and provide the encoded pulse (e.g., the host reset pulse 883) to the communication port 266 of the receiver 204. (See the arrow labeled (2)). The communication port 266 of the receiver 204 may provide the pulse (e.g., the pulse 883) to the pulse negotiation and communication management controller 210 of the transmitter 202 via the communication port 266 of the transmitter 202. The pulse negotiation and communication management controller 210 may decode and process the pulse received from the communication ports 266 (e.g., the pulse 883) and provide a signal (e.g., a pulse based on the pulse 883) to the amplifier and/or signal conditioner 208.

The amplifier and/or signal conditioner 208 of the transmitter 202 may process the burst of data 860 using one or more pulses (e.g., a pulse based on the pulse 883) and output the valid electrical signal 864 as output signals 232 and 234 with sufficient amplitude. The signal detect circuit 220 may issue an assertion pulse 872 after a falling edge of the host reset pulse 868 when the transmitter 202's output signals 232 and 234 are settled, and the signal detect circuit 220 detects the signal 864. The signal detect circuit 220 may then provide the assertion pulse 872 to the burst event and pulse manager 318. Based on the assertion pulse 872, the burst event and pulse manager 318 may generate and provide the trigger pulse 891 (see the arrow labeled (3)) to the switches 708 and 710 of the DC offset removal stage 212 (or the limiting amplifier signal recovery stage 302). The switches 708 and 710 may then discharge (or short) the AC coupling capacitors 704 and 706. As a result, a DC offset (e.g., the DC offset 608 shown in FIG. 6A) between the input signals 236 and 238 is removed, and the signal provided to the input stage 214 (e.g., signals 714 and 716 in the region indicated by the arrow 719) does not contain a DC offset. In this example, the burst event and pulse manager 318 may provide the trigger pulse 891 to the switches 708 and 710 after the reset pulse 883 is sent to the pulse negotiation and communication management controller 210 of the transmitter 202.

As described in connection with FIG. 8B, during a mission mode, the pulse negotiation and communication management controller 222 (e.g., the burst event and pulse manager 318) may generate and cause providing one or more reset pulses (e.g., 883) to the transmitter 202 by selecting and processing (or based on) a host reset signal 230 (e.g., the host reset pulse 868). The transmitter 202 may then generate its output signal (e.g., 864) based on a reset pulse (e.g., 883). Furthermore, during the mission mode, the pulse negotiation and communication management controller 222 (e.g., the burst event and pulse manager 318) may generate a trigger signal (e.g., a trigger pulse 891) based on the signal detect signal 220S (e.g., an assertion pulse 872) to remove a DC offset of the input signals 236 and 238.

While not illustrated in FIG. 8B, during a mission mode, if the transmitter 202 receives another burst of data as an input 206 shortly before the transmitter 202 receives a reset pulse (e.g., 894, 896, 898, or 881) generated based on an internally generated instruction 326S (e.g., 880, 882, 884, or 886), the amplifier and/or signal conditioner 208 of the transmitter 202 may produce its output (as output signals 232 and 234) based on the another burst of data using a pulse based on the recently received reset pulse (e.g., 894, 896, 898, or 881). Furthermore, during the mission mode, if the signal detect circuit 220 detects this output from the transmitter 202 and sends an assertion pulse (as a signal detect signal 220S) to the burst event and pulse manager 318, the burst event and pulse manager 318 may generate a trigger signal based on this assertion pulse to discharge the AC coupling capacitors 704 and 706 and remove a DC offset of the input signals 236 and 238.

Referring to FIGS. 2I, 8A and 8B, in one or more aspects, the burst present mode signaling 276 of FIG. 2I may correspond to a signaling mode M1 of FIGS. 8A and 8B. The burst not-present mode signaling 242 of FIG. 2I may correspond to a signaling mode M2 of FIGS. 8A and 8B.

Fast Burst Data Link Acquisition

In one or more examples, the fast burst data link acquisition process and system of the subject technology described herein can reduce the link negotiation time in scenarios where data is transmitted and received in bursts or at varying speeds.

In some approaches, for the clock and data recovery (CDR) retime mode, data signals of certain rates may require CDR blocks or units to recover the data signals. These blocks/units may often take a considerable amount of time to optimally align and lock to the incoming signal in order to be able to output a signal that is correct and error-free after the alignment and locking. A CDR's "full" lock acquisition period (e.g., both frequency and phase lock acquisition periods) may be greater than 10,000 times longer than a "partial" lock acquisition period (e.g., phase lock only acquisition). A full lock acquisition period may be sometimes referred to as a full CDR lock acquisition period. A partial lock acquisition period may be sometimes referred to as partial CDR lock acquisition period.

In some approaches, for the equalizer adaptation, data signals of certain data rates may require inter-symbol interference (ISI) jitter to be canceled by an equalizer within the downstream devices contained in a host media access control (MAC). This equalization may be performed by an adaptive continuous time linear equalizer (adaptive CTLE), a feed forward equalizer (FFE) or other type of equalizer that requires an adaptation algorithm to optimally adjust its boost and/or tap settings. The steps involved in a "full" adaptation procedure often take a considerable amount of time, so maintaining an adapted or "partially" adapted state in burst mode applications is advantageous.

In some examples, the fast burst data link acquisition process and system of the subject technology described herein may decrease the link negotiation timing by emulating a continuous mode data signal in applications which transmit data in bursts. In some examples, the emulation of continuous mode data may allow the downstream devices and/or passive components (e.g., a clock and data recovery (CDR) unit) to remain continuously and actively locked. In some examples, the emulation of continuous mode data may allow the downstream devices and/or passive components (e.g., continuous time linear equalizer (CTLE), adaptive continuous time linear equalizer (Adaptive CTLE), decision feedback equalizer (DFE), and feed forward equalizer (FFE)) to process a set of adjusted settings. In some examples, the emulation of continuous mode data may allow the downstream devices and/or passive components (e.g., alternating current (AC) coupling capacitors) to remain correctly charged.

In many cases, during periods when no data signal is being sent through a link, the devices along the path may return to a state that prevents them from quickly passing on a data signal when it appears. This issue is not limited to active devices in the data link but is also related to passive components (e.g., coupling capacitor charge times).

In some examples, the fast burst data link acquisition process and system of the subject technology described herein may advantageously allow devices and/or components (e.g., a host 950 in FIG. 9), which are downstream in the data link of the devices executing or implementing the subject technology, the ability to more promptly recover and/or pass the new burst of data signal.

Figure 9:
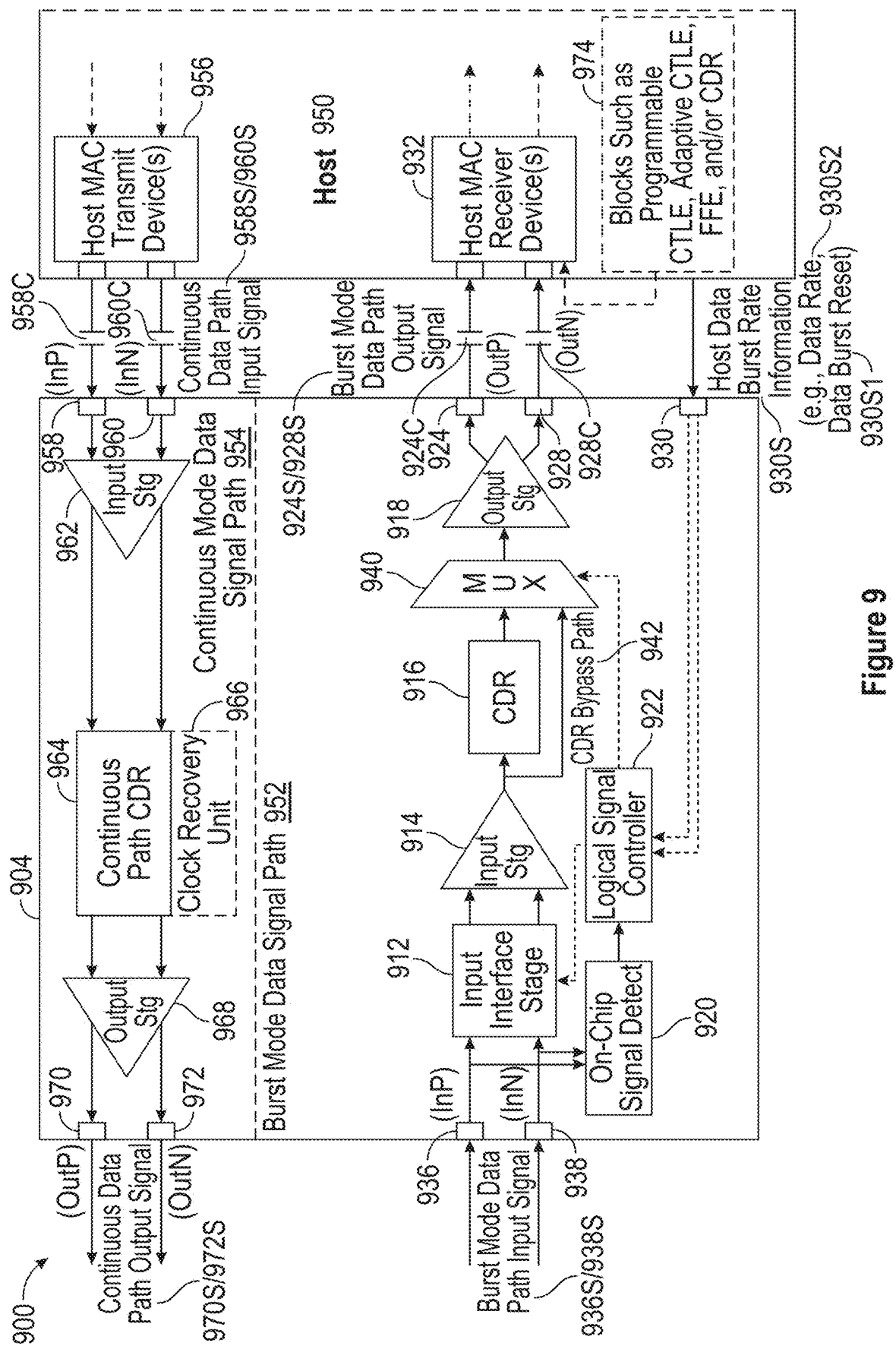
FIG. 9 shows an example diagram of a system in a passive optical network (PON) optical line terminal (OLT) module application with both continuous mode and burst mode data signal paths.

FIG. 9 shows an example diagram of a system for an optical line terminal (OLT) module in a passive optical network (PON) application with both continuous mode and burst mode data signal paths.

In FIG. 9, the terminal system 900 may include a device 904 and a host 950. The host 950 may be configured as a processor and may provide a host media access control (MAC). The terminal system 900 may have two paths, a burst mode data signal path 952 and a continuous mode data signal path 954. The burst mode data signal path 952 may be a data signal receiving path. The continuous mode data signal path 954 may be a data signal transmission path. In this disclosure, the burst mode (BM) data signal path may be referred to as a burst mode data path, a burst mode path, a BM path, a BM data path, a BM data signal device, a BM data signal component, a signal receiver, or a receiver. The burst mode data signal path 952 may represent, for example, a limiting amplifier. The continuous mode (CM) data signal path may be referred to as a continuous path, a continuous data path, a CM path, a CM data signal device, a CM data signal component, a signal transmitter, or a transmitter. For clarity, when the CM data signal path is referred to as a transmitter, this transmitter is different from the transmitter 202 of FIGS. 2A-2H.

In one or more aspects, a burst mode data signal path 952 is placed toward the host 950 such that a data signal in the burst mode data signal path 952 may travel toward the host 950. In one or more aspects, the continuous mode data signal path 954 is placed from the host 950 such that the continuous mode data signal path 954 may receive a data signal from the host. The data signal may then travel away from the host. Thus, a data signal in the burst mode data signal path 952 may travel in a first direction (e.g., toward the host 950) that is opposite to a second direction (e.g., away from the host 950) the data signal in continuous mode data signal path 954 travels. Data signals in a burst mode data signal path 952 may be burst mode data signals (e.g., burst X and burst X+1 illustrated in FIGS. 15-18) having a gap therebetween. For example, the burst mode data signals may be data signals which are in bursts with periods of time in between being dark or exhibiting no signal transitions, and may cause devices in the path (e.g., 952) to consume time to retrain, re-adapt, and/or re-lock internal blocks to be able to pass valid data upon the valid data becoming present. In contrast, data signals in a continuous mode data signal path 954 may be continuous mode data signals having uninterrupted signal transitions at a relatively fixed data rate which does not require devices in the path (e.g., 954) to retrain, re-adapt, and/or re-lock.

In the burst mode data signal path 952, the device 904 may receive a burst mode data path input signal 936S/938S from a transmitter (e.g., 202 of FIG. 2A). This transmitter is omitted in FIG. 9. This transmitter may have the same or substantially similar structure as the transmitter 202 described above. The burst mode data path input signal 936S/938S may have the same or similar characteristics as the burst mode input signal 236/238 as described above. The transmitter (e.g., 202 of FIG. 2A) may process a burst mode input signal 206 and provide an input signal to the device 904 as a differential input signal, including a positive input signal 936S and a negative input signal 938S. The input signals 936S and 938S may be sometimes referred to as a burst mode data path input signal or a differential burst mode data path input signal 936S/938S. In other signal paths shown in FIG. 9, although only a single line (instead of two lines (P) and (N)) is shown, the single line (e.g., the line between 914 and 916) may also represent differential lines for differential signals.

In the burst mode data signal path 952, the device 904 may include a positive input port (InP) 936 to receive the positive input signal 936S, a negative input port (InN) 938 to receive the negative input signal 938S, an on-chip signal detection circuit 920, a logical signal controller 922, an input interface stage 912 (may be the same as the DC offset removal stage 212), an input stage 914, a clock and data recovery (CDR) unit 916 (may be substantially the same as a signal conditioner 216), a multiplexer (Mux) 940, an output stage 918, a positive output port 924, a negative output port 928, and a host interface 930. The on-chip signal detection circuit 920 may be sometimes referred to as an on-chip signal detect, a signal detect, a signal detect circuit, an on-chip signal detection circuit, or the like. In this disclosure, the CDR unit 916 may be sometimes referred to as a burst mode (BM) data path CDR unit 916. The CDR unit may be sometimes referred to as a CDR, a CDR device, a CDR component, a CDR circuit, or vice versa.

The input interface stage 912 may remove DC offsets in the input signals 936S and 938S, and provide its output signals to the input stage 914. The input stage 914 may in turn output a signal to the CDR unit 916 which may output a signal to the output stage 918. A high level illustration for these blocks is shown and described in reference to FIG. 9. The input stage (which may be a simple signal slicer, limiting amplifier, a complex equalizer (EQ), or combination); blocks inside the receiver should be considered as generic signal processing or conditioning blocks and may include a gain stage, bandwidth filter, CDR, and/or trace driver. Parallel to the CDR unit 916 may also be a CDR bypass path 942. The CDR bypass path 942 may allow the signal from input stage 914 to bypass if a burst mode data path input signal is at a low data rate or a data rate not required to be retimed. The on-chip signal detection circuit 920 may detect differential burst mode data path input signals 936S and 938S and feed the results of the detection to the logical signal controller 922. The logical signal controller 922 may analyze the signals further according to host data burst rate information 930S from the host 950 through the host interface 930. The host data burst rate information 930S may include host data rate signal 930S2, and/or data burst reset signal 930S1. The logical signal controller 922 may also provide information to the input interface stage 912, for example, for DC offset removal.

The Mux 940 may use a logic signal (e.g., a signal from the logical signal controller 922, which is not necessarily a pulse) to decide whether to recover through the CDR unit 916 or bypass the output of 914 through the CDR bypass path 942. The output stage 918 may generate a burst mode data path output signal 924S/928S which may include a positive output signal 924S and a negative output signal 928S, which may be sometimes referred to as a burst mode data path output signal or a differential burst mode data path output signal 924S/928S.

The host 950 may be a switch. The host 950 may include a host MAC receiver device(s) 932 and a host MAC transmit device(s) 956. The differential burst mode data path output signal 924S/928S may be provided into a host MAC receiver device(s) 932 through a positive output AC coupling capacitor 924C and a negative output AC coupling capacitor 928C. Blocks 974 containing components such as programmable continuous time linear equalizer (CTLE), adaptive continuous time linear equalizer (Adaptive CTLE), decision feedback equalizer (DFE), feed forward equalizer (FFE)), and/or CDR may be included within the host and the blocks 974 may further process the signal from the host MAC receiver device(s) 932 and provide feedback signal into the host MAC receiver device 932. The blocks 974 may process a set of adjusted settings to further adjust the signal into the host MAC receiver device 932. In some examples, the blocks 974 may be included inside the host MAC receiver device(s) 932 whereby the high speed signals are reconditioned inside the host MAC receiver device(s) 932 as a result of passing through one or more blocks of the blocks 974.

As shown in FIG. 9 in the continuous mode data signal path 954, the host MAC transmit device(s) 956 may provide a continuous data path input signal 958S/960S to the device 904. The host MAC transmit device(s) 956 may process the continuous mode data path input signal 958S/960S and provide an input signal to the device 904 as a differential input signal, including a positive input signal 958S and a negative input signal 960S. The input signals 958S and 960S may be sometimes referred to as a continuous data path input signal or a differential continuous data path input signal 958S/960S. The input signals 958S and 960S may be provided to the device 904 through a positive output AC coupling capacitor 958C and a negative output AC coupling capacitor 960C.

In the continuous mode data signal path 954, the device 904 may include a positive input port (InP) 958 to receive the positive input signal 958S, a negative input port (InN) 960 to receive the negative input signal 960S, an input stage 962, a continuous path clock and data recovery (CDR) unit 964 with an optional clock recovery unit 966, an output stage 968, a positive output port 970, and a negative output port 972.

The host MAC transmit device(s) 956 may provide the continuous data path input signal 958S/960S to the input stage 962. The input stage 962 may in turn output a signal to continuous path CDR unit 964 with an optional clock recovery unit 966 which may output a signal to the output stage 968. The output stage 968 may output the continuous data path output signal 970S/972S as a differential output signal, including a positive output signal 970S and a negative output signal 972S to the positive output port 970, and to the negative output port 972, respectively. The continuous data path output signals 970S and 972S may be sometimes referred to as a continuous data path output signal or a differential continuous data path output signal 970S/972S.

Figure 10:
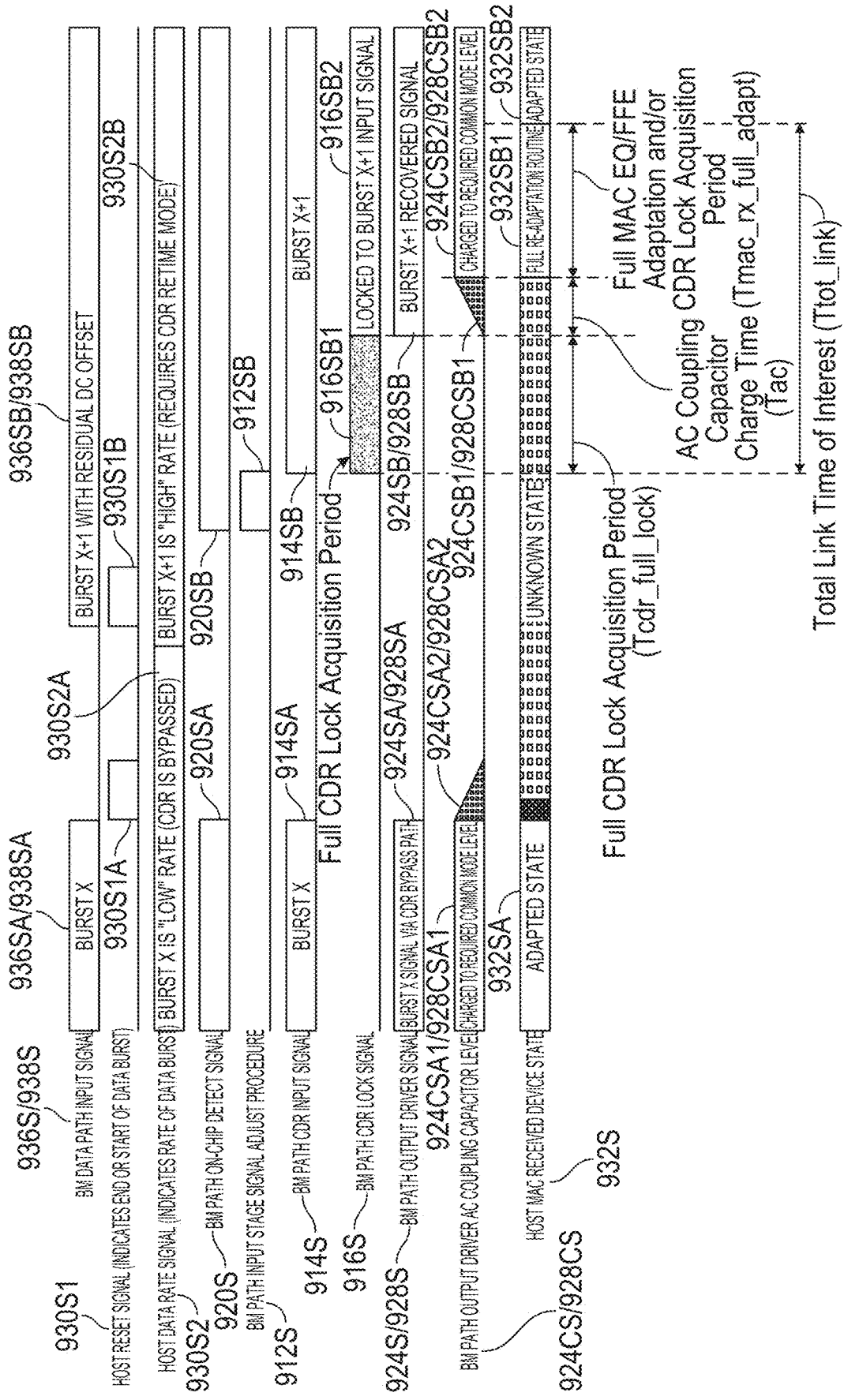
FIG. 10 shows an example waveform of a link acquisition process in the presence of burst mode data signals.

FIG. 10 shows an example waveform of a link acquisition process in the presence of burst mode data signals.

In some implementations, referring to FIGS. 9 and 10, the burst mode (BM) data path input signal 936S/938S may include a previous burst of data, burst X 936SA/938SA, which may be passed at a low rate that does not require the burst X 936SA/938SA to be retimed by the CDR unit 916. Hence, during the presence of burst X 936SA/938SA and the time after burst X 936SA/938SA when no data is present, the BM data path CDR unit 916 may be in a loss of lock state. Before the next data burst X+1 936SB/938SB is sent, the host 950 may indicate the rate of the burst X+1 936SB/938SB, which in this example, is high which may be determined by the terminal system 900. The high rate requires the burst X+1 936SB/938SB to be retimed, or recovered, by the BM data path CDR unit 916.

A host data burst reset signal 930S1 including 930S1A and 930S1B may indicate the end or start of the data burst, such as burst X 936SA/938SA and burst X+1 936SB/938SB. A host data rate signal 930S2 may indicate the rate of the data burst. For example, signal 930S2A may indicate burst X 936SA/938SA is at a low rate that may bypass the CDR unit 916 through the CDR bypass path 942. Signal 930S2B may indicate burst X+1 936SB/938SB is at a high rate that my require retime mode by the CDR unit 916. The on-chip signal detection circuit 920 may send the BM path on-chip detect signal 902S including 920SA and 920SB for detecting incoming BM signals.

Data burst X+1 936SB/938SB may be sometimes passed through an input interface stage 912 which may be used to perform an adjustment 912S to the incoming signal (e.g., removal of a DC Offset from the upstream device). This type of adjustment 912SB may be relatively short.

Subsequent to the signals incurring an adjustment in the input interface stage 912, the signals may be passed to the BM data path CDR unit 916 as BM path CDR input signal 914S including 914SA for burst X and 914SB for burst X+1. For a conventional CDR unit's transition to a fully locked state (e.g., a state locked to burst X+1 input signal 916SB2) from a complete loss of lock state, a notable period of full CDR lock acquisition period 916SB1 time (Tcdr_full_lock) may be required which, in the case of passive optical networks (PON), would violate the link timing requirements, e.g., may be too slow to meet the requirements. In some implementations, a non-conventional CDR unit that is capable of independently and promptly locking to incoming data bursts may help meet a PON application's link timing budget but at the potential expense of excessive output jitter, input jitter tolerance, power consumption, or other metric. The BM path CDR lock signal 916S from the CDR unit 916 may reflect the above changes.

The burst mode data path output signal 924S/928S of FIG. 10 (which may be referred to as a BM path output driver signal 924S/928S) may be provided at the output stage 918 of the burst mode data signal path 952 (e.g., at the output ports 924 and 928). The burst mode data path output signal 924S/928S may include: the burst X signal provided via the CDR bypass path 924SA/928SA; and the bust X+1 recovered signal 924SB/928SB at different times. In some examples, the data rate and pattern of the BM path output driver signal 924S/928S of FIG. 10 may be the same or substantially the same as the data rate and pattern of the input signal of the output stage 918, and the data rate and pattern of the BM path output driver signal 924S/928S may represent the same or substantially the same data rate and pattern of an input signal of the output stage 918 (or an output signal of the Mux 940). In other examples, the BM path output driver signal 924S/928S of FIG. 10 may have other differing metrics (e.g., transition times, amplitudes, emphasis, and/or other eye shaping) compared with the input signal of the output stage 918.

Furthermore, the period between each burst of data may prevent the AC coupling capacitors 924C/928C, which exist between the output stage 918 of the burst mode data signal path 952 and the host MAC receiver device(s) 932, from maintaining the same charge required to pass data. The BM path output driver AC coupling capacitors 924C/928C are charged to the required common mode voltage level 924CSA1/928CSA1 during burst X and subsequently may begin to drift their charge to another common mode level upon the completion of burst X as a result of the output stage 918 ceasing to pass a toggling signal. The BM path output driver AC coupling capacitor level 924CS/928CS may include the AC coupling capacitor charge level 924CSB1/928CSB1 and the charge which attains the required common mode voltage level 924CSB2/928CSB2 for burst X+1. Hence, AC coupling capacitor charge time (Tac) (e.g., time for 924CSB1/928CSB1) must also be considered in the link timing budget. Referring back to FIG. 6C, the figure illustrates an example waveform shape of a signal at a common mode level, and when the BM path output driver AC coupling capacitors 924C/928C are charged to a common mode voltage level or a common mode level, such common mode voltage level or common mode level may have a waveform shape similar to that of FIG. 6C.

In some examples, for higher data rates, the host MAC receiver device(s) 932 may require an input stage consisting of an adaptive equalizer, such as an FFE (e.g., blocks 974). These types of blocks may require adaption algorithms which may consume a considerable amount of time (Tmac_rx_full_adapt) and thus may impact the link timing of data burst applications, such as PON. The host MAC received device state 932S at the host MAC receiver device(s) 932 may include an adapted state 932SA for burst X, and a full re-adaptation routine 932SB1 and an adapted state 932SB2 for burst X+1. The time for the full re-adaptation routine 932SB1 (Tmac_rx_full_adapt) may be the full MAC equalizer (EQ)/FFE adaptation and/or CDR lock acquisition period. In one or more examples, Tcdr_full_lock may be specific to the BM data path CDR unit 916, and may be independent of the host MAC receiver device(s) 932. Therefore, the host MAC receiver device(s) 932 may have a CDR lock acquisition period of its own, which may be completely dependent on the implementation details of the host MAC receiver device(s) 932.

In some examples, various signals (e.g., BM path CDR input signal 914S, BM path CDR lock signal 916S, host MAC received device state 932S) within the terminal system 900 may also be differential signals.

In the above waveform example, the amount of time required for key blocks within the data burst link as total link time of interest (Ttot_link) may be summarized as:

$$Ttot\_link = Tcdr\_full\_lock + Tac + Tmac\_rx\_full\_adapt$$

In the above equation, Ttot_link may be the total period required for data 'burst X+1' to pass from the time that the burst mode data signal path device's input stage signal adjust procedure completes to the time when the host MAC receiver device's input stage (e.g., adaptive EQ/FFE) concludes the adaption procedure. Tac may be the time required for the AC coupling capacitors located between the burst mode signal data path device's output and the host MAC receiver device's input pins to settle to the required common mode voltage level. Tmac_rx_full_adapt may be the time required for the host MAC receiver device's input stage (adaptive EQ/FFE) to complete its adaptation procedure after being in a state with no signal present. Tcdr_full_lock may be the time required for the burst mode data signal path device's CDR unit to lock to the incoming data bursts after being in a state of full loss of lock (e.g., loss of frequency and phase lock). An input stage signal adjust procedure may be sometimes referred to as an input stage signal adjustment procedure. The input stage signal adjustment procedure may include removing a direct current (DC) offset from a burst signal (e.g., Burst X or Burst X+1 shown in FIGS. 15-18). The DC offset removal process is described in detail, for example, with reference to the DC offset removal stage 212, the limiting amplifier signal recovery stage 302, and FIGS. 6A-6C and 7A-7B.

Figure 11:
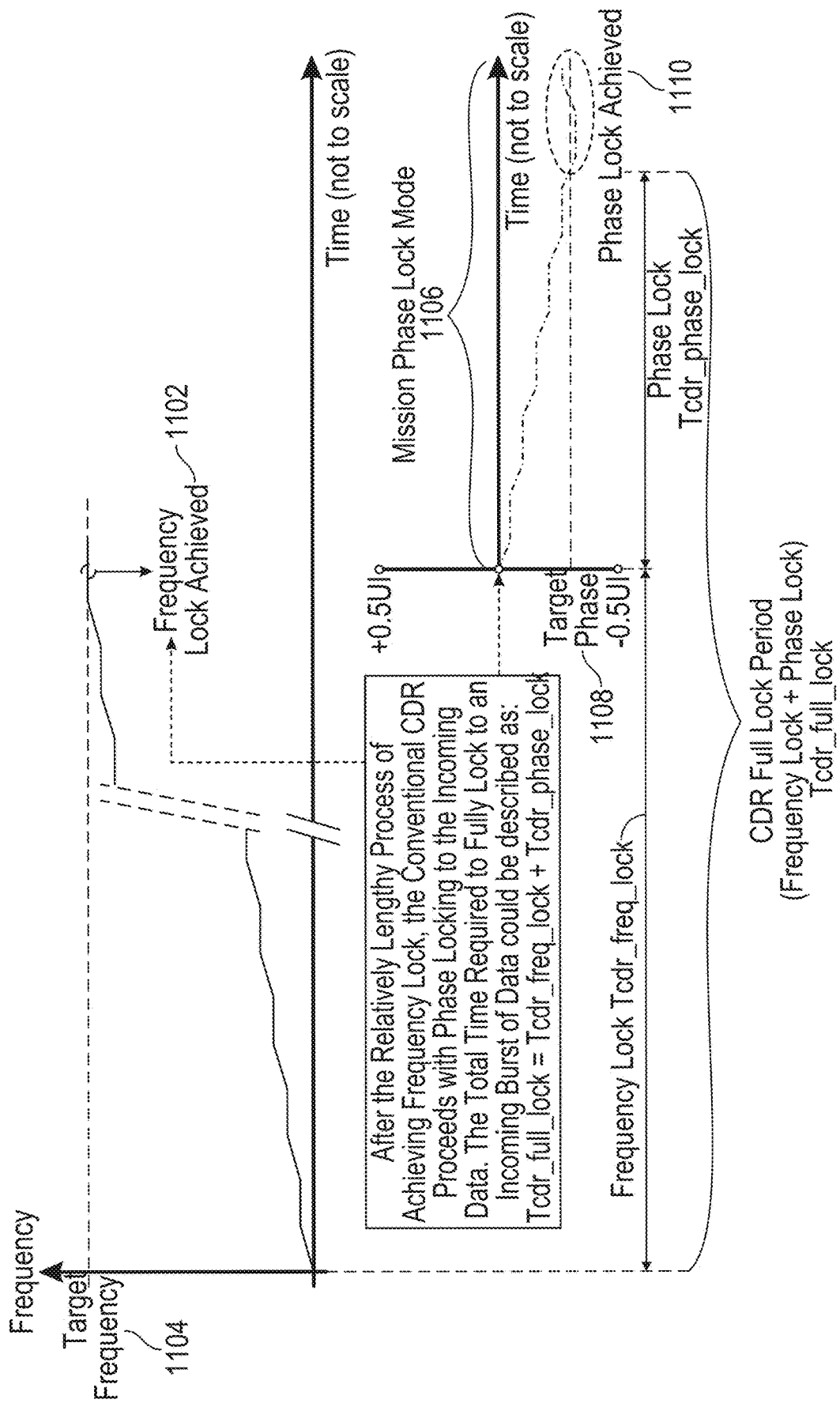
FIG. 11 illustrates an example diagram depicting a required period of time for a clock and data recovery unit to fully lock to an incoming burst of data according to one approach.

FIG. 11 illustrates an example diagram depicting a required period of time (e.g., Tcdr_full_lock) for a CDR unit to fully lock to the incoming burst of data according to one approach. According to a conventional approach, a CDR unit may first achieve frequency lock 1102 for the incoming burst of data (e.g., 914SB) to a target frequency 1104. After the relatively lengthy process of achieving frequency lock in a time period Tcdr_freq_lock, the CDR unit may proceed with phase locking in a mission phase lock mode 1106 for the incoming burst of data to a target phase 1108. The time to achieve phase lock 1110 is Tcdr_phase_lock. The total time required to fully lock to an incoming burst of data may be described as:

$$Tcdr\_full\_lock = Tcdr\_freq\_lock + Tcdr\_phase\_lock$$

In some examples, Tcdr_freq_lock >> Tcdr_phase_lock. The time for frequency lock may be much longer than the time for phase lock.

Figure 12:
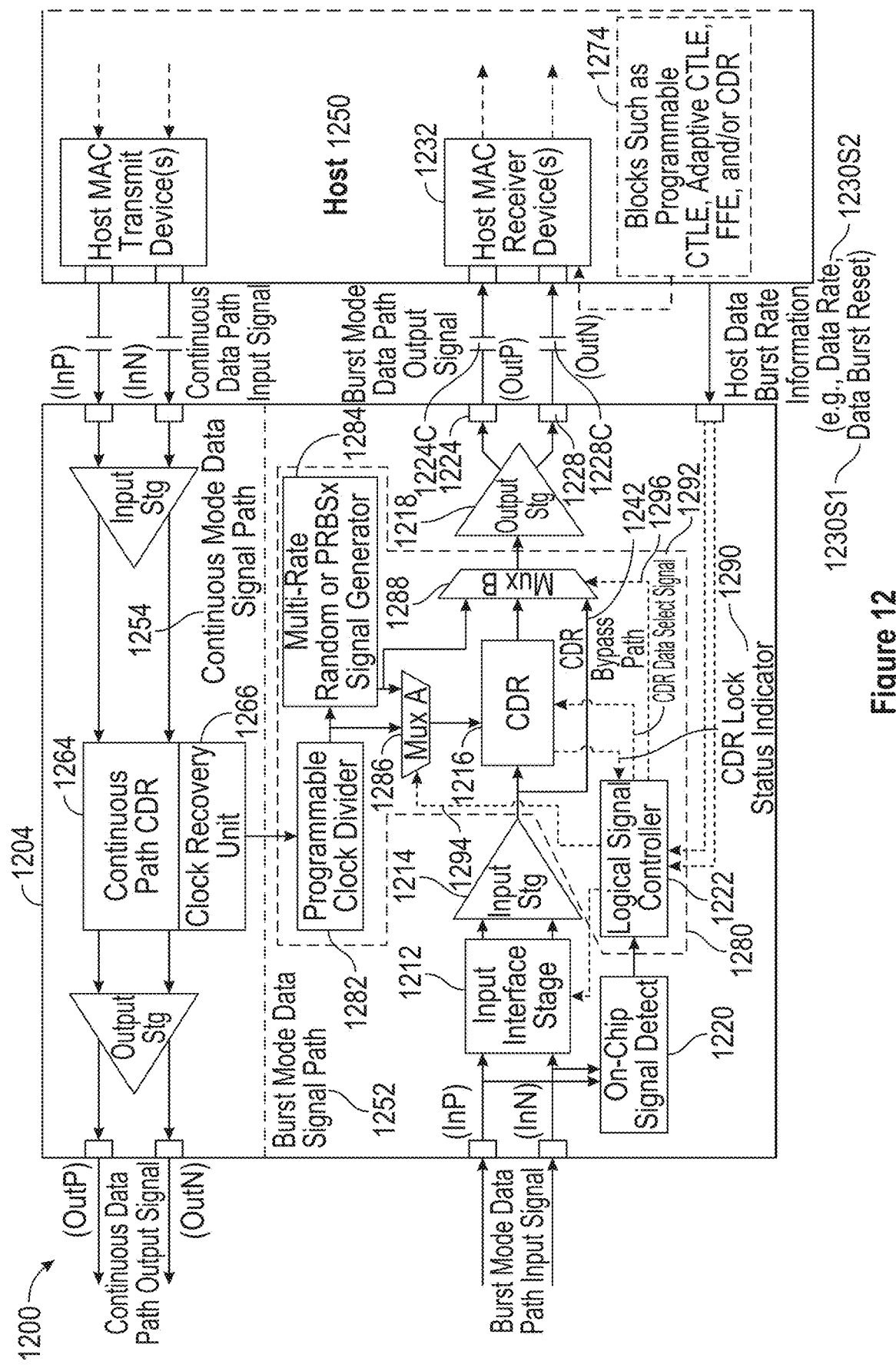
FIG. 12 shows an example implementation diagram of a system leveraging a fast burst data link acquisition process in a PON OLT module application with both the continuous mode data signal path and the burst mode data signal path.

FIG. 12 shows an example implementation diagram of a system 1200 leveraging a fast burst data link acquisition process in a PON OLT module application with both the continuous mode data signal path 1254 and the burst mode data signal path 1252.

In some examples, FIG. 12 shows an example block diagram of the system 1200 whereby the recovered clock of the continuous mode data signal path 1254 may be leveraged by the burst mode data signal path 1252. The system 1200 may reside on a single chip or multiple chips. The system 1200 may include a recovery circuit 1280 that implements the fast burst data link acquisition process. The recovery circuit 1280 may include a clock divider block 1282, a random signal generator 1284, a multiplexer (Mux) A 1286, a Mux B 1288, a CDR unit 1216 of the burst mode data signal path 1252, and a logical signal controller 1222. A clock divider block may be sometimes referred to as a clock divider or a clock divider circuit.

A recovered clock from the clock recovery unit 1266 attached to the continuous path CDR 1264 of the continuous mode data signal path 1254 may be sent to the clock divider block 1282 (e.g., a programmable clock divider 1282) to be divided down, for potential power savings and/or to facilitate the lock acquisition with the CDR unit 1216 of the burst mode data signal path 1252.

In some examples, the recovered clock from the continuous path 1254, or a divided down version of the recovered clock, may be sent directly or indirectly to the CDR unit 1216 of the burst mode path 1252 to help maintain a locked or partially locked state (e.g., frequency locked state) during periods when no data (e.g., data signal or burst signal) is present (e.g., guard time in PON applications). The term guard time may be sometime referred to as a guard period.

In some examples, the recovered clock from the continuous path 1254, or a divided down version of the recovered clock, may also be sent directly or indirectly to the random signal generator 1284 (e.g., a multi-rate random or pseudo random binary sequence (PRBS) x generator 1284, wherein x is an integer). The output of the random signal generator 1284 may be passed to the burst mode path's CDR unit 1216, to help maintain the locked state of the CDR unit 1216, instead of the recovered clock from the continuous path 1254, or a divided down version of the recovered clock, based on the chosen setting of the Mux A 1286. For example, controlled by the logical signal controller 1222, the Mux A may choose to pass one or more input signals from any combinations of a clock divider block 1282, and/or the random signal generator 1284 to the CDR unit 1216 of the burst mode path 1252. In this exemplary configuration, the output of the burst mode path's CDR unit 1216 may be used to pass the random signal from the random signal generator 1284 to the downstream host MAC receiver device(s) 1232 during periods when no data is present (e.g., guard time in PON applications). Alternatively or additionally, the output of the random signal generator 1284 may be directly or indirectly passed to the host MAC receiver device(s) 1232 during periods when no data is present. The Mux B 1288, before the output stage 1218 of the burst mode data signal path 1252 may be used to choose how the random signal is passed to the host MAC receiver device(s) 1232 during periods when no data is present. For example, controlled by the logical signal controller 1222, the Mux B may choose to pass one or more input signals from any combinations of the random signal generator 1284, the CDR unit 1216, and/or the CDR bypass path 1242 to the output stage 1218 of the burst mode path 1252.

In one or more examples, a signal received from the continuous path 1254, a signal generated by the clock divider block 1282, and a random sequence generated by the PRBS generator 1284 may have substantially the same frequency or substantially the same frequency and phase.

An on-chip signal detect circuit 1220 residing in the burst mode data signal path 1252 may be used to determine when a signal is present and produces a signal assert (e.g., start of the presence of a signal) or de-assert (e.g., stop of the presence of a signal) logic level control output (e.g., 920SA and/or 920SB). This output from on-chip signal detect circuit 1220 may be sent to and used by the logical signal controller 1222.

The logical signal controller 1222 may use, but is not limited to, the output of the on-chip signal detect circuit 1220, the host data rate signal 1230S2, the host data burst reset signal 1230S1, and/or the CDR lock status indicator 1290 information to control the logic signals and related respective sequencing to decide when, how and/or whether to allow: the input interface stage 1212 to perform an input signal adjustment procedure (e.g., removal of DC offset generated by upstream device); the recovered clock from the continuous mode data signal path 1254 (and/or signal from the random signal generator 1284) to be sent to the burst mode data signal path's CDR unit 1216; an incoming data burst to be sent to the burst mode data signal path's CDR unit 1216 in order to lock to and recover the incoming data burst (e.g., 1536SA/1538SA, 1536SB/1538SB, or 1912); and/or the burst mode data signal path's output stage 1218 to send data from one of the random signal generator 1284, the CDR unit 1216 or a CDR bypass path 1242. In some examples, the logic signal controller 1222 may send a CDR data select signal 1292 to the CDR unit 1216 so that the CDR unit 1216 may select an input signal from (a) an incoming burst mode data signal (e.g., 1912) or (b) a recovered clock from the CM path CDR or PRBS 1910. The recovered clock from the CM path CDR or PRBS 1910 may be one of (i) a recovered clock signal (e.g., a signal based on an output signal of a clock recovery unit 1266) or (ii) a random signal generator 1284's output signal, as described herein.

The logical signal controller 1222 may be set to use the signal from the on-chip signal detect circuit 1220 or a lock signal from the burst mode data signal path's CDR unit 1216 to determine whether to set the Mux B to output data from the burst mode data signal path's CDR unit 1216, the random signal generator 1284, or the bypass path 1242.

The logical signal controller 1222 may also add delays and decide how to stagger a control signal 1294 to the Mux A, a control signal 1296 to the Mux B, and a control signal 1292 to the burst mode data signal path's CDR unit 1216 (e.g., a CDR data select signal 1292). Additionally, depending on the assert signal threshold setting of the on-chip signal detect circuit 1220, the logical signal controller 1222 may even allow the new burst of data signal to pass to the burst mode data signal path's CDR unit 1216 during the input stage signal adjust procedure period.

The remaining components and/or some of the above described components of system 1200 may be substantially same or similar to the elements described in system 900 in FIG. 9 and/or substantially same or similar to the elements described in other Figures of the present disclosure unless described or illustrated otherwise. The descriptions of those elements may be omitted for brevity.

Figure 13:
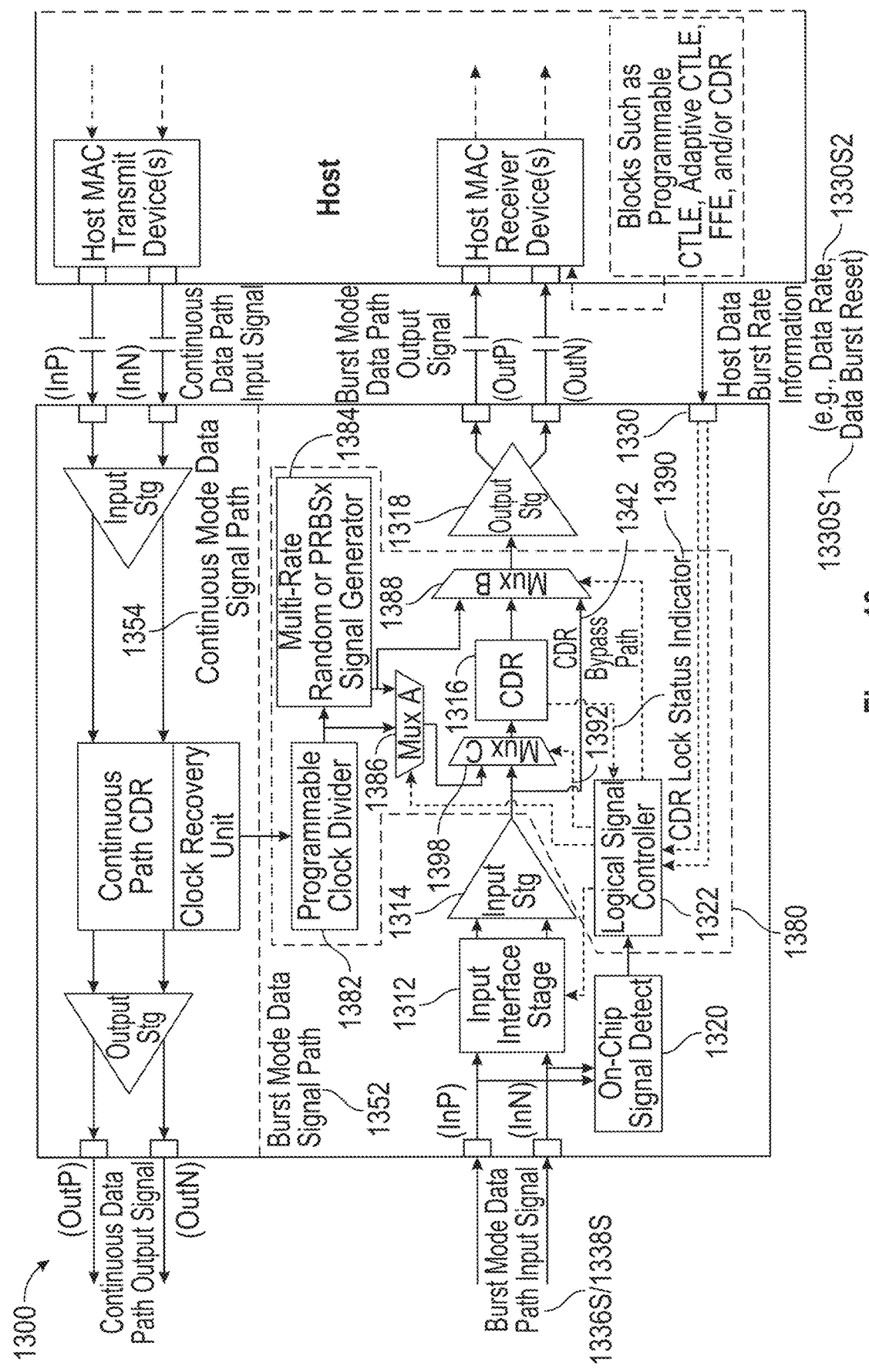
FIG. 13 shows another example implementation diagram of a system leveraging a fast burst data link acquisition process in a PON OLT module application with both the continuous mode data signal path and the burst mode data signal path.

FIG. 13 shows another example implementation diagram of a system 1300 leveraging a fast burst data link acquisition process in a PON OLT module application with both the continuous mode data signal path 1354 and the burst mode data signal path 1352. FIG. 13 shows the BM path CDR input signal connection with the explicit presence of the Mux C 1398.

The system 1300 may include a recovery circuit 1380 that implements the fast burst data link acquisition process. The recovery circuit 1380 may include a clock divider block 1382, a random signal generator 1384, a Mux A 1386, a Mux B 1388, the Mux C 1398, a CDR unit 1316 of the burst mode data signal path 1352, and a logical signal controller 1322.

Different from FIG. 12, wherein the Mux A 1286 may be connected to the CDR unit 1216, the input stage 1214 may be connected to the CDR unit 1216, and the CDR unit 1216 may be controlled by the CDR data select signal 1292 from the logical signal controller 1222, in FIG. 13, the Mux A 1386 and the input stage 1314 may be connected to the CDR unit 1316 though another Mux C 1398, and the CDR unit 1316 and the Mux C 1398 may be controlled by the signal 1392 through the Mux C 1398 from the logical signal controller 1322. In some examples, controlled by the logical signal controller 1322, the Mux C 1398 may choose to pass one or more input signals from any combinations of the Mux A 1386 and/or the input stage 1314 to the CDR unit 1316 of the burst mode path 1352.

The remaining components and/or some of the above described components of system 1300 may be substantially same or similar to the elements described in system 1200 in FIG. 12 and/or substantially same or similar to the elements described in other Figures of the present disclosure unless described or illustrated otherwise. The descriptions of those elements may be omitted for brevity.

Figure 14:
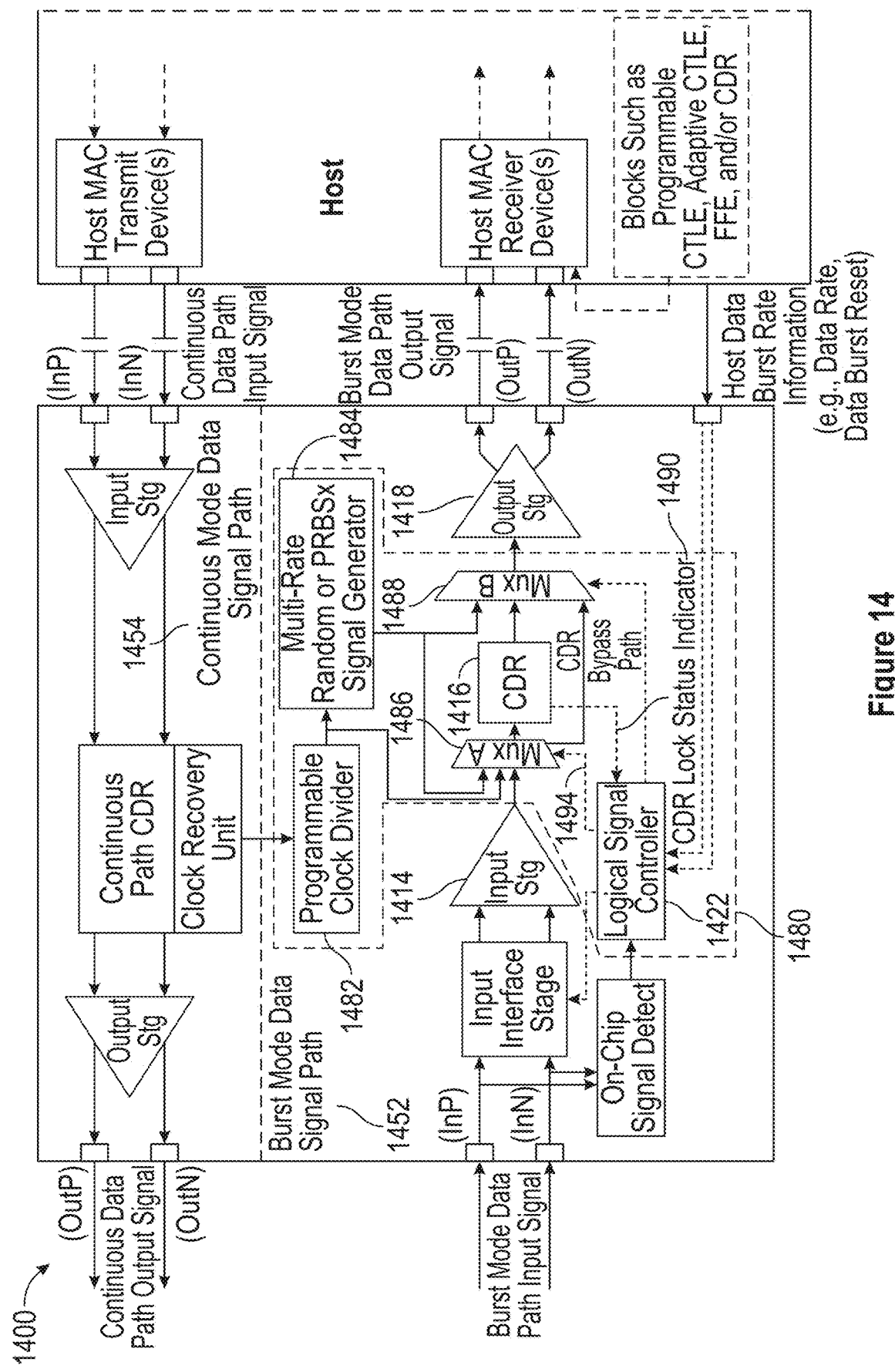
FIG. 14 shows another example implementation diagram of a system leveraging a fast burst data link acquisition process in a PON OLT module application with both the continuous mode data signal path and the burst mode data signal path.

FIG. 14 shows another example implementation diagram of a system 1400 leveraging a fast burst data link acquisition process in a PON OLT module application with both the continuous mode data signal path 1454 and the burst mode data signal path 1452. FIG. 14 shows the BM path CDR input signal connection with a Mux A 1486 possessing 3 inputs.

The system 1400 may include a recovery circuit 1480 that implements the fast burst data link acquisition process. The recovery circuit 1480 may include a clock divider block 1482, a random signal generator 1484, the Mux A 1486, a Mux B 1488, a CDR unit 1416 of the burst mode data signal path 1452, and a logical signal controller 1422.

Different from FIG. 12, wherein the Mux A 1286 may be connected to the CDR unit 1216, the input stage 1214 may be connected to the CDR unit 1216, and the CDR unit 1216 may be controlled by the CDR data select signal 1292 from the logical signal controller 1222, in FIG. 14, the Mux A 1486 may be connected to the input stage 1414, the clock divider block 1482, and the random signal generator 1484 at the input side of the Mux A 1486, and the CDR unit 1416 and the Mux A 1486 may be controlled by the signal 1494 through the Mux A 1486 from the logical signal controller 1422. The CDR unit 1416 may not have a separate CDR data select signal such as 1292 from the logical signal controller 1422. In some examples, controlled by the logical signal controller 1422, the Mux A 1486 may choose to pass one or more input signals from any combinations the input stage 1414, the clock divider block 1482, and/or the random signal generator 1484 to the CDR unit 1416 of the burst mode path 1452.

The remaining components and/or some of the above described components of system 1400 may be substantially same or similar to the elements described in system 1200 in FIG. 12 and/or substantially same or similar to the elements described in other Figures of the present disclosure unless described or illustrated otherwise. The descriptions of those elements may be omitted for brevity.

In some examples, the example systems 1200 in FIG. 12, 1300 in FIG. 13, and 1400 in FIG. 14 may achieve the same or substantially similar functionality with different Mux, logical signal controller, and CDR unit configurations. FIGS. 12-14 illustrate that an output stage 1218, 1318 or 1418 is placed outside a recovery circuit 1280, 1380, or 1480, respectively; however, in one or more examples, an output stage 1218, 1318 or 1418 may be placed within a recovery circuit 1280, 1380, or 1480, respectively, so that a recovery circuit 1280, 1380, or 1480 may include an output stage 1218, 1318 or 1418, respectively. An output stage may be sometimes referred to as an output stage circuit. A recovery circuit may be sometimes referred to as a signal locking device.

Figure 15:
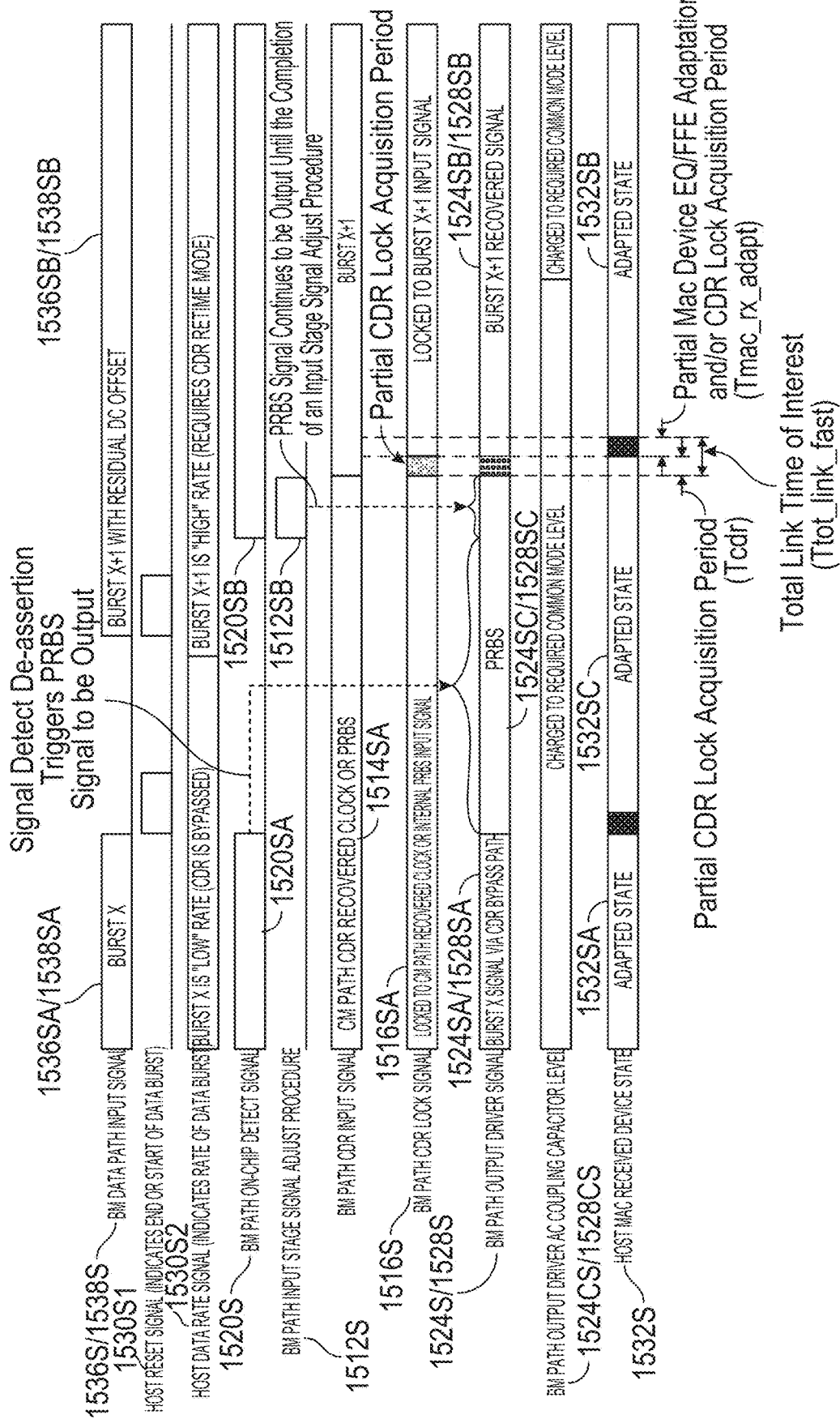
FIG. 15 illustrates an example waveform of a fast link acquisition process in the presence of burst mode data in which an earlier burst data rate does not require signal retiming.

FIG. 15 illustrates an example waveform of a fast link acquisition process in the presence of burst mode data in which an earlier burst data rate does not require signal retiming. In some examples, the waveform illustrated in FIG. 15 may be generated from any of the example systems 1200 in FIG. 12, 1300 in FIG. 13, and/or 1400 in FIG. 14.

FIG. 15 describes an example where the previous burst X 1536SA/1538SA consists of a signal with a data rate that may be best suited to bypass the burst mode data signal path's CDR unit (e.g., CDR unit 1216). In such a case, the de-assertion (e.g., stop of the presence of the burst X signal) of the BM path on-chip detect signal 1520SA from the on-chip signal detect circuit 1220 may trigger the random signal generator 1284's data (e.g., PRBS) to be output as the BM path output driver signal 1524S/1528S (e.g., 1524SC/1528SC) at the output stage 1218 (to a positive output port 1224, and a negative output port 1228) during the guard time (e.g., when no burst signal is present at the output stage 1218 between the burst X 1524SA/1528SA and the burst X+1 1524SB/1528SB). In some examples, the burst X+1 1524SB/1528SB may be processed by a CDR unit (e.g., 1216, 1316, 1416) during a partial CDR lock acquisition period (Tcdr) to obtain phase locking.

In one or more examples, the BM path output driver signal 1524S/1528S may represent or may correspond to output signals of the output stage 1218 (e.g., output signals at an output port 1224 and an output port 1228). In one or more other examples, the BM path output driver signal 1524S/1528S may represent or may correspond to an input signal of the output stage 1218 (e.g., a signal from the Mux B 1288).

In one or more advantageous examples, the random signal generator 1284's data (e.g., PRBS) may continue to be output as the BM path output driver signal 1524S/1528S (e.g., 1524SC/1528SC) at the output stage 1218 until the completion of a BM path input stage signal adjust procedure 1512SB (at which time the guard time may end). In some examples, the BM path output driver signal 1524SC/1528SC at the output stage 1218 may have a first portion corresponding to a gap time between the BM path on-chip detect signal 1520SA and 1520SB, and a second portion corresponding to the start of the BM path on-chip detect signal 1520SB until the completion of the BM path input stage signal adjust procedure 1512SB.

Figure 16:
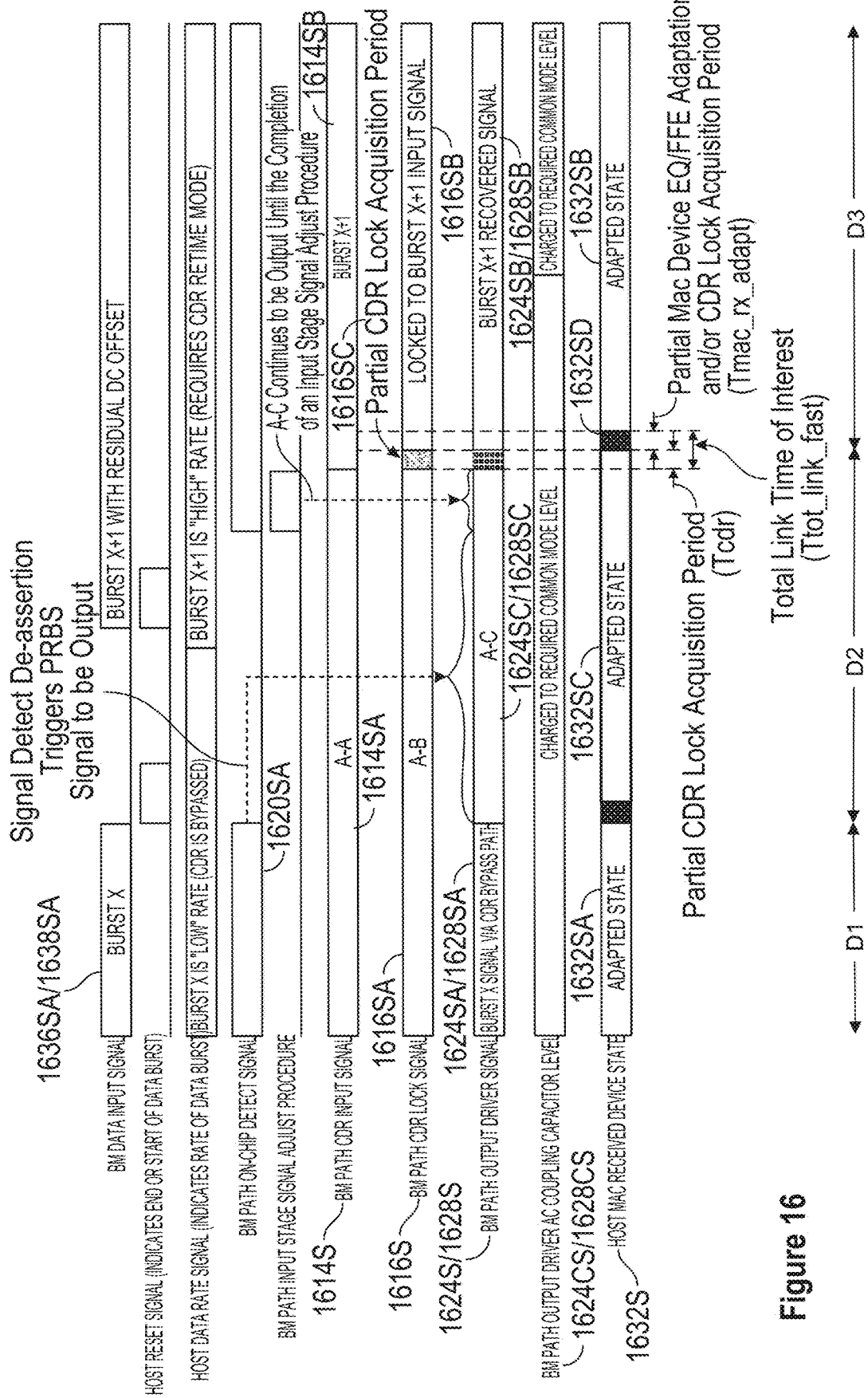
FIG. 16 illustrates other example waveforms of a fast link acquisition process in the presence of burst mode data in which an earlier burst data rate does not require signal retiming.

FIG. 16 illustrates other example waveforms of a fast link acquisition process in the presence of burst mode data in which an earlier burst data rate does not require signal retiming. In some examples, the waveform illustrated in FIG. 16 may be generated from any of the example systems 1200 in FIG. 12, 1300 in FIG. 13, and/or 1400 in FIG. 14.

FIG. 16 illustrates other example permutations (including FIG. 15) using a subset of features captured in the below Table 1, when a previous burst X 1636SA/1638SA has a low rate.

Table 1 illustrates example waveform scenarios in connection with FIG. 16 when the previous burst X 1636SA/1638SA is a low rate data burst and does not require BM path CDR Retiming.

TABLE 1 example waveform scenarios in connection with FIG. 16.

| Scenarios | Clock signal to Mux A | Clock signal to Mux B | PRBS to Mux A | PRBS to Mux B | A-A | A-B | A-C |
|---|---|---|---|---|---|---|---|
| 1 | Yes | No | No | Yes | Clock signal | Locked to clock signal | PRBS |
| 2 | No | Yes | Yes | No | PRBS | Locked to PRBS | Clock signal |
| 3 | Yes | No | No | No | Clock signal | Locked to clock signal | No signal |
| 4 | Yes | Yes | No | No | Clock signal | Locked to clock signal | Clock signal |
| 5 | No | No | Yes | No | PRBS | Locked to PRBS | No signal |
| 6 | No | No | Yes | Yes | PRBS | Locked to PRBS | PRBS |

In Table 1, Mux A and Mux B may be any of the Mux A and the Mux B illustrated in the example systems 1200 in FIG. 12, 1300 in FIG. 13, and/or 1400 in FIG. 14.

In some examples, as shown in Table 1, using the circuit components in FIG. 12, the term "clock signal" described in Table 1 may refer to a recovered clock signal from the clock divider block (e.g., 1282) based on a recovered clock signal from the clock recovery unit 1266 of the continuous path 1254. The term "PRBS" described in Table 1 may refer to a signal (e.g., PRBS) generated by a random signal generator (e.g., 1284).

With respect to scenario 1, "Clock signal to Mux A" having a value "Yes" may represent that a clock signal is provided to or is selected by the Mux A 1286. "Clock signal to Mux B" having a value "No" may represent that a clock signal (e.g., whether or not the clock signal has been processed through the CDR unit 1216) is not provided to or is not selected by the Mux B 1288. "PRBS to Mux A" having a value "No" may represent that a PRBS is not provided to or is not selected by the Mux A 1286. "PRBS to Mux B" having a value "Yes" may represent that a PRBS is provided to and selected by the Mux B 1288.

Still referring to scenario 1, "A-A" having a value "Clock signal" may represent that, in FIG. 16, the "A-A" portion of a BM path CDR input signal 1614S is the clock signal which has been selected by the Mux A 1286 (e.g., a recovered clock signal from the clock divider block 1282 that has been selected by the Mux A 1286), shown as the signal 1614SA (e.g., also shown in FIG. 15 as CM path CDR recovered clock of 1514SA). "A-B" having a value "Locked to clock signal" may represent that, in FIG. 16, the "A-B" portion of a BM path CDR lock signal 1616S is locked to the clock signal which has been selected by the Mux A 1286 (e.g., a recovered clock signal from the clock divider block 1282 that has been selected by the Mux A 1286), shown as the signal 1616SA (e.g., also shown in FIG. 15 as locked to the CM path CDR recovered clock of 1516SA). "A-C" having a value "PRBS" may represent that, in FIG. 16, the "A-C" portion of a BM path output driver signal 1624S/1628S is the PRBS which has been selected by the Mux B 1288, shown as signal 1624SC/1628SC (e.g., also shown in FIG. 15 as PRBS 1524SC/1528SC). In this scenario 1, the Mux A 1286 does not receive a PRBS, and the Mux B 1288 receives a PRBS directly (e.g., directly from a random signal generator (e.g., 1284) without having the PRBS pass through the Mux A 1286 or the CDR unit 1216).

Similarly, in other scenarios, "A-A" having a value "PRBS" may represent that, in FIG. 16, the "A-A" portion of a BM path CDR input signal 1614S is a PRBS, shown as the signal 1614SA (e.g., also shown in FIG. 15 as the PRBS of 1514SA). "A-B" having a value "Locked to PRBS" may represent that, in FIG. 16, the "A-B" portion of a BM path CDR lock signal 1616S is locked to a PRBS which has been selected by the Mux A 1286, shown as the signal 1616SA (e.g., also shown in FIG. 15 as locked to the internal PRBS input signal of 1516SA). For scenario 2, "A-C" having a value "Clock signal" may represent that, in FIG. 16, the "A-C" portion of a BM path output driver signal 1624S/1628S is the clock signal that has been provided directly to and selected by the Mux B 1288 (e.g., directly from a component (e.g., a clock divider block 1282 or a clock recovery unit 1266)) without having the clock signal pass through the Mux A 1286 or the CDR unit 1216. This example is not illustrated in FIGS. 12-14. For scenario 4, "A-C" having a value "Clock signal" may represent that, in FIG. 16, the "A-C" portion of a BM path output driver signal 1624S/1628S is the clock signal that has been selected by the Mux A 1286, processed through the CDR unit 1216 and selected by the Mux B 1288, shown as the signal 1624SC/1628SC. "A-C" having a value "No signal" may represent that, in FIG. 16, the "A-C" portion of a BM path output driver signal 1624S/1628S provides no signal (e.g., provides neither the clock signal nor the PRBS) (i.e., the signal 1624SC/1628SC consists of no signal). In one or more examples, the term "no signal" may represent a non-toggling logic high signal, a non-toggling logic low signal, or a non-toggling signal where the output signals at the output ports 1224 and 1228 are at an equal voltage level.

While the foregoing descriptions relating to Table 1 are provided mainly in reference to FIGS. 12, 15 and 16, similar descriptions are applicable with reference to FIGS. 13 and 14; hence, such descriptions may be omitted for brevity.

It is noted that in alternative examples (not shown in FIGS. 12-14), the term "clock signal" described in Table 1 may refer to a recovered clock signal from the clock recovery unit 1266 of the continuous path 1254 without having the recovered clock signal pass through the clock divider block 1282. In other alternative examples (not shown in FIGS. 12-14), a recovery circuit 1280 may include other components (not shown in FIGS. 12-14,) and the term "clock signal" described in Table 1 may refer to a recovered clock signal from one or more of such other components (not shown in FIGS. 12-14).

The remaining waveforms and/or some of the above described waveforms of FIG. 15 and FIG. 16 may be substantially same or similar to the waveforms described in FIG. 10 and/or substantially same or similar to the waveforms described in other Figures of the present disclosure unless described or illustrated otherwise. In one or more aspects, the same or similar names or notations may include or provide the same or similar features, functions and operations unless stated or illustrated otherwise. For example, the notation "BM path CDR input signal" in FIGS. 10 and 15-18 may include or provide the same or similar features, functions and operations unless stated or illustrated otherwise. For example, in FIG. 10, 924CS/928CS may represent differential signals, similarly in FIG. 15, 1524CS/1528CS may also represent differential signals. The descriptions of those waveforms may be omitted for brevity.

Figure 17:
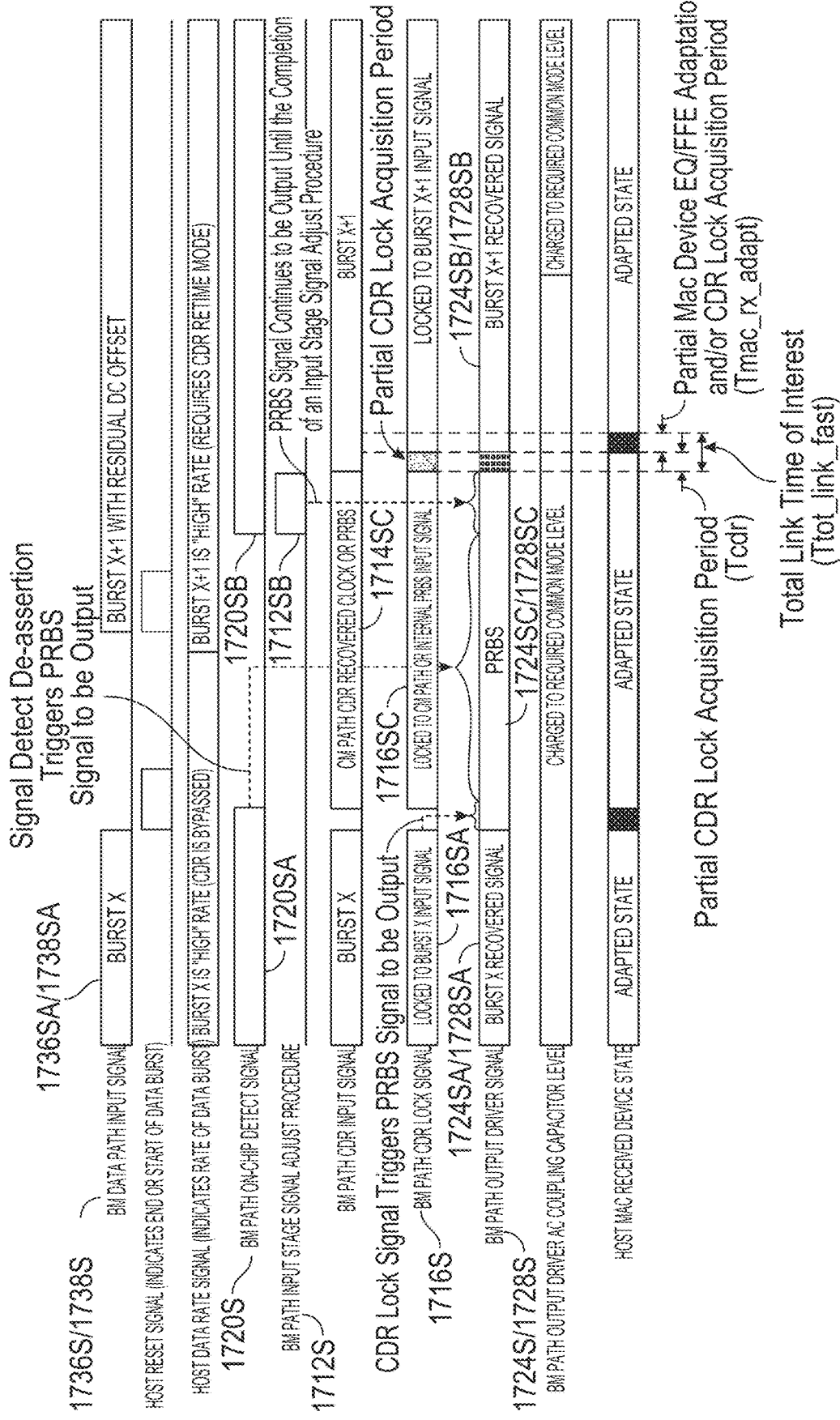
FIG. 17 illustrates an example waveform of a fast link acquisition process in the presence of burst mode data in which an earlier burst data rate may require signal retiming.

FIG. 17 illustrates an example waveform of a fast link acquisition process in the presence of burst mode data in which an earlier burst data rate may require signal retiming. In some examples, the waveform illustrated in FIG. 17 may be generated from any of the example systems 1200 in FIG. 12, 1300 in FIG. 13, and/or 1400 in FIG. 14.

FIG. 17 describes an example where the previous burst X 1736SA/1738SA consists of a signal with a data rate that may be best suited to pass through the burst mode data signal path's CDR unit (e.g., CDR unit 1216) to be retimed. In such a case, the de-assertion (e.g., stop of the presence of the burst X signal) of the BM path CDR lock signal 1716SA may trigger the random signal generator 1284's data (e.g., PRBS) to be output as the BM path output driver signal 1724S/1728S (e.g., 1724SC/1728SC) at the output stage 1218 (to a positive output port 1224, and a negative output port 1228) during the guard time (e.g., when no burst signal is present at the output stage 1218) between the burst X 1724SA/1728SA and the burst X+1 1724SB/1728SB. In some examples, the burst X+1 1724SB/1728SB may be processed by a CDR unit (e.g., 1216, 1316, 1416) during a partial CDR lock acquisition period (Tcdr) to obtain phase locking. In particular, the subsequent de-assertion (e.g., stop of the presence of the signal) of the BM path on-chip detect signal 1720SA may trigger the random signal generator 1284's data (e.g., PRBS) to continue to be output as the BM path output driver signal 1724S/1728S (e.g., 1724SC/1728SC) at the output stage 1218 (to a positive output port 1224, and a negative output port 1228) during the guard time (e.g., when no burst signal is present at the output stage 1218) between the burst X 1724SA/1728SA and the burst X+1 1724SB/1728SB. The random signal generator 1284's data (e.g., PRBS) may continue to be output as the BM path output driver signal 1724S/1728S (e.g., 1724SC/1728SC) at the output stage 1218 until the completion of a BM path input stage signal adjust procedure 1512SB (at which time the guard time may end). In some examples, the BM path output driver signal 1724SC/1728SC at the output stage 1218 may have a first portion corresponding to a gap time between the BM path CDR lock signal 1716SA locked to the burst X input signal and 1716SC locked to CM path or internal PRBS input signal, a second portion corresponding to a gap time between the BM path on-chip detect signal 1720SA and 1720SB, and a third portion corresponding to the start of the BM path on-chip detect signal 1720SB until the completion of the BM path input stage signal adjust procedure 1712SB.

The logic signal controller may leverage the BM path on-chip detect signal 1720S or the BM path CDR lock signal 1716S to make the decision of when the Mux B (e.g., 1288) may send a PRBS signal to the output stage 1218.

Figure 18:
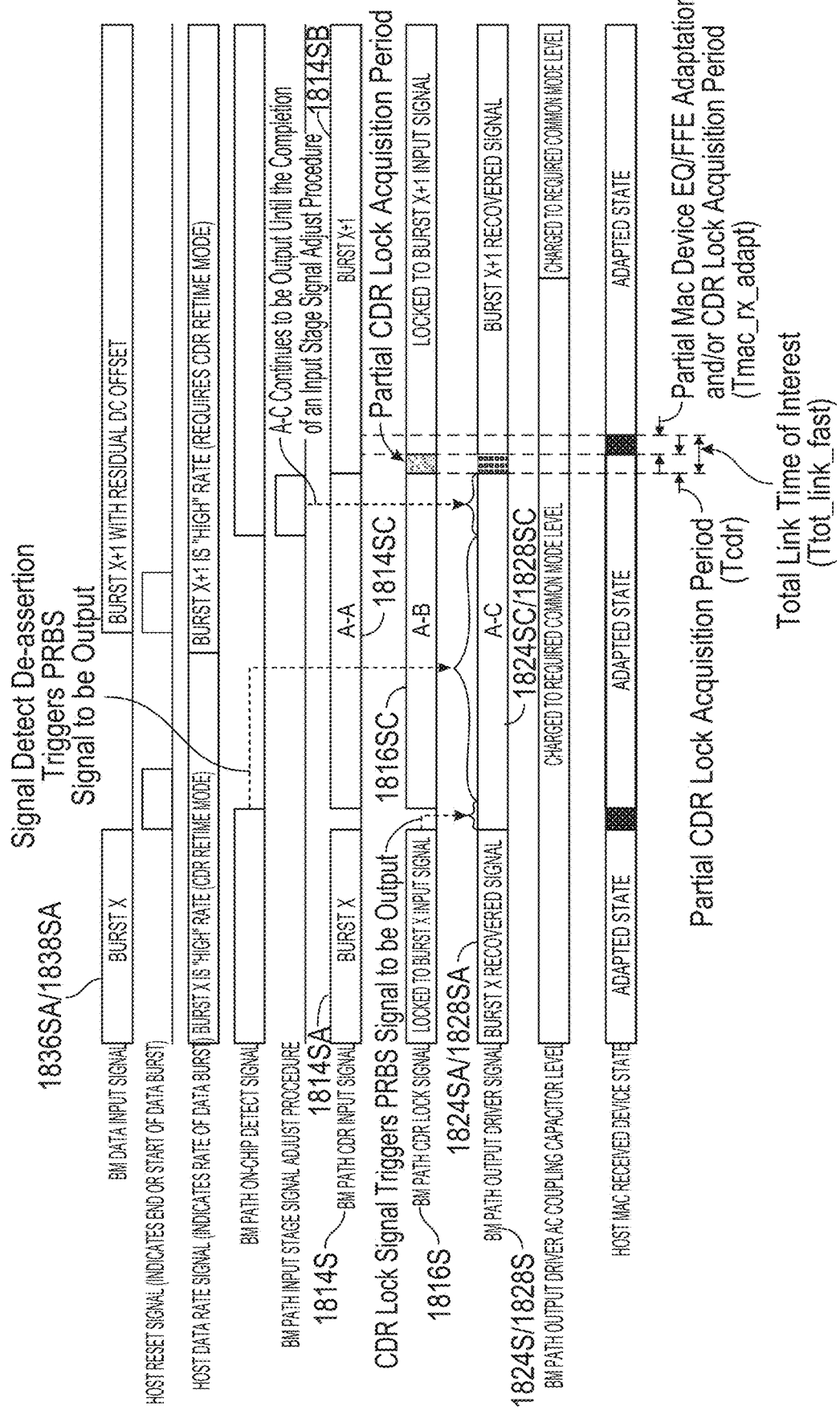
FIG. 18 illustrates other example waveforms of a fast link acquisition process in the presence of burst mode data in which an earlier burst data rate may require signal retiming/passing through the burst mode path clock and data recovery (CDR) unit.

FIG. 18 illustrates other example waveforms of a fast link acquisition process in the presence of burst mode data in which an earlier burst data rate may require signal retiming and/or passing through the BM path CDR unit. In some examples, the waveform illustrated in FIG. 16 is generated from any of the example systems 1200 in FIG. 12, 1300 in FIG. 13, and/or 1400 in FIG. 14.

FIG. 18 illustrates other example permutations (including FIG. 17) using a subset of features captured in the below Table 2, when a previous burst X 1836SA/1838SA has a high rate.

Table 2 illustrates example waveform scenarios in connection with FIG. 18 when the previous burst X 1836SA/1838SA is a high rate data burst and requires BM path CDR retiming.

TABLE 2 example waveform scenarios in connection with FIG. 18.

| Scenarios | Clock signal to Mux A | Clock signal to Mux B | PRBS to Mux A | PRBS to Mux B | A-A | A-B | A-C |
|---|---|---|---|---|---|---|---|
| 1 | Yes | No | No | Yes | Clock signal | Locked to clock signal | PRBS |
| 2 | No | Yes | Yes | No | PRBS | Locked to PRBS | Clock signal |
| 3 | Yes | No | No | No | Clock signal | Locked to clock signal | No signal |
| 4 | Yes | Yes | No | No | Clock signal | Locked to clock signal | Clock signal |
| 5 | No | No | Yes | No | PRBS | Locked to PRBS | No signal |
| 6 | No | No | Yes | Yes | PRBS | Locked to PRBS | PRBS |

In Table 2, Mux A and Mux B may be any of the Mux A and the Mux B illustrated in the example systems 1200 in FIG. 12, 1300 in FIG. 13, and/or 1400 in FIG. 14.

In some examples, as shown in Table 2, using the circuit components in FIG. 12, the term "clock signal" described in Table 2 may refer to a recovered clock signal from the clock divider block (e.g., 1282) based on a recovered clock signal from the clock recovery unit 1266 of the continuous path 1254. The term "PRBS" described in Table 2 may refer to a signal (e.g., PRBS) generated by a random signal generator (e.g., 1284).

With respect to scenario 1, "Clock signal to Mux A" having a value "Yes" may represent that a clock signal is provided to or is selected by the Mux A 1286. "Clock signal to Mux B" having a value "No" may represent that a clock signal (e.g., whether or not the clock signal has been processed through the CDR unit 1216) is not provided to or is not selected by the Mux B 1288. "PRBS to Mux A" having a value "No" may represent that a PRBS is not provided to or is not selected by the Mux A 1286. "PRBS to Mux B" having a value "Yes" may represent that a PRBS is provided to and selected by the Mux B 1288.

Still referring to scenario 1, "A-A" having a value "Clock signal" may represent that, in FIG. 18, the "A-A" portion of a BM path CDR input signal 1814S is the clock signal which has been selected by the Mux A 1286 (e.g., a recovered clock signal from the clock divider block 1282 that has been selected by the Mux A 1286), shown as the signal 1814SC (e.g., also shown in FIG. 17 as CM path CDR recovered clock of 1714SC). "A-B" having a value "Locked to clock signal" may represent that, in FIG. 18, the "A-B" portion of a BM path CDR lock signal 1816S is locked to the clock signal which has been selected by the Mux A 1286 (e.g., a recovered clock signal from the clock divider block 1282 that has been selected by the Mux A 1286), shown as the signal 1816SC (e.g., also shown in FIG. 17 as locked to CM path CDR recovered clock of 1716SC). "A-C" having a value "PRBS" may represent that, in FIG. 18, the "A-C" portion of a BM path output driver signal 1824S/1828S is the PRBS which has been selected by the Mux B 1288, shown as signal 1824SC/1828SC (e.g., also shown in FIG. 17 as PRBS 1724SC/1728SC). In this scenario 1, the Mux A 1286 does not receive a PRBS, and the Mux B 1288 receives a PRBS directly (e.g., directly from a random signal generator (e.g., 1284) without having the PRBS pass through the Mux A 1286 or the CDR unit 1216).

Similarly, in other scenarios, "A-A" having a value "PRBS" may represent that, in FIG. 18, the "A-A" portion of a BM path CDR input signal 1814S is a PRBS, shown as the signal 1814SC (e.g., also shown in FIG. 17 as the PRBS of 1714SC). "A-B" having a value "Locked to PRBS" may represent that, in FIG. 18, the "A-B" portion of a BM path CDR lock signal 1816S is locked to a PRBS which has been selected by the Mux A 1286, shown as the signal 1816SC (e.g., also shown in FIG. 17 as locked to the internal PRBS input signal of 1716SC). For scenario 2, "A-C" having a value "Clock signal" may represent that, in FIG. 18, the "A-C" portion of a BM path output driver signal 1824S/1828S is the clock signal that has been provided directly to and selected by the Mux B 1288 (e.g., directly from a component (e.g., a clock divider block 1282 or a clock recovery unit 1266)) without having the clock signal pass through the Mux A 1286 or the CDR unit 1216. This example is not illustrated in FIGS. 12-14. For scenario 4, "A-C" having a value "Clock signal" may represent that, in FIG. 18, the "A-C" portion of a BM path output driver signal 1824S/1828S is the clock signal that has been selected by the Mux A 1286, processed through the CDR unit 1216 and selected by the Mux B 1288, shown as the signal 1824SC/1828SC. "A-C" having a value "No signal" may represent that, in FIG. 18, the "A-C" portion of a BM path output driver signal 1824S/1828S provides no signal (e.g., provides neither the clock signal nor the PRBS) (i.e., the signal 1824SC/1828SC consists of no signal). In one or more examples, the term "no signal" may represent a non-toggling logic high signal, a non-toggling logic low signal, or a non-toggling signal where the output signals at the output ports 1224 and 1228 are at an equal voltage level.

While the foregoing descriptions relating to Table 2 are provided mainly in reference to FIGS. 12, 17 and 18, similar descriptions are applicable with reference to FIGS. 13 and 14; hence, such descriptions may be omitted for brevity.

It is noted that in alternative examples (not shown in FIGS. 12-14), the term "clock signal" described in Table 2 may refer to a recovered clock signal from the clock recovery unit 1266 of the continuous path 1254 without having the recovered clock signal pass through the clock divider block 1282. In other alternative examples (not shown in FIGS. 12-14), a recovery circuit 1280 may include other components (not shown in FIGS. 12-14,) and the term "clock signal" described in Table 2 may refer to a recovered clock signal from one or more of such other components (not shown in FIGS. 12-14).

The remaining waveforms and/or some of the above described waveforms of FIG. 17 and FIG. 18 may be substantially same or similar to the waveforms described in FIG. 10 and/or substantially same or similar to the waveforms described in other Figures of the present disclosure unless described or illustrated otherwise. The descriptions of those waveforms may be omitted for brevity.

Referring to FIGS. 15-18, the waveforms for the BM path output driver signal (e.g., 1624S/1628S) shown in FIGS. 15-18 may be the same or substantially similar, the waveforms for the BM path output driver AC coupling capacitor level (e.g., 1624CS/1628CS) shown in FIGS. 15-18 may be the same or substantially similar, and the waveforms for the host MAC received device state (e.g., 1632S) shown in FIGS. 15-18 may be the same or substantially similar.

At the output stage 1218 of the burst mode data signal path 1252, the burst mode data path output signal 1624S/1628S (also referred to as a BM path output driver signal 1624S/1628S) may correspond to the burst X signal via CDR bypass path 1624SA/1628SA (or burst X recovered signal 1824SA/1828SA), followed by the signal 1624SC/1628SC signal (or 1824SC/1828SC) based on a signal from the continuous mode data signal path 1254, and followed by the bust X+1 recovered signal 1624SB/1628SB after the partial CDR lock acquisition period 1616SC (Tcdr) acquired using the BM path CDR lock signal 1616S for the burst X+1.

Furthermore, the BM path output driver AC coupling capacitor level 1624CS/1628CS at the AC coupling capacitors 1224C/1228C may be continuously charged to the required common mode level which may eliminate the discharging and charging shown in FIG. 10. For example, the BM path output driver AC coupling capacitor level (or voltage level) (e.g., 1624CS/1628CS) may be continuously charged to the required common mode level during the entire duration shown in FIG. 16. This entire duration may include the duration of the burst X (e.g., D1 in FIG. 16), the duration between the burst X and burst X+1 (e.g., D2 in FIG. 16), and the duration of the burst X+1 (e.g., D3 in FIG. 16). In this example, D1 ends and D2 starts when A-C starts. In this example, A-C starts with the de-assertion of the BM Path on-chip detect signal (e.g., 1620SA). In this example, D2 ends and D3 starts when the partial CDR lock acquisition period (e.g., 1616SC) ends. In this example, the BM path output driver AC coupling capacitor level (or voltage level) 1624CS/1628CS for the duration between the burst X and burst X+1 may have the same or substantially the same capacitor level (or voltage level) as the AC coupling capacitor level (or voltage level) 1624CS/1628CS for the duration of the burst X or the burst X+1. The foregoing provides non-limiting examples, and the subject technology is not limited thereto. In some examples, the AC coupling capacitors 1224C/1228C may be continuously charged even when no input signal is provided to the burst mode signal path 1252 from the input interface stage 1212. Hence, in one or more advantageous aspects, AC coupling capacitor charge time (Tac) (e.g., time for 924CSB1/928CSB1 in FIG. 10) is not considered in the link timing budget in FIGS. 15-18.

The host MAC received device state 1632S at the host MAC receiver device(s) 1232 may include an adapted state 1632SA for burst X, an adapted state 1632SC corresponding to the signal 1624SC/1628SC from the continuous mode data signal path 1254 including the partial CDR lock acquisition period 1616SC, the partial adaptation routine 1632SD (Tmac_rx_adapt) for burst X+1, and an adapted state 1632SB for burst X+1. The full re-adaptation routine 932SB1 described in FIG. 10 may be eliminated. The time for the partial adaptation routine 1632SD (Tmac_rx_adapt) for burst X+1 may be the partial MAC device EQ/FFE adaptation and/or CDR lock acquisition period.

In the example waveforms described herein (e.g., FIGS. 15 to 18), the amount of time required for key blocks within the data burst link (e.g., systems 1200 in FIG. 12, 1300 in FIGS. 13, and/or 1400 in FIG. 14) may be summarized as:

$$Ttot\_link\_fast = Tcdr + Tmac\_rx\_adapt$$

In the above equation:
Ttot_link_fast (total link time of interest) may be the total period required for data burst X+1 to pass from the time that the burst mode data signal path device's input stage signal adjust procedure (e.g., at the input interface stage 1212 of FIG. 12) completes to the time when the host MAC receiver device's input stage (e.g., adaptive EQ/FFE at 1274/1232 of FIG. 12) concludes its adaption procedure.
Tmac_rx_adapt may be the time required for the host MAC receiver device's input stage (adaptive EQ/FFE at 125741232 of FIG. 12) to complete the adaption procedure after being in a partially adapted state due to receiving a continuous signal (i.e., PRBS) during the silent period (e.g., guard time) between the end of burst X and the start of burst X+1. The advantage of the host MAC receiver device's input stage maintaining its adaptive stage may be a material decrease in the amount of time required to re-adapt. Transmitting a random signal during guard time may also help reduce overhead time in other blocks contained within the host MAC.
Tcdr may be the time required for the burst mode data signal path device's CDR unit (e.g., 1216 of FIG. 12) to lock to the incoming data burst after being in a state of partial lock (e.g., frequency lock only). During partial lock acquisition, the CDR unit may enter a fast lock mode which allows the CDR unit to expedite the lock time at the potential expense of temporarily deviating from the mission mode jitter specifications of the CDR unit. For example, the CDR unit may employ an automated scheme whereby the CDR unit temporarily increases its loop bandwidth (LBW) until a fully locked state is attained. In some examples, depending on the CDR unit's architecture, Tcdr_full_lock>10,000×Tcdr. In some examples, Tcdr may be specific to the BM data path CDR unit 1216, and may be independent of the host MAC receiver device(s) 1232. Therefore, the host MAC receiver device(s) 1232 may have a CDR lock acquisition period of its own, which may be completely dependent on the implementation details of the host MAC receiver device(s) 1232.

In some examples, Tcdr_full_lock>>Tcdr, Tmac_rx_full_adapt>Tmac_rx_adapt, and Tac>0. It follows that: Ttot_link>>Ttot_link_fast (i.e., the total link time of interest may be greatly reduced when the example systems 1200 in FIG. 12, 1300 in FIG. 13, and/or 1400 in FIG. 14 are implemented).

Figure 19:
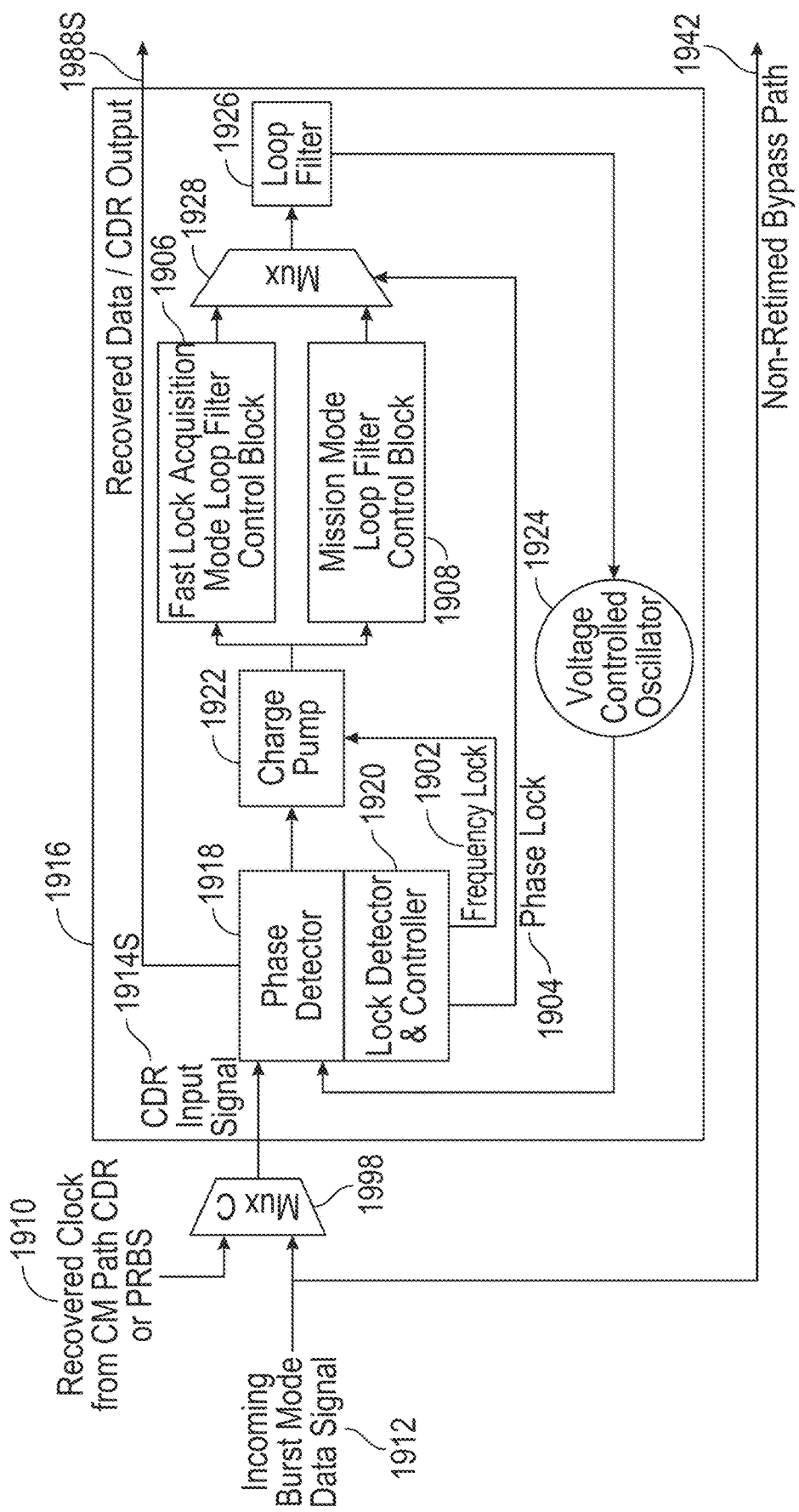
FIG. 19 illustrates an example block diagram of a CDR unit with an example implementation scenario including a multiplexer at the input of the CDR unit.

FIG. 19 illustrates an example block diagram of a CDR unit 1916 with an example implementation scenario including a multiplexer (e.g., a Mux C 1998) at the input of the CDR unit 1916. In some examples, fast lock components may be included in the CDR unit 1916. In some examples, the CDR unit 1316, the Mux C 1398 and the bypass path 1342 of system 1300 in FIG. 13 may be represented by or correspond to the CDR unit 1916, the Mux C 1998 and the non-retimed bypass path 1942 respectively in FIG. 19.

Referring to FIG. 19, the recovered clock from CM path CDR or PRBS 1910 (e.g., from the clock divider block 1382, or from the random signal generator 1384 of FIG. 13) may be an input signal for the Mux C 1998 (e.g., 1398). In one or more examples, a "recovered clock from CM path CDR or PRBS" 1910 may be a "CM path CDR recovered clock or PRBS" (e.g., 1514SA or 1714SC). A "recovered clock from CM path CDR" of the signal 1910 may represent a "CM path CDR recovered clock" of the signal 1514SA or 1714SC. A "PRBS" of the signal 1910 may represent a "PRBS" of the signal 1514SA or 1714SC. A "recovered clock from CM path CDR" of the signal 1910 may be a clock signal from (or based on a signal from) a clock divider block 1282 or may be or a clock signal from (or based on a signal from) a clock recovery unit 1266.

The incoming burst mode data signal 1912 (e.g., from the input stage 1314 of FIG. 13) may be another input signal for the Mux C 1998. The recovery circuit 1380 may provide the incoming burst mode data signal 1912 to the Mux B through the non-retimed bypass path 1942 (e.g., 1342).

The CDR input signal 1914S may be an output signal from the Mux C 1998 and an input signal to the phase detector 1918 (for determining a frequency and/or a phase of the input signal) and an associated lock detector and controller 1920 (for determining and controlling the lock status of the input signal). Thus, the Mux C 1998 may select one of its three input signals (e.g., one of the CM path CDR recovered clock, PRBS, or the signal 1912) and output the selected signal as the CDR input signal 1914S. The phase detector 1918 may output a signal to the charge pump 1922 which may provide phase and/or frequency alignment information between the input signal of the BM path CDR unit 1316 and the clock phase and frequency of the BM path CDR unit 1316. The phase detector 1918 may also output recovered data/CDR output signal 1988S to a Mux B (e.g., the Mux B 1388 of FIG. 13). In one or more examples, the recovered data/CDR output signal 1988S may be an output signal of the CDR unit (e.g., 1216, 1316, 1416). The charge pump 1922 may output a signal to either a fast lock acquisition mode loop filter control block 1906 or a mission mode loop filter control block 1908. In one or more examples, a mission mode may refer to a normal operating mode.

A Mux 1928 may receive a signal from the fast lock acquisition mode loop filter control block 1906, a signal from the mission mode loop filter control block 1908, and/or a signal (e.g., a phase lock signal 1904) from the lock detector and controller 1920. The lock detector and controller 1920 may also output a signal (e.g., a frequency lock signal 1902) to the charge pump 1922. The Mux 1928 may select one of its input signals and output a selected signal to a loop filter 1926 which may output a signal (e.g., a voltage) to control a voltage controlled oscillator (VCO) 1924.

The VCO 1924 may be used to lock its frequency and/or phase (or the frequency and/or phase of its output signal) to the frequency and/or phase of the CDR input signal 1914S. Thus, the CDR unit 1916 may be locked (frequency and/or phase locked) to its CDR input signal 1914S.

In one or more examples, when the CDR unit 1916 (e.g., 1216, 1316, or 1416) is frequency locked to its CDR input signal 1914S, the VCO 1924 (or its output signal) is frequency locked to the CDR input signal 1914S, and the frequency of the VCO 1924 (or the frequency of the output signal of the VCO 1924) is the same or substantially the same as the frequency of the CDR input signal 1914S. When the CDR unit 1916 (e.g., 1216, 1316, or 1416) is phase locked to its CDR input signal 1914S, the VCO 1924 (or its output signal) is phase locked to the CDR input signal 1914S, and the phase of the VCO 1924 (or the phase of the output signal of the VCO 1924) is the same or substantially the same as the phase of the CDR input signal 1914S. When the CDR unit 1916 (e.g., 1216, 1316, or 1416) is frequency and phase locked to its CDR input signal 1914S, the VCO 1924 (or its output signal) is frequency and phase locked to the CDR input signal 1914S, and the frequency and phase of the VCO 1924 (or the frequency and phase of the output signal of the VCO 1924) are the same or substantially the same as the frequency and phase of the CDR input signal 1914S.

In one or more aspects, the simplified burst mode path CDR unit 1916 describes conceptually distinguishing components associated with frequency and phase lock signaling. Upon attaining frequency lock, that is, locking to the same frequency as the CDR input signal 1914S, the CDR unit 1916 may proceed to phase locking to the CDR input signal 1914S. For example, upon attaining the frequency lock 1902, that is, locking the frequency of the output signal of the VCO 1924 to the frequency of a CDR input signal 1914S (e.g., PRBS 1524SC/1528SC or 1724SC/1728SC), the CDR unit 1916 may proceed to obtain a phase lock 1904, that is, locking the phase of the output signal of the VCO 1924 to a CDR input signal 1914S (e.g., Burst X+1) during (or by the end of) a partial CDR lock acquisition period (e.g., 1616SC). Phase locking may be expedited by temporarily engaging a fast lock acquisition block (e.g., the fast lock acquisition mode loop filter control block 1906), which may trade off certain CDR metrics, such as the output jitter (i.e., may introduce unwanted output jitters). Upon attaining the phase lock 1904, the CDR unit 1916 may enter a mission mode state (e.g., at the mission mode loop filter control block 1908) which may maintain the phase lock 1904 to the incoming signal while optimally adhering to payload data signal integrity requirements. In some examples, the phase lock 1904 may represent or correspond to a CDR lock status indicator (e.g., 1290, 1390 or 1490 of FIGS. 12-14) or a BM path CDR lock signal (e.g., 1516S, 1616S, 1716S or 1816S of FIG. 15-18).

Since the recovered clock from the CM Path CDR (or PRBS) 1910 may have virtually or sufficiently the same frequency as the incoming burst mode data signal 1912, frequency lock may be constantly maintained when toggling between the input signals of the Mux C 1998. As such, toggling between the input signals of the Mux C 1998 may only require the burst mode path CDR unit 1916 to engage in the phase locking step.

In one or more aspects, during a guard time, outputting a random sequence (e.g., PRBS 1524SC/1528SC, 1624SC/1628SC, 1724SC/1728SC, or 1824SC/1828SC) at the output stage (e.g., 1218, 1318, or 1418) is advantageous because the random sequence having substantially the same frequency as a burst signal (e.g., burst X) can be used to prevent the BM path output driver AC coupling capacitors (e.g., 1224C/1228C) from being discharged. This is advantageous over the situation shown in FIG. 10 in which no signal is output during the guard time (e.g., there is no signal between 924SA/928SA and 924SB/928SB in FIG. 10). In some examples, compared with the clock signal from the clock divider block 1282, the pattern from the random signal generator 1284 may provide a more representative mission mode payload data signal which intentionally includes more types of jitter impairments (e.g., intersymbol interference (ISI) jitter) to allow the input stage (e.g., adaptive EQ/FFE included in the blocks 1274) of the downstream host MAC receiver device(s) (e.g., 1232 of FIG. 12) to more optimally adapt.

Figure 20:
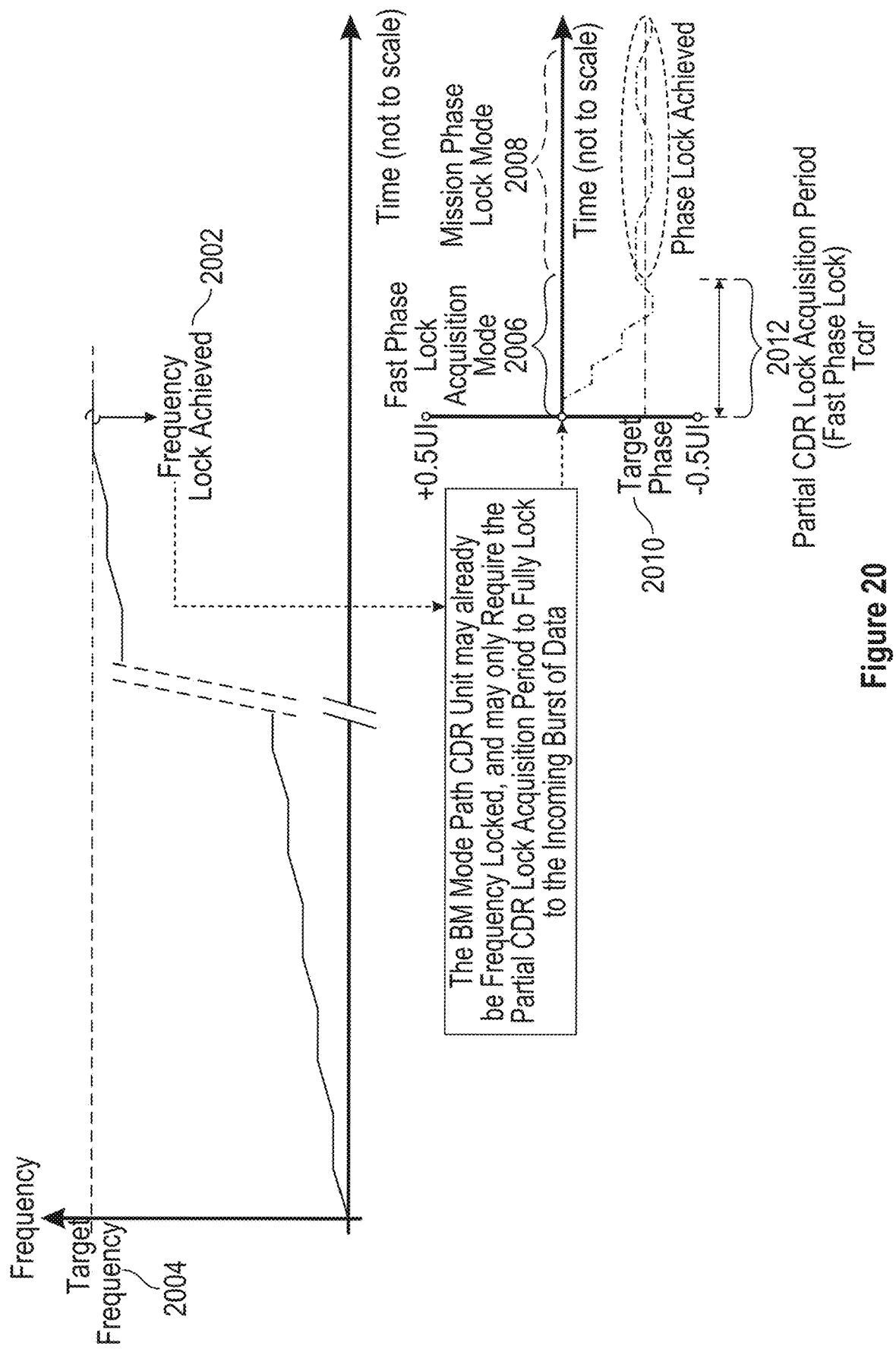
FIG. 20 illustrates an example diagram depicting a required period of time for a fast lock burst mode path CDR unit to lock to the incoming burst of data.
Figure 21:
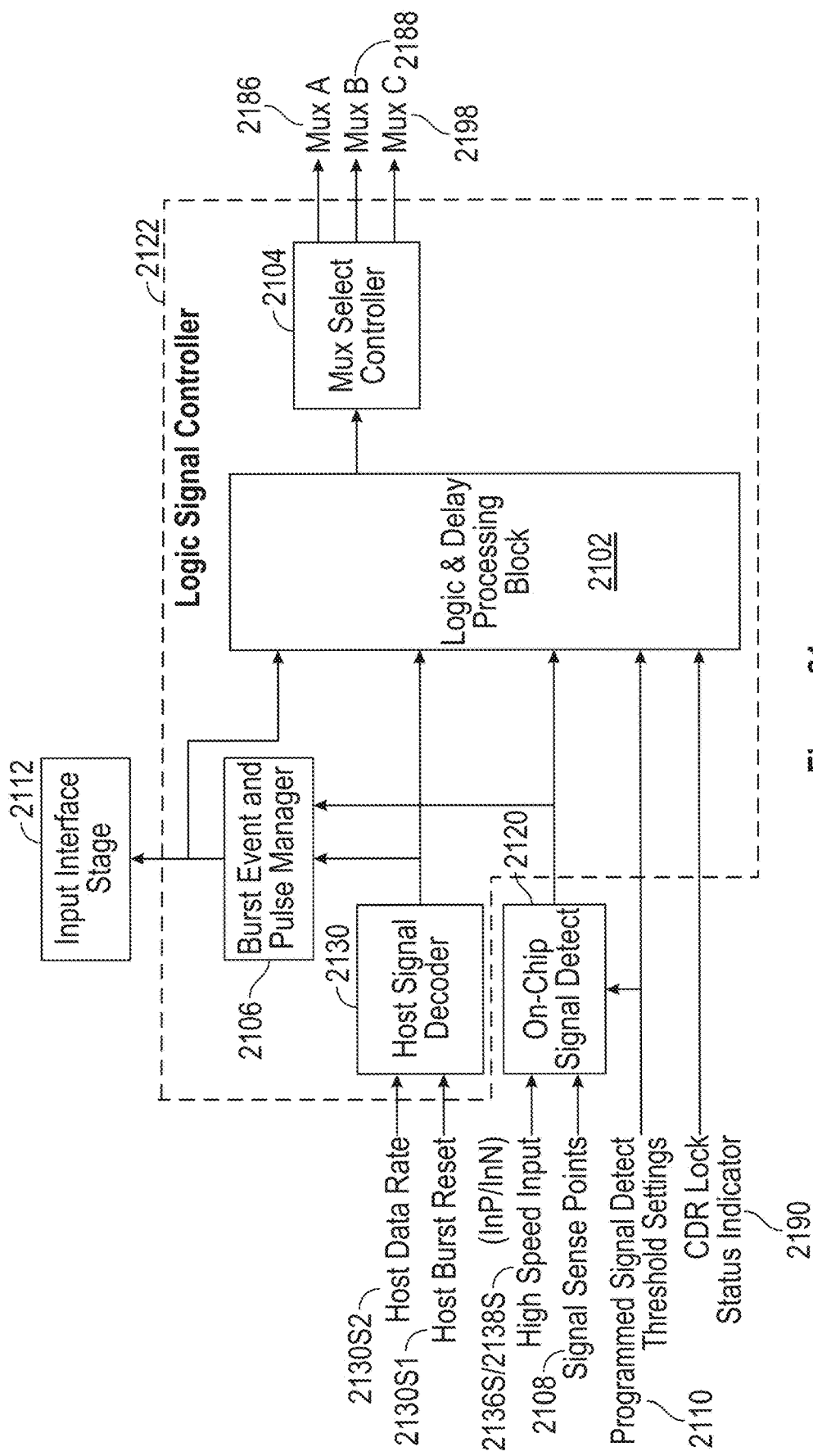

FIG. 20 illustrates an example diagram depicting a required period of time (e.g., Tcdr) for a fast lock burst mode path CDR unit (e.g., 1216, 1316, 1416 as described in FIGS. 12-21) to lock to the incoming burst of data. The fast lock burst mode path CDR unit may first achieve frequency lock 2002 for the incoming burst of data (e.g., during 1614SA of FIG. 16) to a target frequency 2004. As shown in FIGS. 15-18, the BM mode path CDR unit may already be frequency locked by the time the partial CDR lock acquisition period commences, and may only require the partial CDR lock acquisition period (e.g., 1616SC of FIG. 16) to be phase locked so that by the time the partial CDR lock acquisition period ends, the BM mode path CDR unit is substantially fully locked to the incoming burst of data. During the phase lock (or the partial CDR lock acquisition period), the incoming burst of data may first achieve the phase lock in a fast phase lock acquisition mode 2006 (e.g., at the fast lock acquisition mode loop filter control block 1906). The incoming burst of data may then achieve the full phase lock to a target phase 2010 in a mission phase lock mode 2008 (e.g., at the mission mode loop filter control block 1908). The time (partial CDR lock acquisition period Tcdr) to achieve fast phase lock 2012 may be substantially the same to the time within the fast phase lock acquisition mode 2006 in which the phase of the incoming burst of data may already reach the target phase 2010 level.

Figure 21:
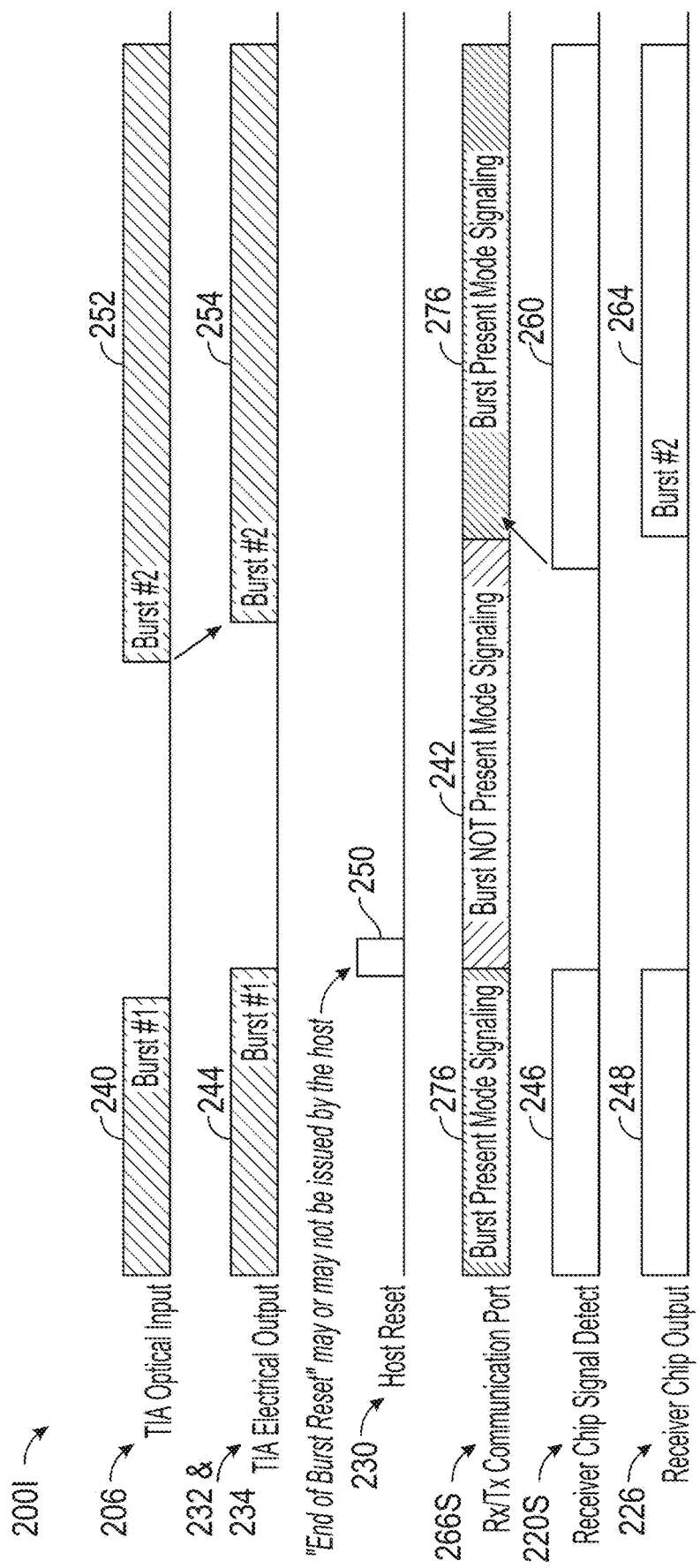
FIG. 21 illustrates an example block diagram of a logic signal controller and peripheral block connections.

FIG. 21 illustrates a block diagram of an example logic signal controller 2122 and peripheral block connections.

FIG. 21 illustrates the example logic signal controller 2122 with an example implementation scenario including a Mux C 2198 at the input of a CDR unit of the burst mode data signal path. In some examples, the logic signal controller 1322, the Mux A 1386, the Mux B 1388, the Mux C 1398, the input interface stage 1312, the on-chip signal detect 1320, the host data rate 1330S2, the host burst reset 1330S1, the high speed burst mode data input 1336S/1338S, and the CDR lock status indicator 1390 of system 1300 in FIG. 13 may be represented by or correspond to the logic signal controller 2122, the Mux A 2186, the Mux B 2188, the Mux C 2198, the input interface stage 2112, the on-chip signal detect 2120, the host data rate 2130S2, the host burst reset 2130S1, the high speed burst mode data input 2136S/2138S, and the CDR lock status indicator 2190 respectively in FIG. 21.

Referring to FIG. 21, the logic signal controller 2122 may include the logic and delay processing block 2102, the mux select controller 2104, the burst event and pulse manager 2106, and the host signal decoder 2130. The logic and delay processing block 2102 may receive inputs from the CDR lock status indicator 2190, the programmed signal detect threshold settings 2110, the on-chip signal detect 2120, the host signal decoder 2130, and/or the burst event and pulse manager 2106. The on-chip signal detect 2120 may receive inputs from the (InP/InN) high speed input 2136S/2138S, the signal sense points 2108, and/or the programmed signal detect threshold settings 2110. The host signal decoder 2130 may receive inputs from the host data rate 2130S2 and/or the host burst reset 2130S1. The burst event and pulse manager 2106 may receive inputs from the host signal decoder 2130, and/or the on-chip signal detect 2120. The burst event and pulse manager 2106 may output signals to the input interface stage 2112. The logic and delay processing block 2102 may output signals to the mux select controller 2104 which may further output signals to the Mux A 2186, the Mux B 2188, and/or the Mux C 2198.

FIG. 21 illustrates the input logic signals associated with the logic signal controller 2122 which may be implemented in any of the configurations in FIGS. 12-20.

Now referring to FIGS. 2A-2H, 3, 7A, 8A-8B, 9-10, 12-14, 15-18, 19 and 21, some of the signals shown in different figures are described in relation to one another for illustration purposes. For the waveforms illustrated in one or more of these figures (as well as waveforms in one or more other figures), a horizontal axis may represent time. In one or more aspects, a waveform disclosed herein may illustrate a conceptual timing diagram of a signal or the presence or absence of a signal. In one or more aspects, an error or tolerance range is not illustrated to avoid obscuring aspects of the present disclosure. A block shown in a waveform may represent one or more signals.

Referring to FIGS. 2A-2H, 3, 7A, 8A-8B, 9-10, 12-14, 15-18, 19 and 21, in one or more example, a BM data path input signal (e.g., 1536S/1538S or 1736S/1738S) of FIGS. 15-18 may represent an input signal (e.g., 236/238) shown in FIGS. 2A-2H, or a burst mode data path input signal shown in FIGS. 9-10 and 12-14 (e.g., 936S/938S, 1336S/1338S). After a BM data path input signal (e.g., 1536S/1538S) passes through an input interface stage (e.g., 212, 912, 1212, or 1312) and an input stage (e.g., 214, 914, 1214, 1314, or 1414) shown in FIGS. 9-10 and 12-14, an output signal of the input stage (e.g., 214, 914, 1214, 1314, or 1414) may represent an incoming burst mode data signal 1912 of FIG. 19.

In some examples, the incoming burst mode data signal 1912 may correspond to the Burst X+1 1614SB of FIG. 16, Burst X or Burst X+1 of the BM path CDR input signal of FIG. 17, or 1814SA and 1814SB of FIG. 18.

In some examples, a host reset signal (e.g., 1530S1) of FIGS. 15-18 may represent a host reset signal 230 of FIG. 2A-2H or 8A-8B, a data burst reset 930S1 of FIG. 9, a host reset signal 930S1 of FIG. 10, a data burst reset (e.g., 1230S1 or 1330S1) from the host (e.g., 1250). shown in FIG. 12-14, or a host burst reset 2130S1 of FIG. 21.

In some examples, a host data rate signal (e.g., 1530S2) of FIGS. 15-18 may represent the host rate information 306 of FIG. 3, a host data rate signal 930S2 of FIGS. 9-10, a data rate (e.g., 1230S2 or 1330S2) from the host 1250 shown in FIG. 12-14, or a host data rate 2130S2 of FIG. 21.

In some examples, a BM path on-chip detect signal (e.g., 1520S or 1720S) of FIGS. 15-18 may be generated and output by an on-chip signal detection circuit (e.g., 1220 or 1320) of FIGS. 12-14, and may represent a signal detect signal 220S of FIGS. 8A-8B generated by a signal detect circuit 220 of FIGS. 2A-2H, a BM path on-chip detect signal 920S of FIG. 10 generated by an on-chip signal detection circuit 920 of FIG. 9, or an output signal of the on-chip signal detect 2120 of FIG. 21.

In some examples, a BM path input stage signal adjust procedure (e.g., 1512SB) of FIGS. 15-18 may be performed by the input interface stage (e.g., 1212, 1312 or 2112) of FIGS. 12-14 and 21, and may represent the DC offset removal process performed by the DC offset removal stage 212 or the limiting amplifier signal recovery stage 302 of FIGS. 2A-2H, 3 and 7A.

In some examples, a BM path CDR input signal (e.g., 1614S or 1814S) of FIGS. 15-18 may be provided to an input node of a CDR unit (e.g., 1216, 1316 or 1416), and may represent a CDR input signal 1914S of FIG. 19. A BM path CDR input signal (e.g., 1614S or 1814S) of FIGS. 15-18 may be, for example, Burst X, a CM path CDR recovered clock signal, a PRBS or Burst X+1, as illustrated in FIGS. 15-18.

In some examples, a BM path CDR lock signal (e.g., 1616S, 1716S or 1816S) of FIGS. 15-18 may be generated by a CDR unit (e.g., 1216, 1316 or 1416). A BM path CDR input signal (e.g., 1614S or 1814S) of FIGS. 15-18 may be, for example, locked to Burst X, a CM path CDR recovered clock signal, a PRBS or Burst X+1, as illustrated in FIGS. 15-18 and Tables 1 and 2.

In some examples, a CDR lock status indicator (e.g., 1290 or 1390) of FIGS. 15-18 may be generated by a CDR unit (e.g., 1216, 1316 or 1416) and provided to a logical signal controller (e.g., 1222, 1322, 1422, or 2122). A CDR lock status indicator (e.g., 1290 or 1390) of FIGS. 15-18 may represent a CDR lock status indicator 2190 of FIG. 21.

In one more example aspects, when a first signal (or a first item) is substantially the same as a second signal (or a second item), the characteristics (e.g., amplitude, voltage level, data rate, pattern, shape, frequency, and/or phase) of the first signal (or the first item) may be substantially the same as the characteristics of the second signal (or the second item). For example, the characteristics of the first signal (or the first item) may be the same as the characteristics of the second signal (or the second item) with a marginal difference (e.g., +/−1%, +/−2%, +/−3%, +/−5%, or +/−10% of the second signal or second item's characteristics). For example, a first signal having a voltage level that is substantially the same as a second signal's voltage level may represent that the first signal's voltage level is within +/−10% of the second signal's voltage level. These are non-limiting examples, and the subject disclosure is not limited thereto. In one or more examples, the data rate of a first signal can be considered substantially the same as the data rate of a second signal if their difference is within a pull-in range of the BM path CDR unit (e.g., 1216, 1316 or 1416 of FIGS. 12-14). The pull-in range of the BM path CDR unit may, for example, refer to an allowable frequency difference between (a) a frequency of an input signal of the BM path CDR unit and (b) a nominal VCO frequency of the BM path CDR unit, wherein within the allowable frequency difference, the BM path CDR unit can still reliably phase lock without the need to execute a full frequency acquisition period (e.g., Tcdr_freq_lock). However, the exact pull-in range of the BM path CDR unit may vary depending on several factors, such as the specific design of the BM path CDR unit, the characteristics of the network environment, and the desired performance specifications. It should be noted that the foregoing describes non-limiting examples. In one or more examples, the foregoing may be applicable to terms such as "substantial" in a similar manner. The descriptions provided in this paragraph are non-limiting examples, and the subject disclosure is not limited thereto.

In one or more examples, a reference pattern signal may be, may represent, or may include a recovered clock signal or a sequence. In one or more aspects, a reference pattern signal may be, may represent, or may include, for example, one or more of the following: an output signal (e.g., a recovered clock signal) of a clock recovery unit (e.g., 1266) of the CM mode data signal path; an output signal (e.g., a recovered clock signal) of a clock divider block (e.g., 1282, 1382 or 1482); an output signal (e.g., PRBS) of a random signal generator (e.g., 1284, 1384 or 1484); an output signal (e.g., a recovered clock signal or PRBS) of a Mux (e.g., 1286, 1386, 1398 or 1486) coupled to an input node of a CDR unit (e.g., 1216, 1316 or 1416); an output signal (e.g., a recovered clock signal or PRBS) of a Mux (e.g., 1288, 1388 or 1488) coupled to an output node of a CDR unit (e.g., 1216, 1316 or 1416); an output signal (e.g., a recovered clock signal or PRBS) of an out stage (e.g., 1218, 1318 or 1418); or a clock signal or a sequence based on any of the foregoing. In one or more aspects, a reference pattern signal may be, may represent, or may include, for example, one or more of the following: one or more of the signals illustrated as 1514SA, 1524SC/1528SC, 1714SC, 1724SC/1728SC, A-A or A-C of FIG. 15-18, or 1910 of FIG. 19. In one or more examples, a reference pattern signal is different from a data signal (e.g., burst X, or burst X+1). These are non-limiting examples, and the subject technology is not limited thereto.

Techniques and embodiments for generating a reference pattern signal are not limited to those described or illustrated herein. In some examples, a burst mode data signal path (e.g., 1252, 1352 or 1452) may include additional components, such as one or more additional components (not shown) for processing a reference pattern signal. In other examples, one or more of the components described or illustrated herein may be removed or may be eliminated from a burst mode data signal path (e.g., 1252, 1352 or 1452). For example, one or more of the components shown in FIGS. 12-15 (e.g., a clock divider block, a random signal generator, a Mux A, a Mux B, or a Mux C) may be eliminated from a burst mode data signal path (e.g., 1252, 1352 or 1452) and not be used in processing or generating a reference pattern signal.

This disclosure provides specific example embodiments in connection with FIGS. 1A-22, these are examples, and the subject technology is not limited to these examples. Furthermore, in one or more example implementations, one or some of the circuits or components shown in FIG. 1A-22 (e.g., 1282 or 1284 in FIG. 12) may be removed. In one or more example implementations, one or some of the circuits or components shown in FIGS. 1A-22 (e.g., one or more multiplexers) may be moved or relocated. In one or more example implementations, one or more additional circuits or components (e.g., a circuit to further process a clock signal) may be added to one or more of FIGS. 1A-22.

In one or more examples, with the ever-increasing demand for higher data rates, devices participating in a link may necessitate the use of blocks such as CDRs, programmable or adaptive equalizers, and/or FFEs in order to adequately recover the signal and the signal's required integrity. Such blocks may consume time to lock and/or adapt to the incoming signal which may pose a challenge in applications which pass bursts of data due to the associated short link negotiation budget specifications (e.g., PON/ International Telecommunication Union (ITU)). The algorithm/process/systems/implementation schemes described above may provide a key advantage in facilitating the faster data burst signal recovery times.

In one or more aspects, the features, embodiments and operations described with respect to FIGS. 12-21 are more advantageous than the features, embodiments and operations described with respect to FIGS. 9-11. In one or more aspects, the same or similar names or notations may include or provide the same or similar features, functions and operations unless described or illustrated otherwise. For example, the notation "BM path CDR input signal" in FIGS. 15-18 may include or provide the same or similar features, functions and operations unless described or illustrated otherwise. In one or more aspects, reference numerals of similar items having the same last two digits may include or provide the same or similar features, functions and operations unless described or illustrated otherwise. For example, items 212, 912 and 1212 may include or provide the same or similar features, functions and operations. In another example, items 1216, 1316, and 1416 may include or provide the same or similar features, functions and operations unless described or illustrated otherwise.

Example Applications

In one or more aspects, the subject technology may be used in any application involving data which arrives in bursts. For example, the subject technology may be used in a 10 gigabit-capable passive optical network (XG-PON) system that provides high speed data communications, over a fiber optical cable. The subject technology, however, is not limited to this network system, and it may be utilized in other PON systems, such as a gigabit PON (GPON), an Ethernet PON (EPON), a 10 gigabit symmetrical PON (XGS-PON), and an HSPON. A PON may be provided, for example, between an internet service provider (ISP) and end users.

Figure 22:
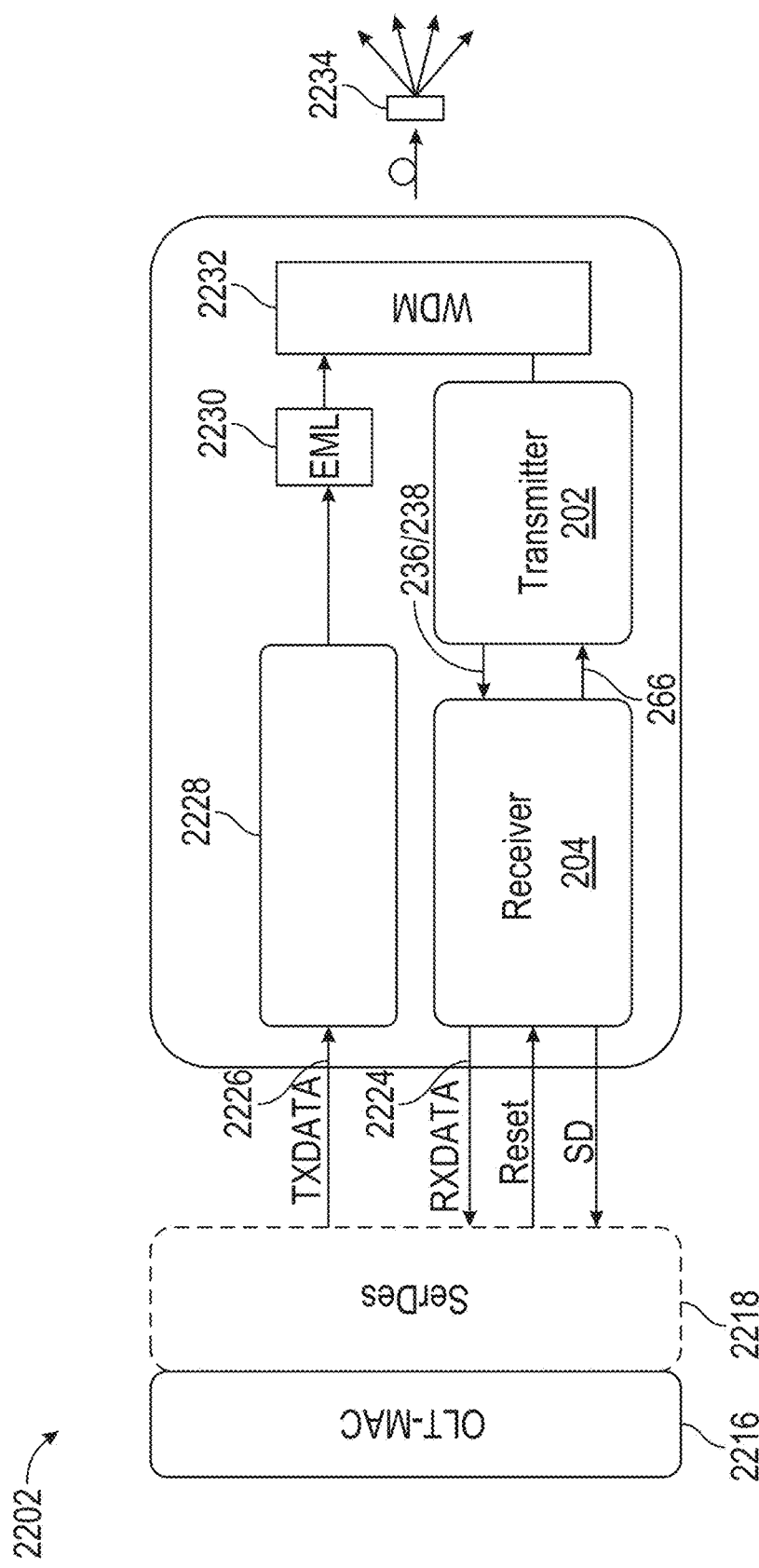
FIG. 22 is a diagram of an example of an optical line terminal (OLT), illustrated in accordance with one or more examples of the subject technology.

FIG. 22 is a diagram of an example optical line terminal (OLT), illustrated in accordance with one or more examples of the subject technology. In this example, an OLT 2202 may be an OLT in an XG-PON ecosystem. However, as described above, the subject technology is not limited thereto. The OLT 2202 may include an OLT-MAC 2216 that controls communication of downstream data and upstream data. The OLT 2202 may include a serializer-deserializer (SerDes) 2218. The deserializer of the SerDes 2218 may receive the data (RXDATA 2224) from the receiver 204. The serializer of the SerDes 2218 may transmit the data (TXDATA 2226) to a transmitter block 2228 which is connected to an electro-absorption modulated laser (EML) 2230. The EML 2230 is a semiconductor device which can be used for modulating the intensity of an optical signal. The EML 2230 is connected to a wavelength-division multiplexer (WDM) 2232 used for fiber-optic communications. The WDM 2232 may multiplex a number of optical carrier signals onto a single optical fiber by using different wavelengths of laser light, and thereby enable bidirectional communications over a single strand of fiber. On the transmitting side, electrical signals may be sent from the SerDes 2218 to the transmitter block 2228 which converts electrical signals to optical signals. The optical signals may then be sent to the EML 2230 and then to the WDM 2232 for fiber-optic communications. On the receiving side, optical signals received from the WDM 2232 may be sent to the transmitter 202 which is connected to the receiver 204. The transmitter 202, the receiver 204, the input signals 236 and 238, and the communication port 266 coupled to the receiver 204 are described above in reference to FIGS. 2A-2I. The receiving side may convert the optical signals to electrical signals (e.g., using the transmitter 202) and convert a serial data stream into parallel data streams (e.g., using the deserializer of the SerDes 2218). It should be noted that in another configuration, some of the components may be combined or divided into separate parts, and/or eliminated.

The circuits and components in the burst mode data signal path of one or more of FIGS. 9, 12-14, 19 and 21 may be implemented in the receiver 204 of FIG. 22. The circuits and components in the continuous mode data signal path of one or more of FIGS. 9 and 12-14 may be implemented in the transmitter block 2228 of FIG. 22. The host of one or more of FIGS. 9 and 12-14 and/or their components may include, may represent or may be a part of the OLT-MAC 2216 and/or SerDes 2218.

In one or more examples, the transmitter 202, the receiver 204 and their components (e.g., 208, 210, 212, 214, 216, 218, 220, and 222) and devices and components shown in FIGS. 9, 12-14, 19, 21 and 22 may be, may include, or may be implemented using, one or more circuits such as transistors (e.g., MOSFETs and/or BJTs). Each of the foregoing may be sometimes referred to as a circuit or one or more circuits. They may also include passive components (e.g., resistors and capacitors). The components of the pulse negotiation and communication management controller 222 (e.g., 316, 318 and 328) may be implemented using circuits. In some examples, one or more of these components may include a processor. A processor may be, for example, a microprocessor or a microcontroller. A processor may include one or more processors. In one or more examples, the circuits in the continuous mode data signal path and in the burst mode data signal path shown in FIGS. 9 and 12-14 may be implemented in a single integrated circuit (IC), in a single module or using a single printed circuit board (PCB). In one or more other examples, the foregoing may be implemented in multiple ICs, in multiple module or using multiple PCBs. For example, the circuits in the continuous mode data signal path may be implemented in one or more first ICs, first modules or first PCBs, and the circuits in the burst mode data signal path may be implemented in one or more second ICs, second modules or second PCBs.

Figure 23:
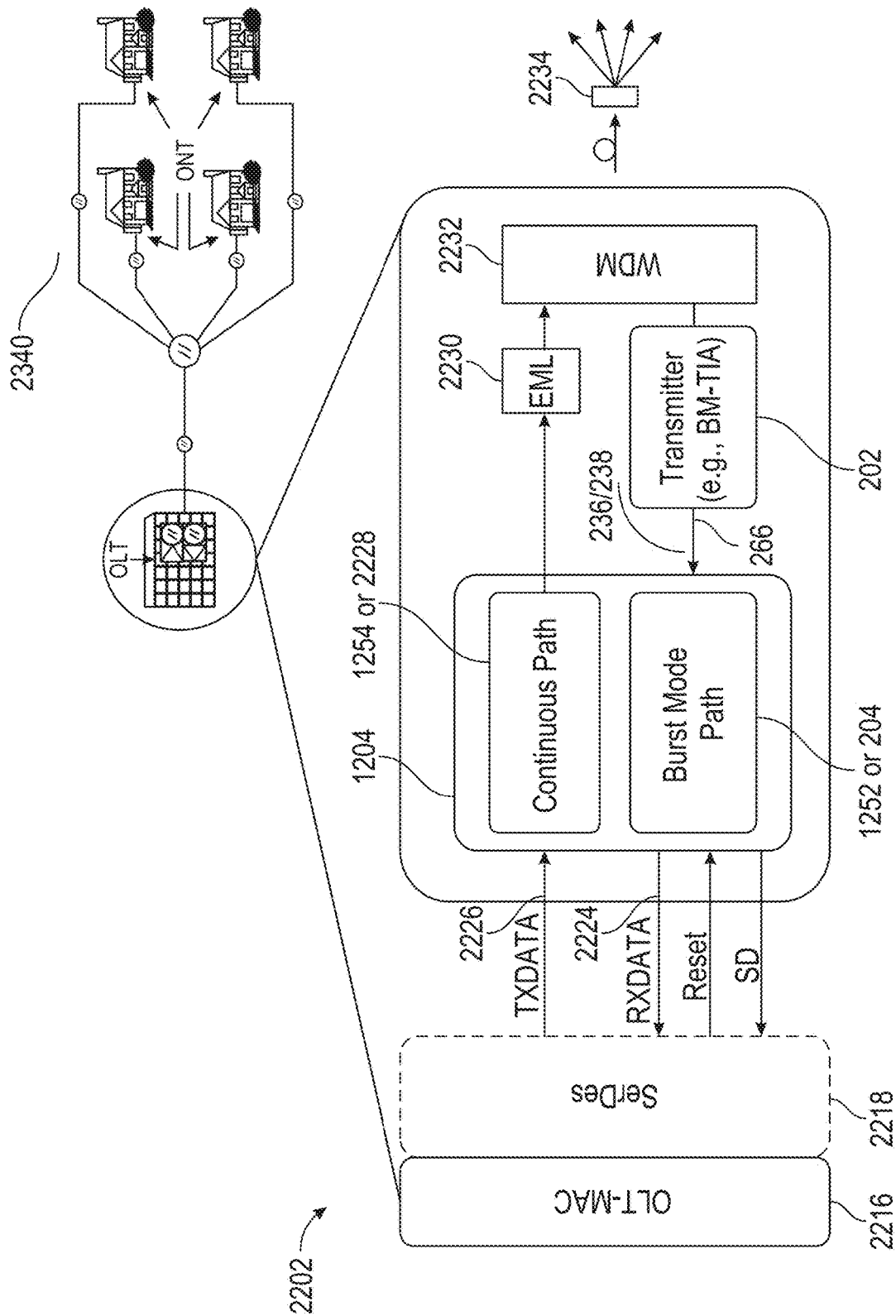
FIG. 23 is a diagram of another example of an OLT, illustrated in accordance with one or more examples of the subject technology.

FIG. 23 is a diagram of an example optical line terminal (OLT), illustrated in accordance with one or more examples of the subject technology. In this example, an OLT 2202 may be an OLT in an XG-PON ecosystem with optical network terminals (ONTs) 2340. FIG. 23 may contain components that are numbered the same as or similar to the components of FIG. 22 to represent the same or substantially the same components. The OLT 2202 may include an OLT-MAC 2216 that controls communication of downstream data and upstream data. The OLT 2202 may include a serializer-deserializer (SerDes) 2218. The deserializer of the SerDes 2218 may receive the data (RXDATA 2224) from the burst mode path 1252 (e.g., the burst mode data signal path 1252 of FIG. 12). In one or more examples, the burst mode path 1252 may be included in, may correspond to, or may be implemented in the receiver 204 of FIG. 2A-2I or 22. The serializer of the SerDes 2218 may transmit the data (TX-DATA 2226) to a continuous path 1254 (e.g., the continuous mode signal path 1254 of FIG. 12) which is connected to an electro-absorption modulated laser (EML) 2230. The continuous path 1254 may represent or correspond to the transmitter block 2228 of FIG. 22. The EML 2230 may be a semiconductor device which can be used for modulating the intensity of an optical signal. The EML 2230 is connected to a wavelength-division multiplexer (WDM) 2232 used for fiber-optic communications. The WDM 2232 may multiplex a number of optical carrier signals onto a single optical fiber by using different wavelengths of laser light, and thereby enable bidirectional communications over a single strand of fiber. On the transmitting side, electrical signals may be sent from the SerDes 2218 to the continuous path 1254 which converts electrical signals to optical signals. The optical signals may then be sent to the EML 2230 and then to the WDM 2232 for fiber-optic communications. On the receiving side, optical signals received from the WDM 2232 may be sent to the transmitter 202 (e.g., the transmitter of FIG. 2A-2I or 22) which is connected to the burst mode path 1252. The transmitter 202 may be sometimes referred to as a BM path transmitter, a BM path TIA, or a BM-TIA. The transmitter 202, the burst mode path 1252, the input signals 236 and 238, and the communication port 266 coupled to the burst mode path 1252 are described above in reference to FIGS. 2A-2I, 9, and 12-14. The receiving side may convert the optical signals to electrical signals (e.g., using the transmitter 202) and convert a serial data stream into parallel data streams (e.g., using the deserializer of the SerDes 2218). It should be noted that in another configuration, some of the components may be combined or divided into separate parts, and/or eliminated. In some examples, the continuous path 1254 and burst mode path 1252 may be contained in a single device (e.g., 1204 of FIG. 12).

The circuits and components in the burst mode data signal path of one or more of FIGS. 9, 12-14, 19 and 21 may be implemented in the burst mode path 1252 of FIG. 23. The circuits and components in the continuous mode data signal path of one or more of FIGS. 9 and 12-14 may be implemented in the continuous path 1254 of FIG. 23. The host of one or more of FIGS. 9 and 12-14 and/or their components may include, may represent or may be a part of the OLT-MAC 2216 and/or SerDes 2218.

In one or more examples, the transmitter 202, the burst mode path 1252 and their components (e.g., 208, 210, 212, 214, 216, 218, 220, and 222) and devices and components shown in FIGS. 9, 12-14, 19, 21 and 22 may be, may include, or may be implemented using, one or more circuits such as transistors (e.g., MOSFETs and/or BJTs). Each of the foregoing may be sometimes referred to as a circuit or one or more circuits. They may also include passive components (e.g., resistors and capacitors). The components of the pulse negotiation and communication management controller 222 (e.g., 316, 318 and 328) may be implemented using circuits. In some examples, one or more of these components may include a processor. A processor may be, for example, a microprocessor or a microcontroller. A processor may include one or more processors. In one or more examples, the circuits in the continuous mode data signal path and in the burst mode data signal path shown in FIGS. 9 and 12-14 may be implemented in a single integrated circuit (IC), in a single module or using a single printed circuit board (PCB). In one or more other examples, the foregoing may be implemented in multiple ICs, in multiple module or using multiple PCBs. For example, the circuits in the continuous mode data signal path may be implemented in one or more first ICs, first modules or first PCBs, and the circuits in the burst mode data signal path may be implemented in one or more second ICs, second modules or second PCBs.

With respect to the waveforms shown in the figures described herein, the horizontal direction may represent time, and the vertical direction may represent an amplitude or a magnitude.

Various example embodiments and aspects of the disclosure are described below for convenience. These are provided as examples, and do not limit the subject technology. Some of the examples described below are illustrated with respect to the figures disclosed herein simply for illustration purposes without limiting the scope of the subject technology.

One or more aspects of the subject technology provide an apparatus comprising a transmitter device (e.g., the transmitter 202) and a receiver device (e.g., the receiver 204). The transmitter device may be configured to: receive a first signal (e.g., 802 or 858) including a first burst of data; convert the first signal to a first set of electrical signals; transmit the first set of electrical signals (e.g., 806 or 862) to the receiver device; receive a burst absent mode signal (e.g., 848 or 883) from the receiver device, after transmitting the first set of electrical signals to the receiver device. The burst absent mode signal is part of burst absent mode signaling (e.g., 242 or M2), and the burst absent mode signaling may cause the transmitter device to continuously be in a ready state; and while in the ready state: receive a second signal (e.g., 804 or 860) including a second burst of data; convert the second signal to a second set of electrical signals (e.g., 808 or 864), including a direct current (DC) offset (e.g., 608); and transmit the second set of electrical signals to the receiver device 204. The receiver device may be configured to: receive the first set of electrical signals from the transmitter device; transmit the burst absent mode signal to the transmitter device, after receiving the first set of electrical signals (e.g., after completing to receive the first set of electrical signals); detect a presence of the second set of electrical signals; and in response to detecting the presence of the second set of electrical signals: remove all or part of the DC offset from the second set of electrical signals to generate an output set of electrical signals (e.g., 856 or 889); and cause transmitting the output set of electrical signals to a downstream device (e.g., 2216, 2218). In some aspects, the transmitter device may receive an optical signal via a single-ended input. In some aspects, the transmitter device may receive a signal or single ended signal, or an optical signal, rather than just an optical signal. In one or more aspects, the transmitter device may receive a signal, such as an optical signal or a single-ended signal; however, the subject technology is not limited thereto.

The DC offset may be a settled DC offset, and the receiver device (e.g., 204) may be configured to remove all or part of the DC offset (e.g., using the DC offset removal stage 212) from the second set of electrical signals by causing a pulse (e.g., 838 or 891) to discharge one or more AC coupling capacitors (e.g., the capacitors 704 and 706) receiving the second set of electrical signals.

The receiver device (e.g., 204) may comprise one or more switches (e.g., the switches 708 and 710) configured to receive the pulse, short the one or more AC coupling capacitors and remove all or part of the DC offset on an input stage of the one or more AC coupling capacitors.

The receiver device (e.g., 204) may be further configured to: receive a host reset signal (e.g., 868) from a host before detecting the presence of the second set of electrical signals; and generate the burst absent mode signal based on the host reset signal. The transmitter device 202 may be configured not to receive the host reset signal directly from the host.

The receiver device (e.g., 204) may be further configured to generate the burst absent mode signal, during a registration mode of the apparatus, without receiving or using any host reset signal from a host. The receiver device 204 may be configured to generate the burst absent mode signal based on an instruction (e.g., the pulse 830) generated internally by the receiver device 204 (e.g., the pulse generator 326).

During a mission mode of the apparatus, while the presence of the second set of electrical signals is detected, the receiver device (e.g., 204) may be prevented from transmitting to the transmitter device any additional burst absent mode signals (e.g., no reset pulses in the signaling mode M1 after the reset pulse 883) generated based on internally generated instructions (e.g., the pulses 890, 892 and 893). The additional burst absent mode signals may comprise reset pulses. Examples of mission mode are described above in reference to FIGS. 1A and 8B.

The transmitter device (e.g., 202) may be configured to receive the burst absent mode signal before transmitting the second set of electrical signals to allow the transmitter device (e.g., 202) to generate the second set of electrical signals based on the second burst of data using the burst absent mode signal.

The receiver device (e.g., 204) may be configured to transmit another burst absent mode signal (e.g., 850) to the transmitter device (e.g., 202) during a registration mode, in response to detecting the presence of the second set of electrical signals. The another burst absent mode signal may comprise one or more pulses to adjust one or more of the following features of the transmitter device: a gain; a bandwidth control; and one or more signal conditioning features. A registration mode is described above, for example, in reference to FIGS. 1B, 2A-2I, and 8A.

The receiver device (e.g., 204) may be configured to: receive a host reset pulse (e.g., 868) from a host and internally generate a pulse (e.g., 880, 882, 884, 886, or 888); adjust at least one of the host reset instruction and the internally generated instruction to generate an adjusted reset instruction (e.g., 894, 896, 898, 881, or 883); and transmit the adjusted reset instruction as the burst absent mode signal to the transmitter device. The adjusting may resolve a conflict between the host reset instruction and the internally generated instruction. In some aspects, the adjusting may resolve the conflict between the host reset instruction and the internally generated instruction by performing at least one of: (i) delaying, or adjusting a width of, the host reset instruction relative to a proximity of the host reset instruction to the internally generated instruction; or (ii) delaying, or adjusting a width of, the internally generated instruction relative to a proximity of the internally generated instruction to the host reset instruction. In one or more examples, the receiver device may select one of a host reset instruction and an internally generated instruction and process the selected one of the instructions. In some examples, when both the host reset pulse (e.g., 868) and the internally generated instruction (e.g., 888) are present at the same time, the receiver device may select the host reset instruction (e.g., 868) and output a reset instruction (e.g., 883) based on the host reset instruction (e.g., 868). Examples of resolving conflicts are described above in reference to FIGS. 4A, 4B, 4C, 5A and 5B.

The transmitter device may comprise a transimpedance amplifier (TIA) that comprises a signal conditioner (e.g., the signal conditioner 208). The signal conditioner may be configured to generate the first set of electrical signals and the second set of electrical signals as output signals. The signal conditioner may be configured to adjust the TIA's one or more features based on incoming signals only after receiving a reset pulse from the receiver device. The one or more features include one or more of a gain, a bandwidth control, and one or more signal conditioning features. The techniques described herein may be used to communicate with a transmitter device to allow the transmitter device to configure itself to pass a new data burst. Each data burst, be it the first, second, third or any subsequent data burst, may have different signal levels and may require different transmitter device feature settings. The transmitter device may adjust its settings upon receiving a pulse via the communication port 266. The reset pulse may be for being received at a communication port (e.g., 266) coupled to the receiver device.

The receiver device (e.g., 204) may include a DC offset removal stage circuit (e.g., 212 or 302) coupled to (i) an input node which is coupled to the transmitter device and (ii) an input stage circuit which is coupled to a signal conditioner. The receiver device may be configured to (i) receive an input signal from the input node, (ii) remove all or part of the DC offset, and (iii) output a signal without the DC offset to the input stage circuit which is configured to output a signal to the signal conditioner. An example of the DC offset removal stage circuit 212 is described above, for example, in reference to FIGS. 2A, 3, 7A and 7B.

The receiver device (e.g., 204) may include a signal detection circuit (e.g., the signal detect circuit 220) coupled to (i) an input node coupled to the transmitter device (e.g., 202) and (ii) a pulse negotiation and communication management controller (e.g., the controller 222), and configured to (i) receive an input signal from the input node, (ii) detect the presence of the second set of electrical signals based on the input signal, and (iii) output an assertion signal to the pulse negotiation and communication management controller based on the detection. An input node may be a pass-through or unity gain circuit (e.g., a set of emitter follower devices); however, the subject technology is not limited thereto.

The receiver device (e.g., 204) may include a pulse negotiation and communication management controller (e.g., 222) coupled to a host interface (e.g., an interface to receive the host reset signal 230), a signal detection circuit (e.g., the signal detect circuit 220) and a DC offset removal stage circuit (e.g., the DC offset removal stage 212). The pulse negotiation and communication management controller (e.g., 222) may be configured to: when the presence of the second set of electrical signals is detected by the signal detection circuit, receive an assertion signal output by the signal detection circuit; receive a host reset signal via the host interface; when the assertion signal is received, output a DC offset removal stage signal (e.g., capacitor discharge pulse) to the DC offset removal stage circuit to discharge one or more alternating current (AC) coupling capacitors and to remove all or part of the DC offset; and output a reset signal to a communication port coupled to the transmitter device based on the host reset signal or an internally generated instruction. The burst absent mode signal may comprise the reset signal. The pulse negotiation and communication management controller (e.g., 222) may be configured to output the DC offset removal stage signal after the burst absent mode signal is transmitted by the receiver device (e.g., 204) to the transmitter device (e.g., 202).

The pulse negotiation and communication management controller 222 may comprise: a burst event and pulse manager circuit (e.g., the burst event and pulse manager 318) coupled to (i) a host signal decoder circuit (e.g., the host signal decoder 316), (ii) a signal detection circuit (e.g., the on-chip signal detect circuit 220), (iii) a pulse generator circuit (e.g., the programmable frequency pulse generator 326), (iv) a signal conditioner (e.g., the signal conditioner 216) and (v) a limiting amplifier signal recovery stage circuit (e.g., the limiting amplifier signal recovery stage 302), and configured to (i) receive and process the host reset signal from the host signal decoder circuit, the internally generated instruction from the pulse generator circuit, and the assertion signal from the signal detection circuit, and (ii) output a processed signal to the signal conditioner, output the DC offset removal stage signal to the limiting amplifier signal recovery stage circuit based on the assertion signal, and cause outputting the reset signal to the communication port for providing the reset signal to the transmitter device. The processed signal, the DC offset removal stage signal, and the reset signal may be controllable in frequency, timing or length.

The pulse negotiation and communication management controller (e.g., 222) may further comprise: an encoder circuit (e.g., the multi-level encoder 328) coupled to the burst event and pulse manager circuit and configured to (i) receive the reset signal from the burst event and pulse manager circuit, (ii) encode the reset signal, and (ii) output the encoded reset signal to the transmitter device (e.g., 202).

In one or more aspects, an apparatus may comprise a transmitter device (e.g., 202) and a receiver device (e.g., 204). The transmitter device (e.g., 202) may be configured to: receive a first transmitter input signal (e.g., 802 or 858); transmit first transmitter output signals (e.g., 806 or 862) to the receiver device (e.g., 204); receive a reset signal (e.g., 848, 850 or 883) from the receiver device (e.g., 204), after transmitting the first transmitter output signals to the receiver device (e.g., 204); receive a second transmitter input signal (e.g., 804 or 860); generate second transmitter output signals (e.g., 808 or 864) based on the second transmitter input signal and the reset signal from the receiver device (e.g., 204). An offset (e.g., 608) may be present between the second transmitter output signals; and transmit the second transmitter output signals to the receiver device (e.g., 204) after receiving the reset signal. The receiver device (e.g., 204) may be configured to: receive the first transmitter output signals from the transmitter device (e.g., 202) as first receiver input signals (e.g., 236 and 238); generate or forward the reset signal; transmit the reset signal to the transmitter device (e.g., 202), after receiving the first transmitter output signals and before receiving the second transmitter output signals as second receiver input signals e.g., 236 and 238); detect a presence of the second receiver input signals (e.g., by 220); and in response to detecting the presence of the second receiver input signals: remove the offset from the second receiver input signals to generate receiver output signals (e.g., 856 or 889); and cause transmitting the receiver output signals to a subsequent device. The offset is not present in the receiver output signals.

In some aspects, the second receiver input signals may comprise a non-inverted signal (e.g., 604) and an inverted signal (e.g., 606); the offset may be a direct current (DC) offset (e.g., 608) in amplitude or magnitude between the non-inverted signal and the inverted signal; and the receiver device (e.g., 204) may be configured to remove all or part of the DC offset from the second receiver input signals by causing a pulse (e.g., 838 or 891) to discharge one or more alternating current (AC) coupling capacitors (e.g., 704 and 706) receiving the second receiver input signals.

In some aspects, the receiver device (e.g., 204) may be further configured to: receive a host reset pulse (e.g., 868) from a host and internally generate a pulse (e.g., 888); and process at least one of the host reset pulse and the internally generated instruction to generate a reset instruction (e.g., 883). The reset signal may comprise the reset instruction (e.g., 883).

One or more implementations may provide a system of data transmission, including a recovery circuit (e.g., 1280 of FIG. 12). The recovery circuit may be configured to: receive a first detect signal (e.g., 1520SA of FIG. 15) for a first burst signal (e.g., 1536SA/1538SA of FIG. 15) and a second detect signal (e.g., 1520SB of FIG. 15) for a second burst signal (e.g., 1536SB/1538SB of FIG. 15) in a burst mode data path (e.g., 1252 of FIG. 12); receive a reference pattern signal (e.g., an output signal of the clock recovery unit 1266, CM path CDR recovered clock or PRBS (e.g., received by 1216 or by 1288) (e.g., 1514SA, 1524SC/1528SC, 1714SC, 1724SC/1728SC, A-A or A-C of FIG. 16 or 18, or 1910 of FIG. 19)) based on a signal from a continuous mode data path (e.g., 1254 of FIG. 12); generate a first lock signal (e.g., 1716SA or 1716SC of FIG. 17) locked to the first burst signal or locked to the reference pattern signal, and a second lock signal (e.g., 1616SB of FIG. 16) locked to the second burst signal in the burst mode data path; and output the reference pattern signal from the recovery circuit during a guard period (e.g., 1624SC/1628SC of FIG. 16, or 1824SC/1828SC of FIG. 18) of the recovery circuit. In one or more examples, a frequency of an oscillator (e.g., VCO 1924 of FIG. 19) of the recovery circuit is locked to a frequency of the reference pattern signal during the guard period of the recovery circuit, the recovery circuit is configured to start the guard period of the recovery circuit based on a time when the first detect signal de-asserts or a time when the first lock signal de-asserts, and the recovery circuit is configured to output neither of the first burst signal or the second burst signal.

In one or more examples, the reference pattern signal is a clock signal or a random sequence, and the reference pattern signal is not the first burst signal or the second burst signal, and the signal from the continuous mode data path is a clock signal recovered in the continuous mode data path.

In one or more examples, the recovery circuit includes a clock and data recovery (CDR) circuit (e.g., 1216 of FIG. 12, 1316 of FIG. 13, 1416 of FIG. 14); the recovery circuit is configured to phase lock the CDR circuit to the second burst signal during a partial lock acquisition period (e.g., Tcdr of FIG. 16); the partial lock acquisition period includes a phase lock acquisition period but not a frequency lock acquisition period; a full lock acquisition period (e.g., Tcdr_full_lock of FIG. 10) includes both a frequency lock acquisition period and a phase lock acquisition period; and the partial lock acquisition period is shorter than the full lock acquisition period.

In one or more examples, by the time when the partial lock acquisition period commences, the CDR circuit is already frequency locked to the reference pattern signal having a frequency that is substantially same as a frequency of the second burst signal; the partial lock acquisition period is a time to achieve a substantial phase lock to the second burst signal; during the partial lock acquisition period, the recovery circuit is configured to perform phase locking of the CDR circuit to the second burst signal so that by the time when the partial lock acquisition period ends, the CDR circuit is frequency locked and phase locked to the frequency and a phase of the second burst signal.

In one or more examples, the recovery circuit includes a clock divider (e.g., 1282 of FIG. 12); and the recovery circuit is configured to process the reference pattern signal from the clock divider.

In one or more examples, the clock divider is configured to receive the signal from the continuous mode data path; and the signal from the continuous mode data path is a clock signal recovered in the continuous mode data path.

In one or more examples, the recovery circuit includes a clock divider and a random signal generator (e.g., 1284 of FIG. 12); and the reference pattern signal from the continuous mode data path is for being processed through the clock divider and further through the random signal generator.

In one or more examples, the recovery circuit includes a clock and data recovery (CDR) circuit, and one or more of an input node and an output node of the CDR circuit are configured to receive the reference pattern signal. In one or more examples, the output node of the CDR circuit may represent an input node of a multiplexer (e.g., 1288 of FIG. 12), wherein the input node of the multiplexer may receive the reference pattern signal.

In one or more examples, the recovery circuit is coupled to one or more output capacitors (e.g., 1224C and/or 1228C of FIG. 12), and the one or more output capacitors are configured to be charged during the guard period.

In one or more examples, the recovery circuit is coupled to one or more output capacitors, and the one or more output capacitors are configured to be charged during the guard period to the same or substantially the same voltage level as a voltage level of the one or more output capacitors during a duration of the first burst signal or the second burst signal. For example, the BM path output driver AC coupling capacitor level 1624CS/1628CS may be continuously charged to the required common mode level during the duration of the burst X, the duration between the burst X and burst X+1 and the duration of the burst X+1. Hence, the BM path output driver AC coupling capacitor level (or voltage level) 1624CS/1628CS for the duration between the burst X and burst X+1 may have the same or substantially the same capacitor level (or voltage level) as the AC coupling capacitor level (or voltage level) 1624CS/1628CS for the duration of the burst X or the burst X+1.

In one or more examples, the recovery circuit includes a clock and data recovery (CDR) circuit; when the first burst signal is (a) a low rate signal or (b) a signal at a rate not required to be retimed, the recovery circuit is configured to cause the first burst signal to bypass the CDR circuit via a bypass path (e.g., 1524SA/1528SA of FIG. 15) so that the CDR circuit is prevented from performing an operation to lock to the first burst signal; the guard period of the recovery circuit starts when the first detect signal de-asserts; and the low rate signal has a rate that is lower than a predetermined rate.

In one or more examples, the recovery circuit includes a clock and data recovery (CDR) circuit; when the first burst signal is (a) a high rate signal or (b) a signal at a rate required to be retimed, the CDR circuit is configured to cause the first burst signal to be processed through a main path of the CDR circuit and configured to cause the CDR circuit to be locked to the first burst signal (e.g., 1716SA of FIG. 17); the guard period of the recovery circuit starts when the first lock signal locked to the first burst signal de-asserts; and the high rate signal has a rate that is higher than a predetermined rate.

In one or more examples, the recovery circuit is configured to: receive the second burst signal in the burst mode data path when an input stage signal adjustment procedure (e.g., 1512SB of FIG. 15 or 1712SB of FIG. 17) is completed. In one or more examples, the input stage signal adjustment procedure includes removing a direct current (DC) offset from the second burst signal; and the guard period of the recovery circuit ends when the input stage signal adjustment procedure is completed.

In one or more examples, when an input stage signal adjustment procedure is not performed, the guard period of the recovery circuit ends when the second detect signal for the second burst signal is asserted.

In one or more examples, the burst mode data path is disposed toward a host to cause a data signal in the burst mode data path to travel in a first direction toward a host (e.g., 1250 of FIG. 12); and the continuous mode data path is disposed from the host so that the continuous mode data path is configured receive a data signal from the host and to allow the data signal received from host to travel in a second direction opposite to the first direction, wherein the second direction is away from the host.

In one or more examples, an output node of the recovery circuit is configured to output no data signal during the guard period.

In one or more examples, the recovery circuit is configured to be programmable to select a start time of the guard period of the recovery circuit. In some examples, the recovery circuit may include a programmable logic circuit to be programmable.

In one or more examples, the recovery circuit is configured to start the guard period of the recovery circuit at one of a first time, a second time, or a third time. The first time may be when the first detect signal de-asserts. The second time may be when the first lock signal de-asserts. The third time may be earlier of the first time or the second time. In one example, the second time is earlier than the first time. In another example, the second time may be later than the first time.

In one or more examples, the recovery circuit may include a clock divider and a random or pseudorandom signal generator (e.g., 1284 of FIG. 12). The reference pattern signal from the continuous mode data path may be processed through the clock divider and further through the random or pseudorandom signal generator and may provide a random or pseudorandom data sequence at an output of the recovery circuit at a time in between the first burst signal and the second burst signal. In one or more examples, the recovery circuit's ability to forward the reference pattern signal to a downstream device (e.g., 1232 of FIG. 12) is not just for purposes of maintaining a charge on the AC coupling capacitors (e.g., 1224C and/or 1228C of FIG. 12) but also for allowing the recovery circuit to use the reference pattern signal for purposes of adaption/locking. These are non-limiting example purposes, and the subject technology is not limited thereto.

One or more implementations may provide a method of data transmission, including: receiving a first detect signal for a first burst signal and a second detect signal for a second burst signal in a burst mode data path; receiving a reference pattern signal based on a signal from a continuous mode data path; generating a first lock signal locked to the first burst signal or locked to the reference pattern signal, and a second lock signal locked to the second burst signal in the burst mode data path; and outputting the reference pattern signal from a recovery circuit during a guard period of the recovery circuit. In one or more examples, a frequency of an oscillator of the recovery circuit is locked to a frequency of the reference pattern signal during the guard period of the recovery circuit, the recovery circuit is configured to start the guard period of the recovery circuit based on a time when the first detect signal de-asserts or a time when the first lock signal de-asserts, and neither the first burst signal nor the second burst signal is for being outputted from the recovery circuit.

One or more implementations may provide a recovery circuit within a data transmission system, including: a signal locking device (e.g., 1216 of FIG. 12, 1316 of FIG. 13, 1416 of FIG. 14); and a logical signal controller. In one or more examples, the logical signal controller is configured to instruct the signal locking device to: receive a first detect signal for a first burst signal and a second detect signal for a second burst signal in a burst mode data path; receive a reference pattern signal from a continuous mode data path; generate a first lock signal locked to the first burst signal or locked to the reference pattern signal, and a second lock signal locked to the second burst signal in the burst mode data path; and output the reference pattern signal from the signal locking device during a guard period of the signal locking device. In one or more examples, a frequency of an oscillator of the signal locking device is locked to a frequency of the reference pattern signal during the guard period of the signal locking device, the recovery circuit is configured to start the guard period of the signal locking device based on a time when the first detect signal de-asserts or a time when the first lock signal de-asserts, and during the guard period, neither the first burst signal nor the second burst signal is for being outputted from the signal locking device.

In one or more aspects, a method includes one or more methods, operations or portions thereof described herein. In one or more aspects, an apparatus includes one or more memories and one or more processors, the one or more processors configured to cause performing one or more methods, operations or portions thereof described herein. In one or more aspects, an apparatus includes means adapted for performing one or more methods, operations or portions thereof described herein. In one or more aspects, a hardware apparatus includes circuits configured to perform one or more methods, operations or portions thereof described herein. In one or more aspects, an apparatus includes components operable to carry out one or more methods, operations or portions thereof described herein. In one or more aspects, a non-transitory machine-readable storage medium (e.g., one or more memories and/or one or more registers) store instructions that, when executed by one or more processors, cause one or more processors to perform one or more methods, operations or portions thereof described herein.

Further examples of the subject technology include various subsets of the above examples combined or otherwise re-arranged in various forms.

In some examples, to illustrate the interchangeability of hardware and software, items such as the various illustrative blocks, modules, components, methods, operations, instructions, and algorithms may have been described generally in terms of their functionality. In some examples, whether such functionality is implemented as hardware, software or a combination of hardware and software depends upon the particular application and design constraints imposed on the overall system. Skilled artisans may implement the described functionality in varying ways for each particular application.

Headings and subheadings, if any, are used for convenience only and do not limit the invention. The word "exemplary" is used to mean serving as an example or illustration. Any implementation described herein as an "example" is not necessarily to be construed as preferred or advantageous over other implementations. Relational terms such as first and second and the like may be used simply for ease of understanding without necessarily requiring or implying any actual relationship or order between elements or actions and without necessarily requiring or implying that they have different characteristics unless stated otherwise.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" and "at least one of A, B, or C" may refer to only A, only B, or only C; any combination of A, B, and C; and/or at least one of each of A, B, and C.

The expression of a first element, a second elements "and/or" a third element should be understood as one of the first, second and third elements or as any or all combinations of the first, second and third elements. By way of example, A, B and/or C can refer to only A; only B; only C; any or some combination of A, B, and C; or all of A, B, and C. Furthermore, an expression "element A/element B" may be understood as element A and/or element B.

Features of various embodiments of the present disclosure may be partially or wholly coupled to or combined with each other and may be variously inter-operated, linked or driven together. The embodiments of the present disclosure may be carried out independently from each other or may be carried out together in a co-dependent or related relationship. In one or more aspects, the components of each apparatus according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

In one aspect, the blocks or components described in this present disclosure (e.g., components in FIGS. 3-23) may be implemented in circuits or integrated circuits. A circuit or an integrated circuit may include one or more transistors.

In one or more aspects, a transistor may include one or more bipolar junction transistors (BJTs), which may refer to any of a variety of multi-terminal transistors operating on the principal of carrying current using both electrons and holes, including, but not limited to, an n-p-n BJT (NPN BJT) and a p-n-p BJT (PNP BJT).

In one or more aspects, transistors may include one or more field effect transistors (FETs), which may refer to any of a variety of multi-terminal transistors operating on the principals of controlling an electric field to control the shape and hence the conductivity of a channel of one type of charge carrier in a semiconductor material, including, but not limited to, a metal oxide semiconductor field effect transistor (MOSFET), a junction FET (JFET), a metal semiconductor FET (MESFET), a high electron mobility transistor (HEMT), a modulation doped FET (MODFET), an insulated gate bipolar transistor (IGBT), a fast reverse epitaxial diode FET (FREDFET), and an ion-sensitive FET (ISFET). A MOSFET may be an n-type MOSFET (NMOS) or a p-type MOSFET (PMOS). A complementary metal-oxide semiconductor (CMOS) device may include an NMOS and a PMOS.

In one or more aspects, transistors may include one or more BJTs and FETs. In one or more examples, transistors may include one or more BJTs and one or more CMOS devices, which may be referred to as Bi-CMOS devices.

Unless otherwise mentioned, various configurations described in the present disclosure may be implemented on a silicon, silicon-germanium (SiGe), gallium arsenide (GaAs), indium phosphide (InP) or indium gallium phosphide (InGaP) substrate, or any other suitable substrate.

In one aspect, the terms base, emitter, and collector may refer to three terminals of a transistor and may refer to a base, an emitter and a collector of a bipolar junction transistor or may refer to a gate, a source, and a drain of a field effect transistor, respectively, and vice versa. In another aspect, the terms gate, source, and drain may refer to base, emitter, and collector of a transistor, respectively, and vice versa. In some aspects, a source and a drain may be used interchangeably.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In describing a temporal relationship, when the temporal order is described as, for example, "after," "subsequent," "next," "before," "preceding," "prior to," or the like, a case that is not consecutive or not sequential may be included unless a more limiting term, such as "just," "immediate(ly)," or "direct(ly)," is used.

In one or more aspects, a waveform, an element, a feature, or information or one or more portions thereof (e.g., a delay, gap, level, time, amplitude, range, dimension, size, or the like) is construed as including (or not showing for simplicity) an error or tolerance range even where no explicit description of such an error or tolerance range is provided. An error or tolerance range may be caused by various factors (e.g., a delay in propagating a signal through a medium (e.g., an electrical connection or a connection of another type between components), a delay in propagating a signal through a component (e.g., an input interface stage 1212, an input stage 1214, a multiplexer, such as Mux A, Mux B or Mux C, or an output stage 1218 of FIG. 12 and similar components in other figures), process factors, internal or external impact, noise, or the like). Further, the term "may" encompasses all the meanings of the term "can."

It is understood that, although the term "first," "second," or the like may be used herein to describe various elements, these elements should not be limited by these terms. These terms are only used to distinguish one element from another. For example, a first element could be a second element, and, similarly, a second element could be a first element, without departing from the scope of the present disclosure. Furthermore, the first element, the second element, and the like may be arbitrarily named according to the convenience of those skilled in the art without departing from the scope of the present disclosure.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of the elements.

In one or more examples, when an element is "connected" or "coupled" to another element, the element can be directly connected or coupled to another element, and can be indirectly connected or coupled to another element with one or more intervening elements disposed or interposed between the elements, unless otherwise specified.

The disclosure is provided to enable any person skilled in the art to practice the various aspects described herein. In some instances, when a detailed description of well-known functions or configurations may unnecessarily obscure aspects of the present disclosure, the detailed description thereof may have been omitted. The disclosure provides various examples of the subject technology, and the subject technology is not limited to these examples. Various modifications to these aspects will be readily apparent to those skilled in the art, and the principles described herein may be applied to other aspects.

Unless stated otherwise, like reference numerals refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

When the term "comprise," "have," "include," "contain," "constitute," or the like is used, one or more other elements may be added unless a term such as "only" or the like is used. The terms used in the present disclosure are merely used in order to describe particular embodiments, and are not intended to limit the scope of the present disclosure. The terms used herein are merely used in order to describe example embodiments, and are not intended to limit the scope of the present disclosure. The terms of a singular form may include plural forms unless the context clearly indicates otherwise. An element proceeded by "a," "an," "the," or "said" does not, without further constraints, preclude the existence of additional elements.

In one or more aspects, an element, feature, or corresponding information (e.g., a level, range, dimension, size, or the like) is construed as including an error or tolerance range even where no explicit description of such an error or tolerance range is provided. An error or tolerance range may be caused by various factors (e.g., process factors, internal or external impact, or the like). Furthermore, while the subject disclosure may provide many example ranges and values, these are non-limiting examples, and other ranges and values are within the scope of the subject technology.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A system of data transmission, comprising:
    a recovery circuit configured to:
    receive a first detect signal for a first burst signal and a second detect signal for a second burst signal in a burst mode data path;
    receive a reference pattern signal based on a signal from a continuous mode data path;
    generate a first lock signal locked to the first burst signal or locked to the reference pattern signal, and a second lock signal locked to the second burst signal in the burst mode data path; and
    output the reference pattern signal from the recovery circuit during a guard period of the recovery circuit,
    wherein:
    a frequency of an oscillator of the recovery circuit is locked to a frequency of the reference pattern signal during the guard period of the recovery circuit;
    the recovery circuit is configured to start the guard period of the recovery circuit based on a time when the first detect signal de-asserts or a time when the first lock signal de-asserts; and during the guard period, the recovery circuit is configured to output neither of the first burst signal or the second burst signal.

2. The system of claim 1, wherein the reference pattern signal is a clock signal or a random sequence, and the reference pattern signal is not the first burst signal or the second burst signal, and
wherein the signal from the continuous mode data path is a clock signal recovered in the continuous mode data path.

3. The system of claim 1, wherein:
the recovery circuit comprises a clock and data recovery (CDR) circuit;
the recovery circuit is configured to phase lock the CDR circuit to the second burst signal during a partial lock acquisition period;
the partial lock acquisition period includes a phase lock acquisition period but not a frequency lock acquisition period;
a full lock acquisition period includes both a frequency lock acquisition period and a phase lock acquisition period; and
the partial lock acquisition period is shorter than the full lock acquisition period.

4. The system of claim 3, wherein:
by the time when the partial lock acquisition period commences, the CDR circuit is already frequency locked to the reference pattern signal having a frequency that is substantially same as a frequency of the second burst signal;
the partial lock acquisition period is a time to achieve a substantial phase lock to the second burst signal; and
during the partial lock acquisition period, the recovery circuit is configured to perform phase locking of the CDR circuit to the second burst signal so that by the time when the partial lock acquisition period ends, the CDR circuit is frequency locked and phase locked to the frequency and a phase of the second burst signal.

5. The system of claim 1, wherein:
the recovery circuit comprises a clock divider; and
the recovery circuit is configured to process the reference pattern signal from the clock divider.

6. The system of claim 5, wherein:
the clock divider is configured to receive the signal from the continuous mode data path; and
the signal from the continuous mode data path is a clock signal recovered in the continuous mode data path.

7. The system of claim 1, wherein:
the recovery circuit comprises a clock divider and a random signal generator; and
the reference pattern signal from the continuous mode data path is for being processed through the clock divider and further through the random signal generator.

8. The system of claim 1, wherein the recovery circuit comprises a clock and data recovery (CDR) circuit, and one or more of an input node and an output node of the CDR circuit are configured to receive the reference pattern signal, wherein the output node of the CDR circuit represents an input node of a multiplexer, and wherein the input node of the multiplexer is configured to receive the reference pattern signal.

9. The system of claim 1, wherein the recovery circuit is coupled to one or more output capacitors, and the one or more output capacitors are configured to be charged during the guard period.

10. The system of claim 1, wherein the recovery circuit is coupled to one or more output capacitors, and the one or more output capacitors are configured to be charged during the guard period to a same or a substantially same voltage level as a voltage level of the one or more output capacitors during a duration of the first burst signal or the second burst signal.

11. The system of claim 1, wherein:
the recovery circuit comprises a clock and data recovery (CDR) circuit;
the recovery circuit is configured to cause the first burst signal to bypass the CDR circuit via a bypass path so that the CDR circuit is prevented from performing an operation to lock to the first burst signal; and
the guard period of the recovery circuit starts when the first detect signal de-asserts.

12. The system of claim 1, wherein:
the recovery circuit comprises a clock and data recovery (CDR) circuit;
the CDR circuit is configured to cause the first burst signal to be processed through a main path of the CDR circuit and configured to cause the CDR circuit to be locked to the first burst signal; and
the guard period of the recovery circuit starts when the first lock signal locked to the first burst signal de-asserts.

13. The system of claim 1, wherein the recovery circuit is configured to:
receive the second burst signal in the burst mode data path when an input stage signal adjustment procedure is completed;
wherein:
the input stage signal adjustment procedure comprises removing a direct current (DC) offset from the second burst signal; and
the guard period of the recovery circuit ends when the input stage signal adjustment procedure is completed.

14. The system of claim 1, wherein when an input stage signal adjustment procedure is not performed, the guard period of the recovery circuit ends when the second detect signal for the second burst signal is asserted.

15. The system of claim 1, wherein:
the burst mode data path is disposed toward a host to cause a data signal in the burst mode data path to travel in a first direction toward the host; and
the continuous mode data path is disposed from the host so that the continuous mode data path is configured receive a data signal from the host and to allow the data signal received from host to travel in a second direction opposite to the first direction, wherein the second direction is away from the host.

16. The system of claim 1, wherein:
an output node of the recovery circuit is configured not to output a data signal during the guard period; and
the reference pattern signal is different from the data signal.

17. The system of claim 1, wherein the recovery circuit is configured to be programmable to select a start time of the guard period of the recovery circuit.

18. The system of claim 1, wherein:
the recovery circuit is configured to start the guard period of the recovery circuit at an earlier one of a first time and a second time;
the first time is when the first detect signal de-asserts; and
the second time is when the first lock signal de-asserts.

19. The system of claim 1, wherein:
the recovery circuit comprises a clock divider and a random or pseudorandom signal generator; and
the reference pattern signal from the continuous mode data path is for being processed through the clock divider and further through the random or pseudorandom signal generator, and for providing a random or pseudorandom data sequence at an output of the recovery circuit at a time in between the first burst signal and the second burst signal.

20. A method of data transmission, comprising:
receiving a first detect signal for a first burst signal and a second detect signal for a second burst signal in a burst mode data path;
receiving a reference pattern signal based on a signal from a continuous mode data path;
generating a first lock signal locked to the first burst signal or locked to the reference pattern signal, and a second lock signal locked to the second burst signal in the burst mode data path; and
outputting the reference pattern signal from a recovery circuit during a guard period of the recovery circuit,
wherein:
a frequency of an oscillator of the recovery circuit is locked to a frequency of the reference pattern signal during the guard period of the recovery circuit;
the recovery circuit is configured to start the guard period of the recovery circuit based on a time when the first detect signal de-asserts or a time when the first lock signal de-asserts; and
during the guard period, neither the first burst signal nor the second burst signal is for being outputted from the recovery circuit.

21. A recovery circuit within a data transmission system, comprising:
a signal locking device; and
a logical signal controller,
wherein the logical signal controller is configured to instruct the signal locking device to:
receive a first detect signal for a first burst signal and a second detect signal for a second burst signal in a burst mode data path;
receive a reference pattern signal from a continuous mode data path;
generate a first lock signal locked to the first burst signal or locked to the reference pattern signal, and a second lock signal locked to the second burst signal in the burst mode data path; and
output the reference pattern signal from the signal locking device during a guard period of the signal locking device, and
wherein:
a frequency of an oscillator of the signal locking device is locked to a frequency of the reference pattern signal during the guard period of the signal locking device;
the recovery circuit is configured to start the guard period of the signal locking device based on a time when the first detect signal de-asserts or a time when the first lock signal de-asserts; and
during the guard period, neither the first burst signal nor the second burst signal is for being outputted from the signal locking device.

* * * * *